United States Patent [19]
Konno et al.

[11] Patent Number: 6,101,045
[45] Date of Patent: Aug. 8, 2000

[54] ZOOM LENS SYSTEM

[75] Inventors: Kenji Konno, Daito; Hitoshi Hagimori, Nara-Ken, both of Japan

[73] Assignee: Minolta Co., Ltd., Osaka, Japan

[21] Appl. No.: 08/935,272

[22] Filed: Sep. 22, 1997

Related U.S. Application Data

[63] Continuation of application No. 08/385,359, Feb. 7, 1995, abandoned.

[30] Foreign Application Priority Data

Feb. 14, 1994 [JP] Japan .................................. 6-017440
Apr. 27, 1994 [JP] Japan .................................. 6-089798
Jul. 14, 1994 [JP] Japan .................................. 6-161889

[51] Int. Cl.$^7$ .................................................. G02B 15/22
[52] U.S. Cl. ........................ 359/693; 359/684; 359/689; 359/692
[58] Field of Search .................................. 359/692, 690, 359/687, 688, 684, 686, 689, 681, 682, 693

[56] References Cited

U.S. PATENT DOCUMENTS

| | | | |
|---|---|---|---|
| 4,189,213 | 2/1980 | Iizuka | 359/683 |
| 4,586,793 | 5/1986 | Tanaka et al. | 359/684 |
| 4,629,294 | 12/1986 | Tanaka et al. | 359/686 |
| 4,650,291 | 3/1987 | Kato | 359/690 |
| 4,775,228 | 10/1988 | Ikemori et al. | 359/691 |
| 4,789,227 | 12/1988 | Tanaka et al. | 359/684 |
| 4,848,883 | 7/1989 | Maruyama | 359/684 |
| 4,874,234 | 10/1989 | Aono | 359/684 |
| 4,936,661 | 6/1990 | Retensky | 359/692 |
| 5,105,311 | 4/1992 | Tokumaru et al. | 359/686 |
| 5,164,859 | 11/1992 | Ito | 359/692 |
| 5,257,137 | 10/1993 | Suzuki et al. | 359/686 |
| 5,592,334 | 1/1997 | Oshikiri et al. | 359/684 |
| 5,666,230 | 9/1997 | Tatsuno | 359/684 |

FOREIGN PATENT DOCUMENTS 0688917 5/1985 Japan.

Primary Examiner—Georgia Epps
Assistant Examiner—Jordan M. Schwartz
Attorney, Agent, or Firm—Price Gess & Ubell

[57] ABSTRACT

A zoom lens system has from an object side a first lens group of a positive refractive power, a second lens group of a positive refractive power and a third lens group of a negative refractive power. The second lens group has from the object side a lens unit and a positive lens element convex to the object side. Focusing for a close object is performed by moving the lens unit toward the object side. In the zoom lens, the following condition is fulfilled:

$$0.2 < \frac{r2 + r1}{r2 - r1} < 3.3$$

where r1 is a radius of curvature of an object side surface of the positive lens element and r2 is a radius of curvature of an image side surface of the positive lens element.

13 Claims, 39 Drawing Sheets

FNO=3.57

—— d
----- SC

-0.5   0.5
SPHERICAL   SINE
ABERRATION CONDITION

Y'=21.63

----- DM
—— DS

-0.5   0.5
ASTIGMATISM

Y'=21.63

-5.0   5.0
DISTORTION %

FNO=4.96

—— d
----- SC

-0.5   0.5
SPHERICAL   SINE
ABERRATION CONDITION

Y'=21.63

----- DM
—— DS

-0.5   0.5
ASTIGMATISM

Y'=21.63

-5.0   5.0
DISTORTION %

FNO=6.80

—— d
----- SC

-0.5   0.5
SPHERICAL   SINE
ABERRATION CONDITION

Y'=21.63

----- DM
—— DS

-0.5   0.5
ASTIGMATISM

Y'=21.63

-5.0   5.0
DISTORTION %

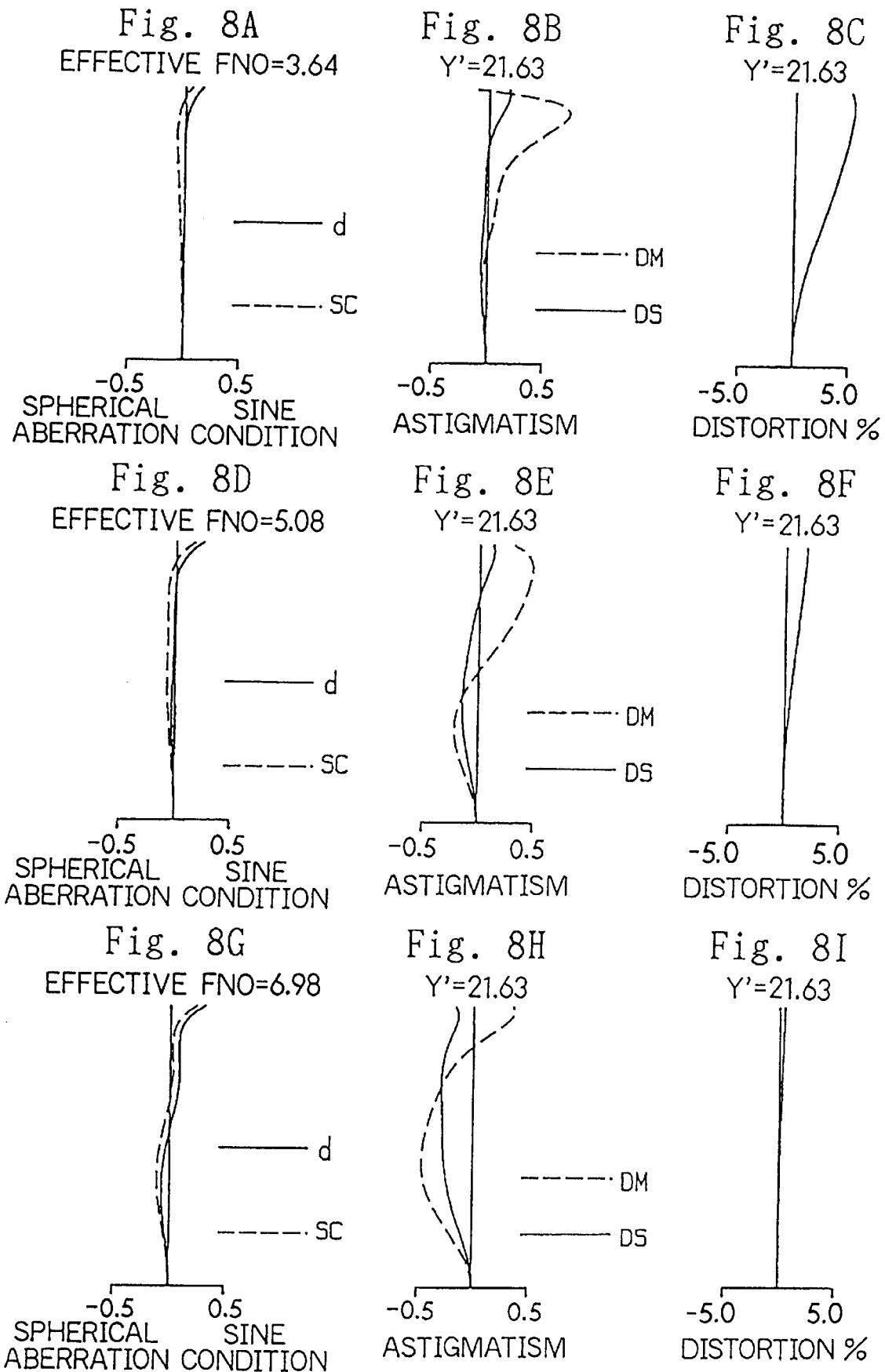

FNO=3.56

-0.5   0.5
SPHERICAL   SINE
ABERRATION CONDITION

Y'=21.63

-0.5   0.5
ASTIGMATISM

Y'=21.63

-5.0   5.0
DISTORTION %

FNO=5.29

-0.5   0.5
SPHERICAL   SINE
ABERRATION CONDITION

Y'=21.63

-0.5   0.5
ASTIGMATISM

Y'=21.63

-5.0   5.0
DISTORTION %

FNO=7.84

-0.5   0.5
SPHERICAL   SINE
ABERRATION CONDITION

Y'=21.63

-0.5   0.5
ASTIGMATISM

Y'=21.63

-5.0   5.0
DISTORTION %

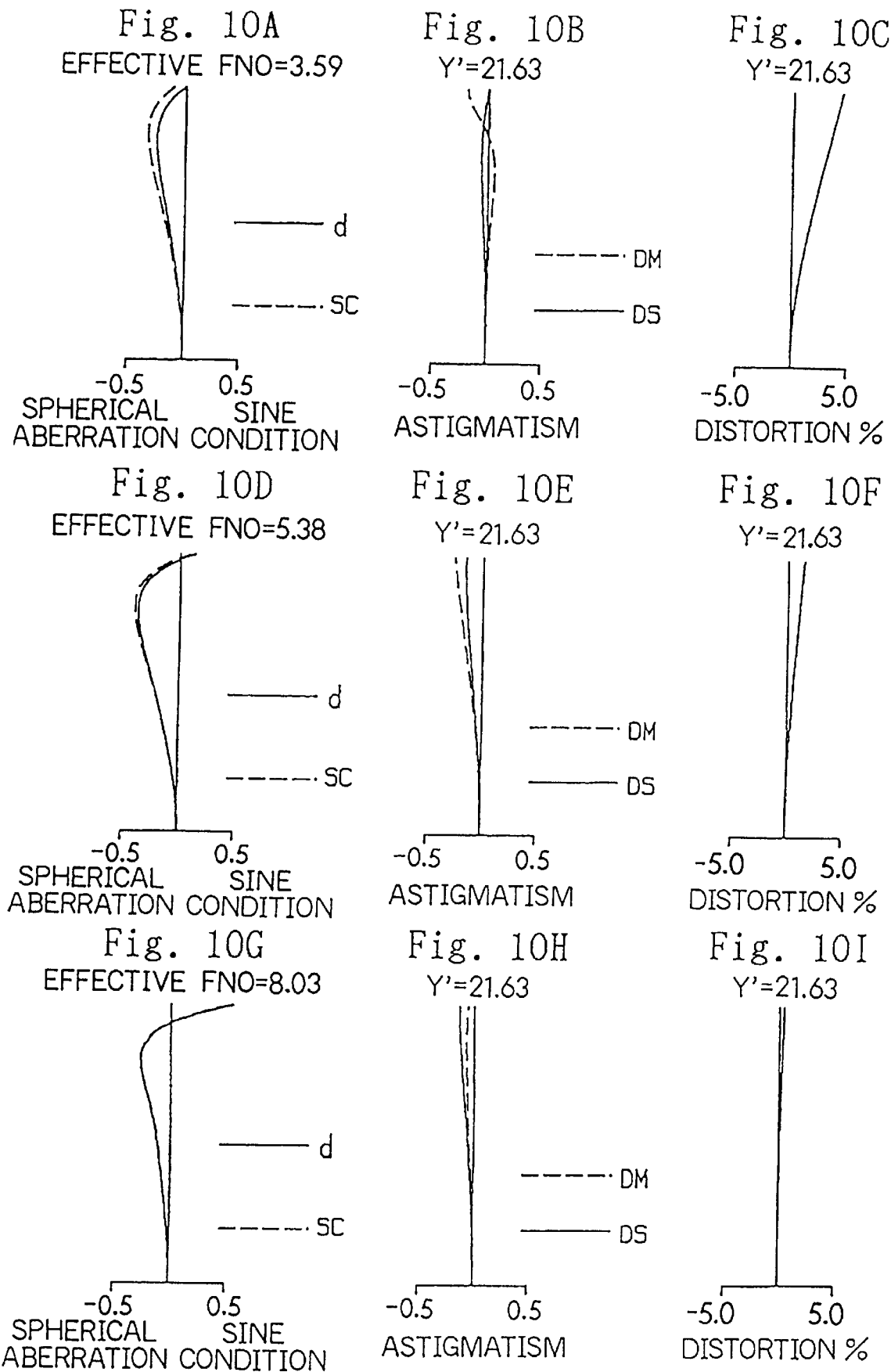

FNO=3.57

—— d
----- SC

-0.5  0.5
SPHERICAL SINE
ABERRATION CONDITION

Y'=21.63

----- DM
—— DS

-0.5  0.5
ASTIGMATISM

Y'=21.63

-5.0  5.0
DISTORTION %

FNO=4.95

—— d
----- SC

-0.5  0.5
SPHERICAL SINE
ABERRATION CONDITION

Y'=21.63

----- DM
—— DS

-0.5  0.5
ASTIGMATISM

Y'=21.63

-5.0  5.0
DISTORTION %

FNO=6.70

—— d
----- SC

-0.5  0.5
SPHERICAL SINE
ABERRATION CONDITION

Y'=21.63

----- DM
—— DS

-0.5  0.5
ASTIGMATISM

Y'=21.63

-5.0  5.0
DISTORTION %

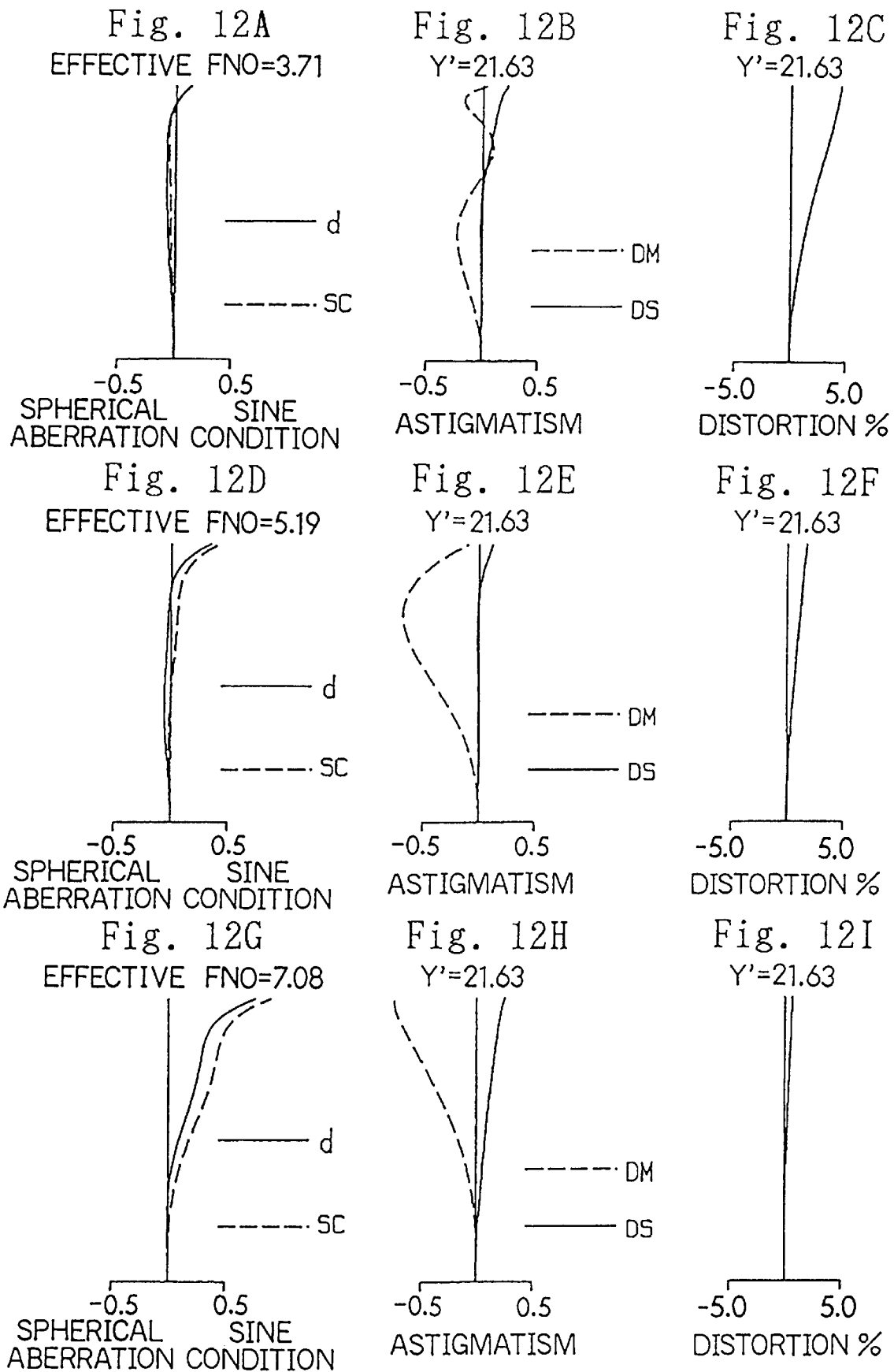

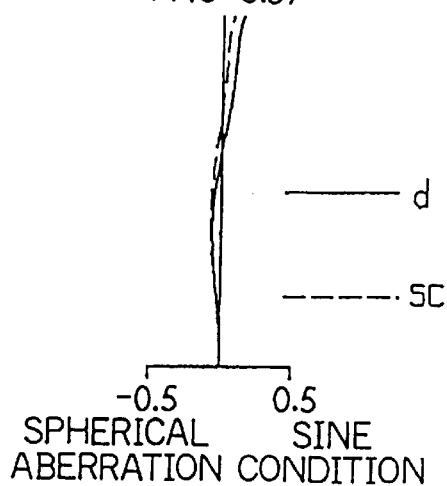
Fig. 13A FNO=3.57
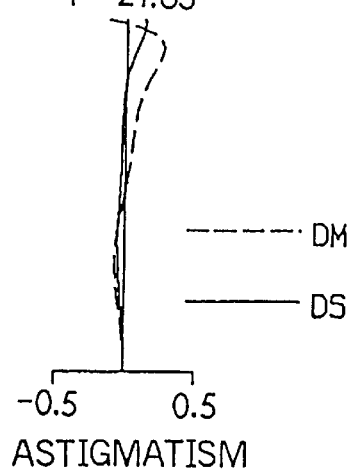
Fig. 13B Y'=21.63
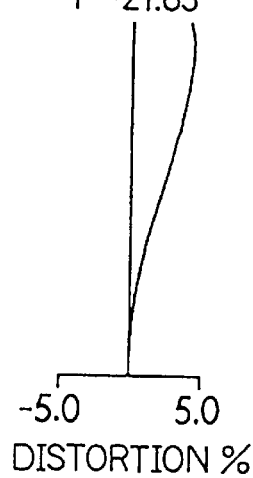
Fig. 13C Y'=21.63
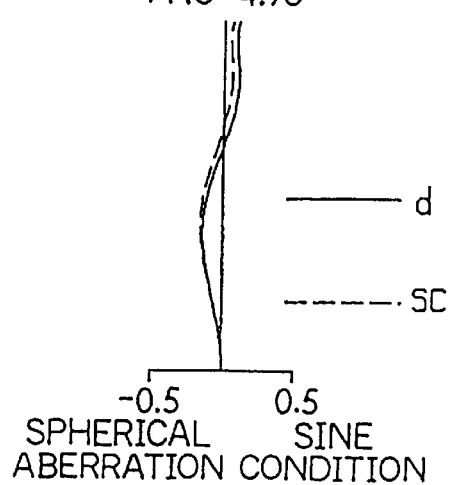
Fig. 13D FNO=4.96
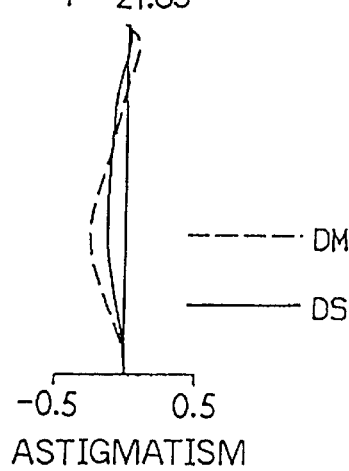
Fig. 13E Y'=21.63
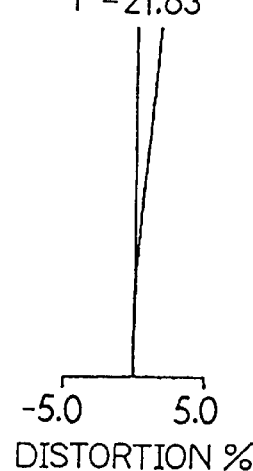
Fig. 13F Y'=21.63
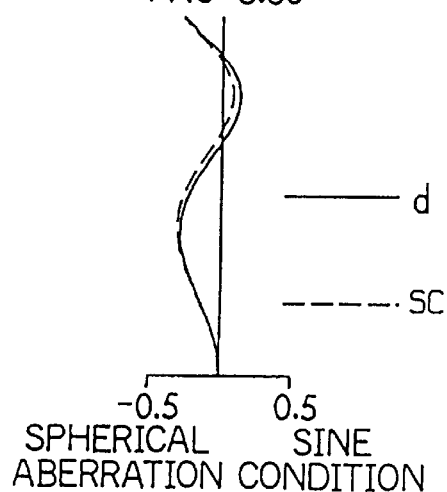
Fig. 13G FNO=6.80
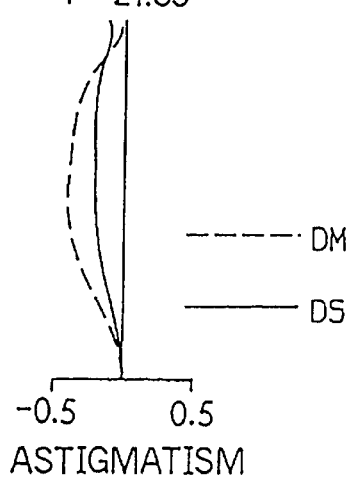
Fig. 13H Y'=21.63
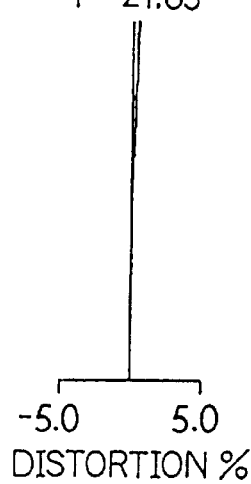
Fig. 13I Y'=21.63

EFFECTIVE FNO=3.64
-0.5  0.5
SPHERICAL  SINE
ABERRATION CONDITION
— d
----- SC

Y'=21.63
-0.5  0.5
ASTIGMATISM
----- DM
— DS

Y'=21.63
-5.0  5.0
DISTORTION %

EFFECTIVE FNO=5.05
-0.5  0.5
SPHERICAL  SINE
ABERRATION CONDITION
— d
----- SC

Y'=21.63
-0.5  0.5
ASTIGMATISM
----- DM
— DS

Y'=21.63
-5.0  5.0
DISTORTION %

EFFECTIVE FNO=6.91
-0.5  0.5
SPHERICAL  SINE
ABERRATION CONDITION
— d
----- SC

Y'=21.63
-0.5  0.5
ASTIGMATISM
----- DM
— DS

Y'=21.63
-5.0  5.0
DISTORTION %

FNO=3.57
— d
----- SC
-0.5    0.5
SPHERICAL   SINE
ABERRATION CONDITION

Y'=21.63
----- DM
—— DS
-0.5    0.5
ASTIGMATISM

Y'=21.63
-5.0    5.0
DISTORTION %

FNO=4.96
— d
----- SC
-0.5    0.5
SPHERICAL   SINE
ABERRATION CONDITION

Y'=21.63
----- DM
—— DS
-0.5    0.5
ASTIGMATISM

Y'=21.63
-5.0    5.0
DISTORTION %

FNO=6.80
— d
----- SC
-0.5    0.5
SPHERICAL   SINE
ABERRATION CONDITION

Y'=21.63
----- DM
—— DS
-0.5    0.5
ASTIGMATISM

Y'=21.63
-5.0    5.0
DISTORTION %

EFFECTIVE FNO=3.67
SPHERICAL SINE
ABERRATION CONDITION
— d
----- SC

Y'=21.63
ASTIGMATISM
----- DM
— DS

Y'=21.63
DISTORTION %

EFFECTIVE FNO=5.10
SPHERICAL SINE
ABERRATION CONDITION
— d
----- SC

Y'=21.63
ASTIGMATISM
----- DM
— DS

Y'=21.63
DISTORTION %

EFFECTIVE FNO=6.97
SPHERICAL SINE
ABERRATION CONDITION
— d
----- SC

Y'=21.63
ASTIGMATISM
----- DM
— DS

Y'=21.63
DISTORTION %

FNO=3.62

Y'=21.63

Y'=21.63

FNO=6.03

Y'=21.63

Y'=21.63

FNO=9.41

Y'=21.63

Y'=21.63

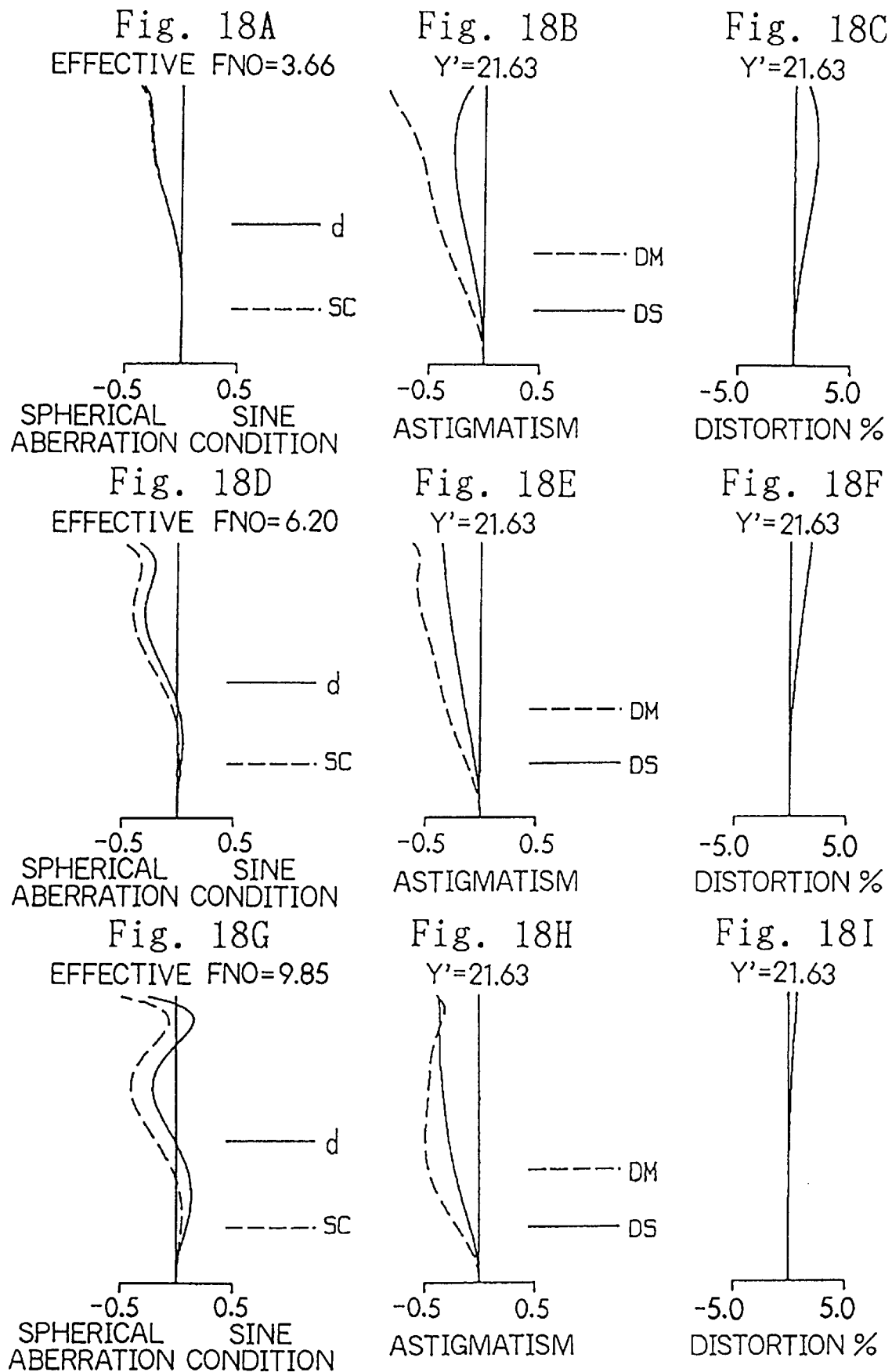

EFFECTIVE FNO=4.60

Y'=22.37

Y'=22.37

EFFECTIVE FNO=5.82

Y'=22.43

Y'=22.43

EFFECTIVE FNO=7.44

Y'=22.26

Y'=22.26

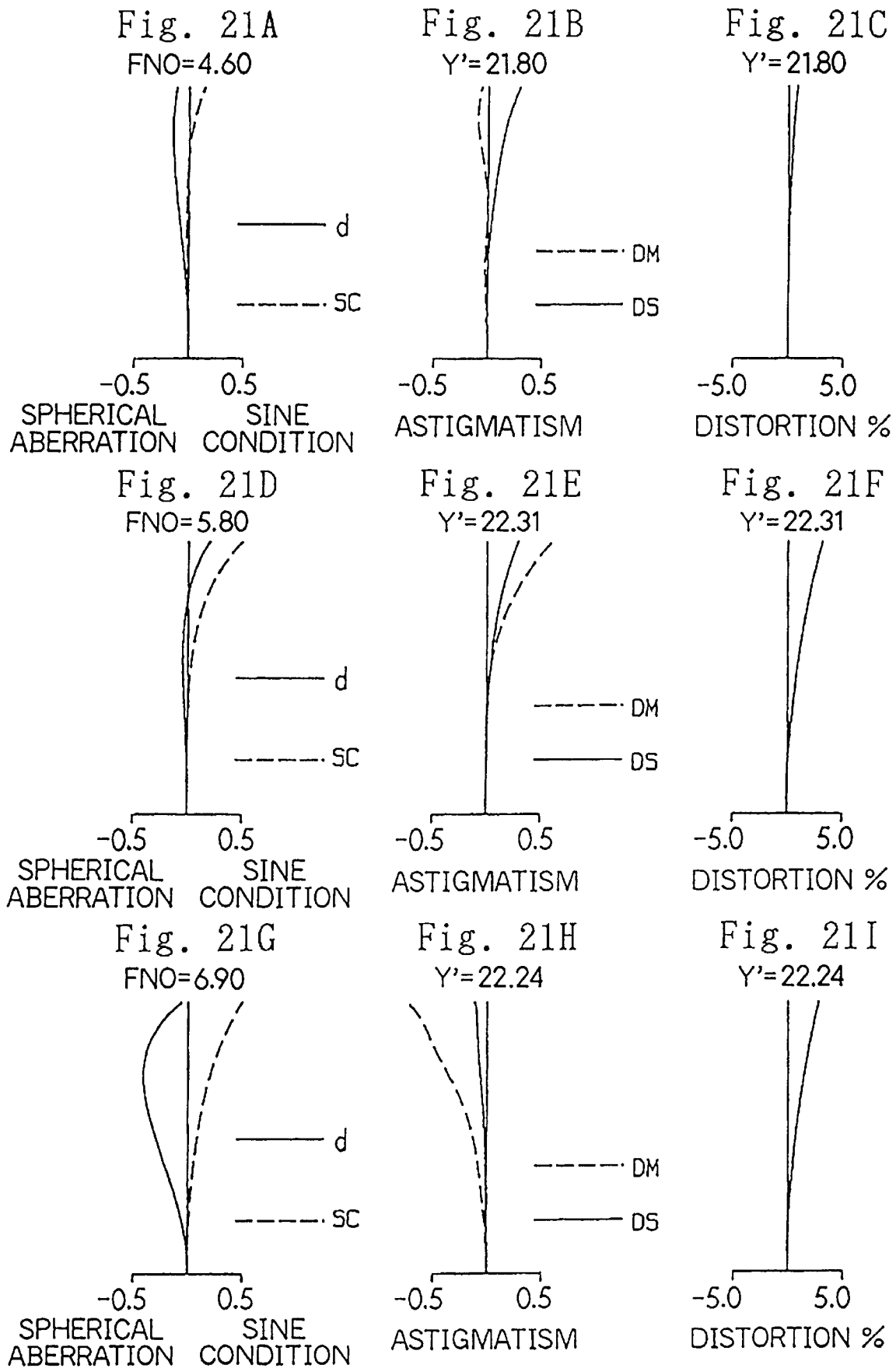

FNO=4.60

—— d
----- SC

-0.5  0.5
SPHERICAL  SINE
ABERRATION  CONDITION

Y'=21.71

----- DM
—— DS

-0.5  0.5
ASTIGMATISM

Y'=21.71

-5.0  5.0
DISTORTION %

FNO=5.80

—— d
----- SC

-0.5  0.5
SPHERICAL  SINE
ABERRATION  CONDITION

Y'=22.28

----- DM
—— DS

-0.5  0.5
ASTIGMATISM

Y'=22.28

-5.0  5.0
DISTORTION %

FNO=6.90

—— d
----- SC

-0.5  0.5
SPHERICAL  SINE
ABERRATION  CONDITION

Y'=22.22

----- DM
—— DS

-0.5  0.5
ASTIGMATISM

Y'=22.22

-5.0  5.0
DISTORTION %

EFFECTIVE FNO=4.40

—— d
----- SC

-0.5    0.5
SPHERICAL    SINE
ABERRATION   CONDITION

Y'=22.25

----- DM
—— DS

-0.5    0.5
ASTIGMATISM

Y'=22.25

-5.0    5.0
DISTORTION %

EFFECTIVE FNO=5.45

—— d
----- SC

-0.5    0.5
SPHERICAL    SINE
ABERRATION   CONDITION

Y'=22.38

----- DM
—— DS

-0.5    0.5
ASTIGMATISM

Y'=22.38

-5.0    5.0
DISTORTION %

EFFECTIVE FNO=7.40

—— d
----- SC

-0.5    0.5
SPHERICAL    SINE
ABERRATION   CONDITION

Y'=22.23

----- DM
—— DS

-0.5    0.5
ASTIGMATISM

Y'=22.23

-5.0    5.0
DISTORTION %

FNO=5.00

— d
----- SC

-0.5  0.5
SPHERICAL  SINE
ABERRATION  CONDITION

Y'=21.74

----- DM
— DS

-0.5  0.5
ASTIGMATISM

Y'=21.74

-5.0  5.0
DISTORTION %

FNO=5.80

— d
----- SC

-0.5  0.5
SPHERICAL  SINE
ABERRATION  CONDITION

Y'=22.26

----- DM
— DS

-0.5  0.5
ASTIGMATISM

Y'=22.26

-5.0  5.0
DISTORTION %

FNO=7.30

— d
----- SC

-0.5  0.5
SPHERICAL  SINE
ABERRATION  CONDITION

Y'=22.21

----- DM
— DS

-0.5  0.5
ASTIGMATISM

Y'=22.21

-5.0  5.0
DISTORTION %

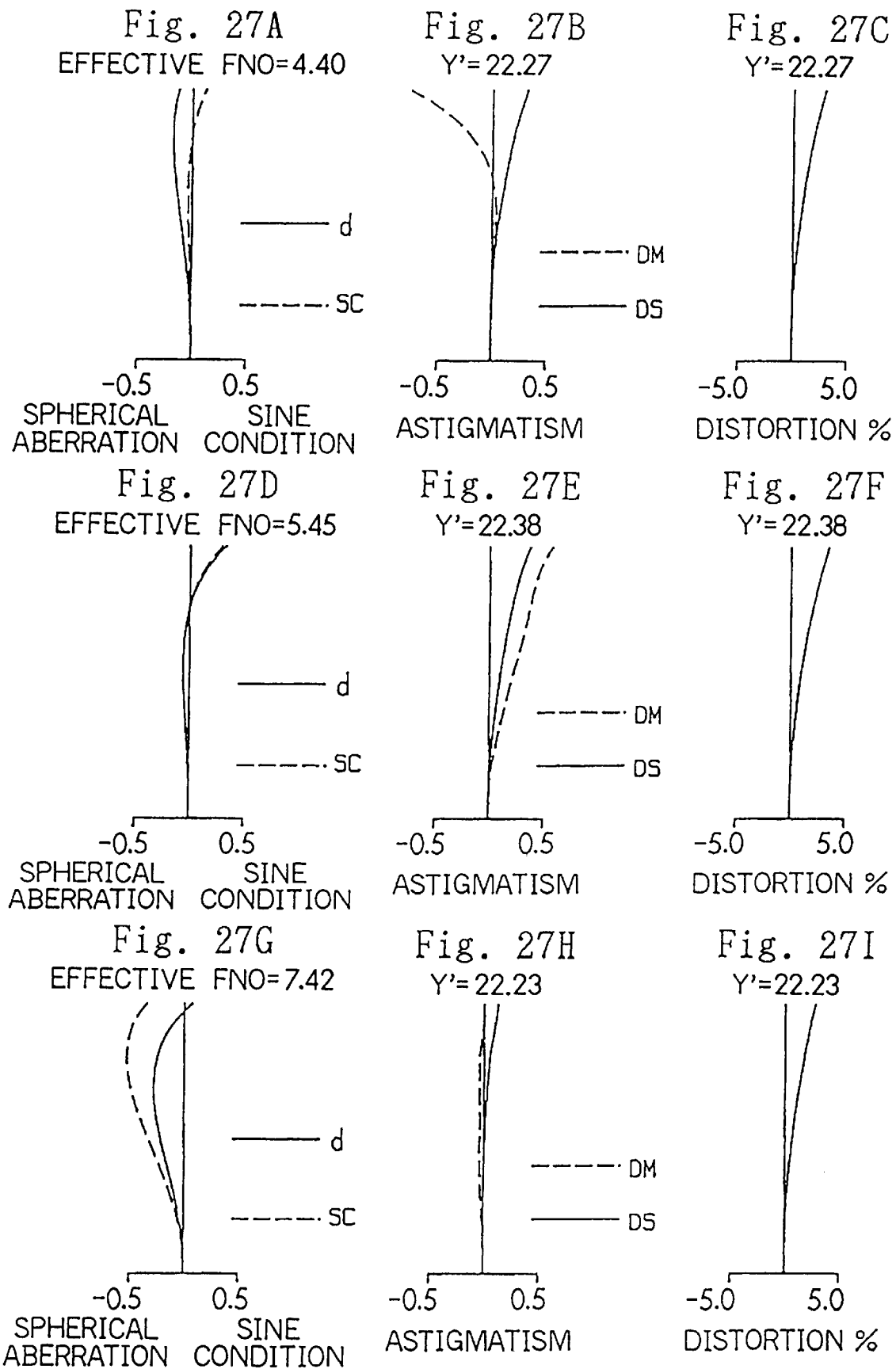

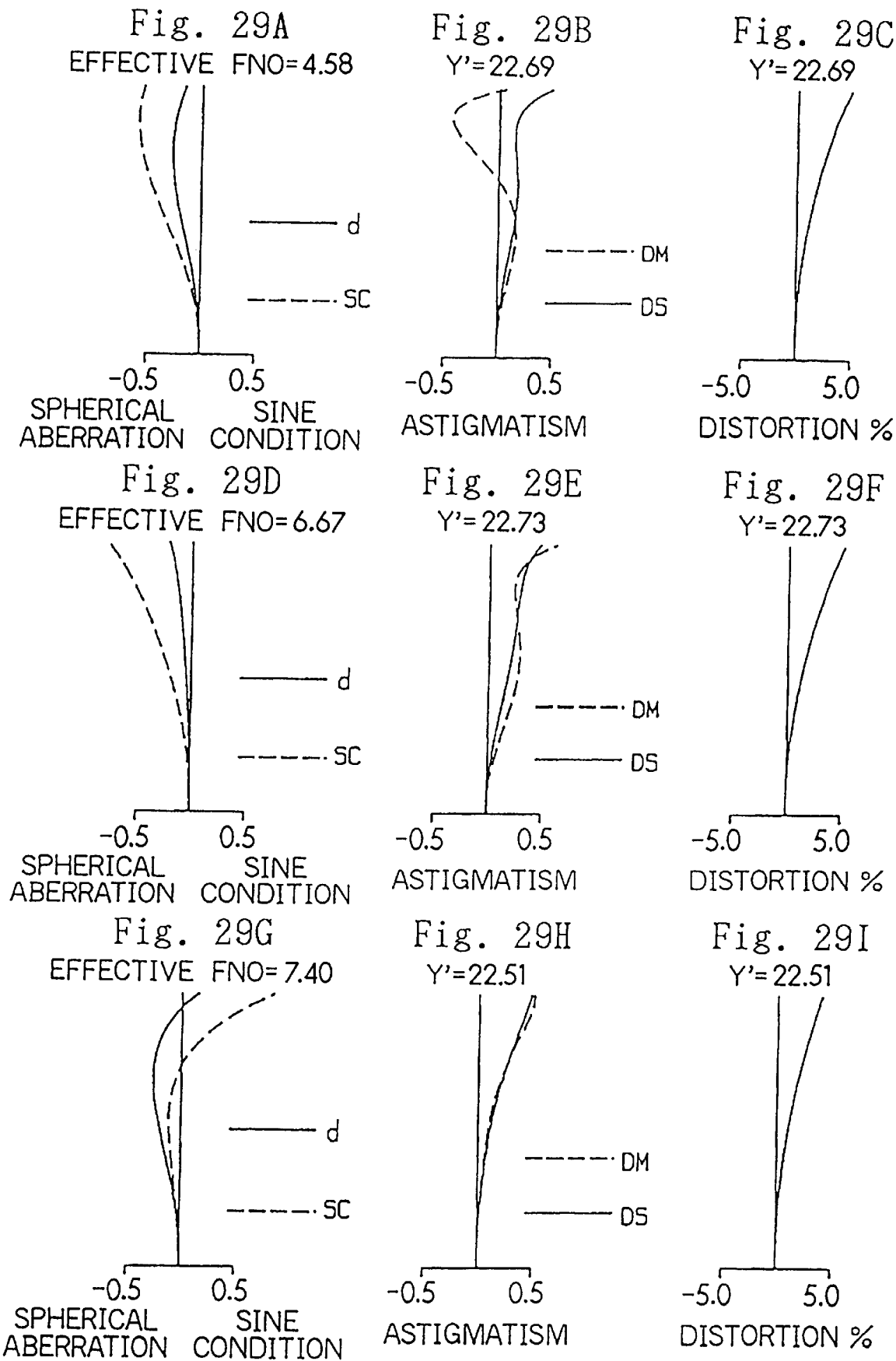

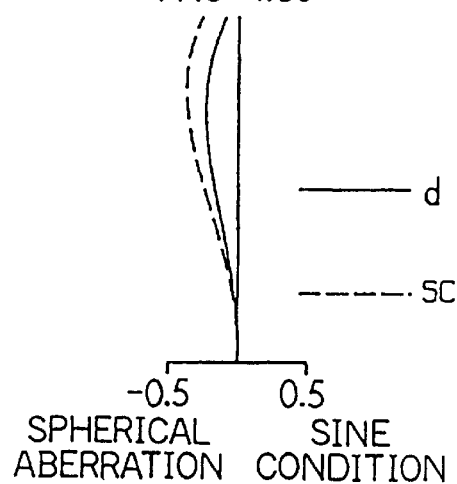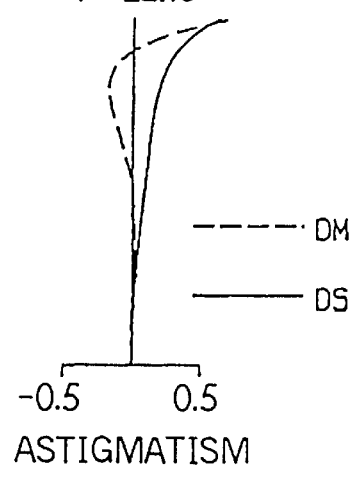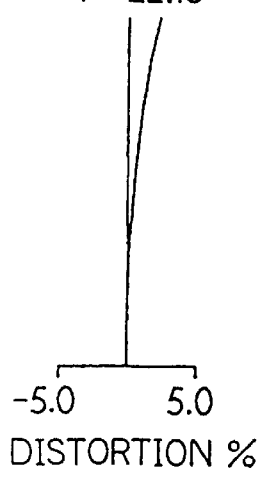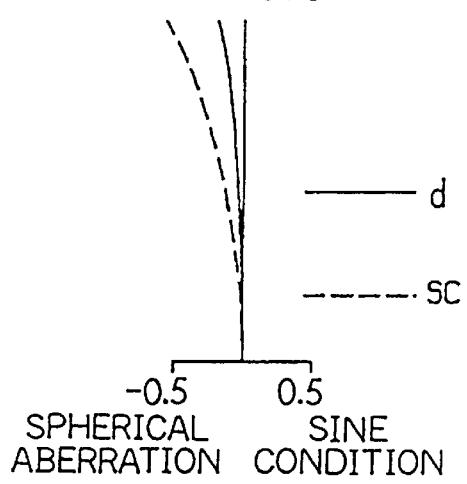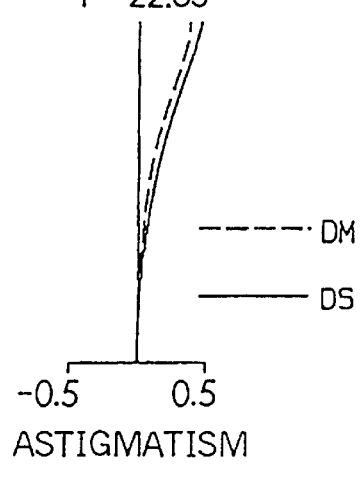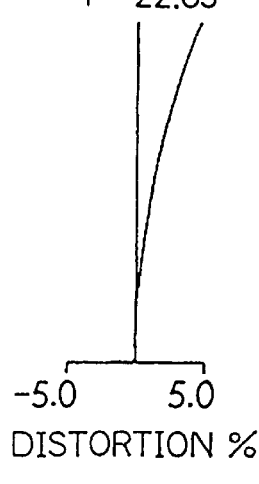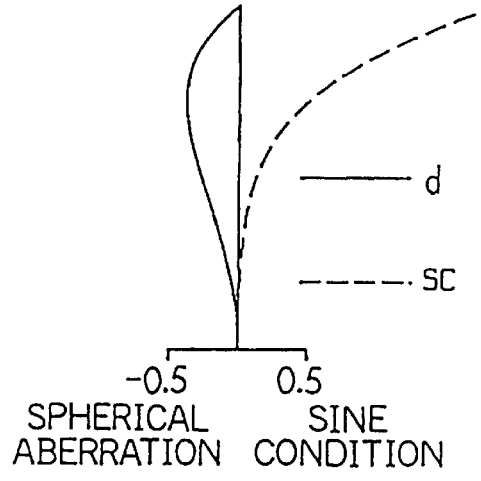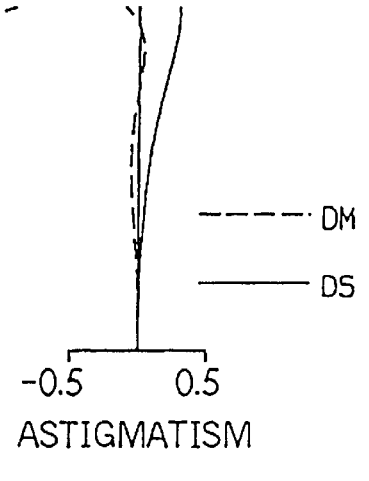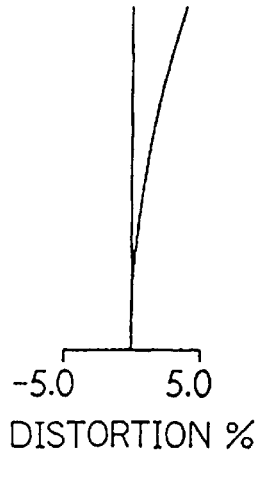

FNO=4.60

-0.5    0.5
SPHERICAL    SINE
ABERRATION   CONDITION

Y'=22.09

-0.5    0.5
ASTIGMATISM

Y'=22.09

-5.0    5.0
DISTORTION %

FNO=5.60

-0.5    0.5
SPHERICAL    SINE
ABERRATION   CONDITION

Y'=22.60

-0.5    0.5
ASTIGMATISM

Y'=22.60

-5.0    5.0
DISTORTION %

FNO=6.70

-0.5    0.5
SPHERICAL    SINE
ABERRATION   CONDITION

Y'=22.46

-0.5    0.5
ASTIGMATISM

Y'=22.46

-5.0    5.0
DISTORTION %

EFFECTIVE FNO=3.88

—— d
----- SC

-0.5  0.5
SPHERICAL    SINE
ABERRATION  CONDITION

Y'=22.69

----- DM
—— DS

-0.5  0.5
ASTIGMATISM

Y'=22.69

-5.0  5.0
DISTORTION %

EFFECTIVE FNO=4.69

—— d
----- SC

-0.5  0.5
SPHERICAL    SINE
ABERRATION  CONDITION

Y'=22.71

----- DM
—— DS

-0.5  0.5
ASTIGMATISM

Y'=22.71

-5.0  5.0
DISTORTION %

EFFECTIVE FNO=7.42

—— d
----- SC

-0.5  0.5
SPHERICAL    SINE
ABERRATION  CONDITION

Y'=22.48

----- DM
—— DS

-0.5  0.5
ASTIGMATISM

Y'=22.48

-5.0  5.0
DISTORTION %

FNO=4.60

SPHERICAL ABERRATION
SINE CONDITION

Y'=21.60

ASTIGMATISM

Y'=21.60

DISTORTION %

FNO=5.60

SPHERICAL ABERRATION
SINE CONDITION

Y'=21.60

ASTIGMATISM

Y'=21.60

DISTORTION %

FNO=6.70

SPHERICAL ABERRATION
SINE CONDITION

Y'=21.60

ASTIGMATISM

Y'=21.60

DISTORTION %

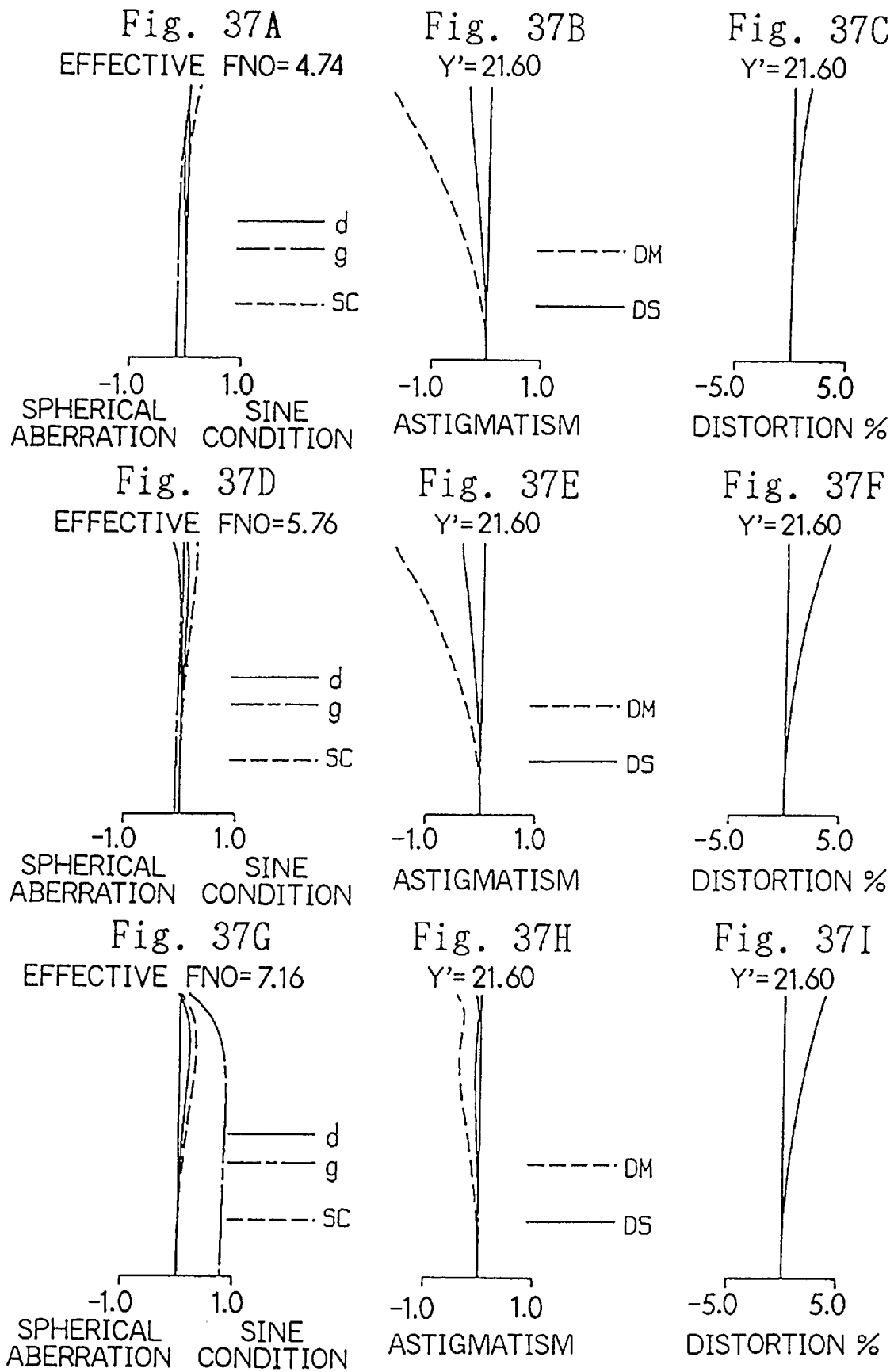

FNO=4.60

-1.0  1.0
SPHERICAL   SINE
ABERRATION  CONDITION

Y'=21.60

-1.0  1.0
ASTIGMATISM

Y'=21.60

-5.0  5.0
DISTORTION %

FNO=5.60

-1.0  1.0
SPHERICAL   SINE
ABERRATION  CONDITION

Y'=21.60

-1.0  1.0
ASTIGMATISM

Y'=21.60

-5.0  5.0
DISTORTION %

FNO=6.70

-1.0  1.0
SPHERICAL   SINE
ABERRATION  CONDITION

Y'=21.60

-1.0  1.0
ASTIGMATISM

Y'=21.60

-5.0  5.0
DISTORTION %

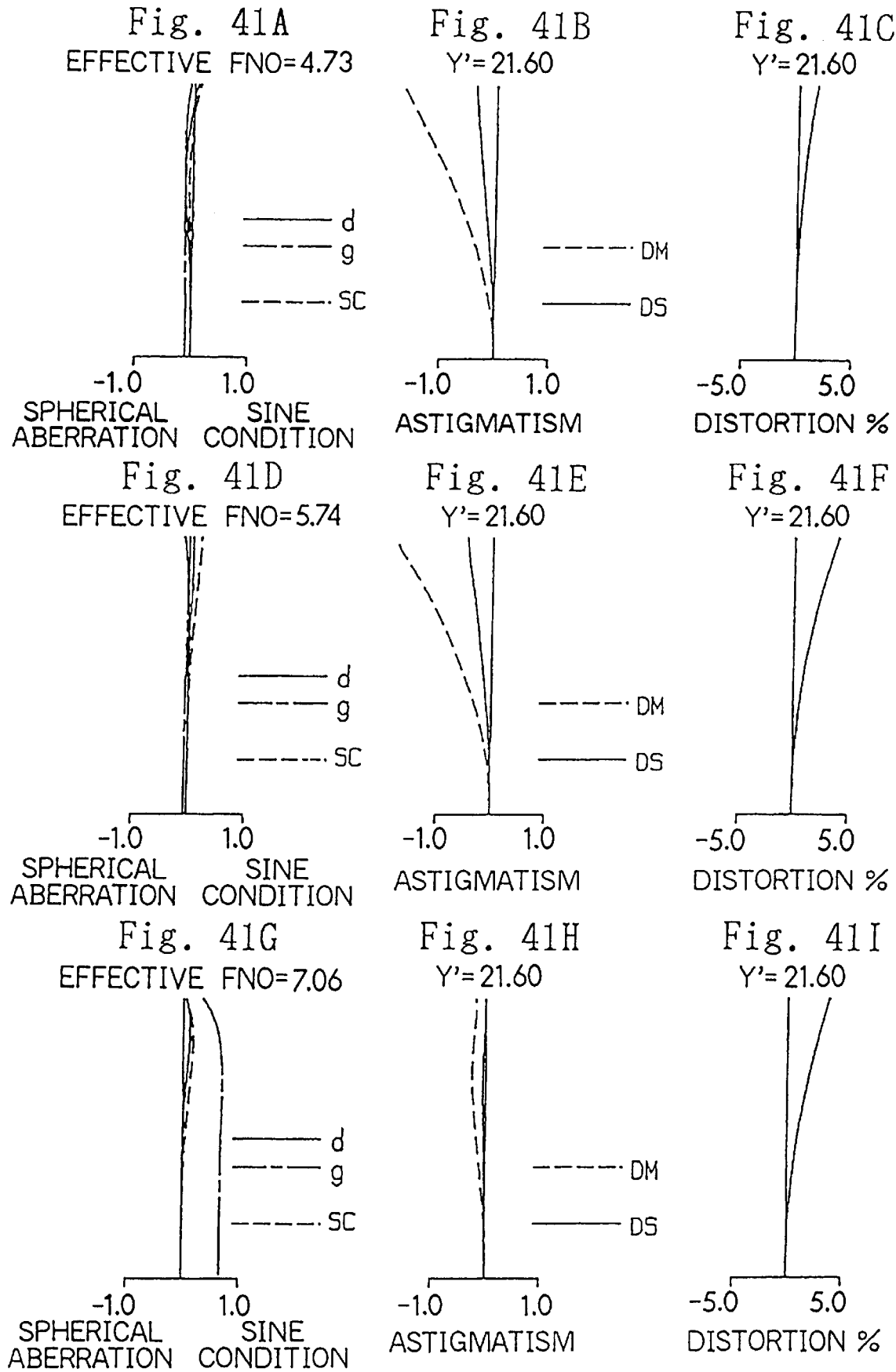

FNO=4.60

— d
– – g
– – – SC

SPHERICAL ABERRATION   SINE CONDITION

Y'=21.60

– – – DM
— DS

ASTIGMATISM

Y'=21.60

DISTORTION %

FNO=5.60

— d
– – g
– – – SC

SPHERICAL ABERRATION   SINE CONDITION

Y'=21.60

– – – DM
— DS

ASTIGMATISM

Y'=21.60

DISTORTION %

FNO=6.70

— d
– – g
– – – SC

SPHERICAL ABERRATION   SINE CONDITION

Y'=21.60

– – – DM
— DS

ASTIGMATISM

Y'=21.60

DISTORTION %

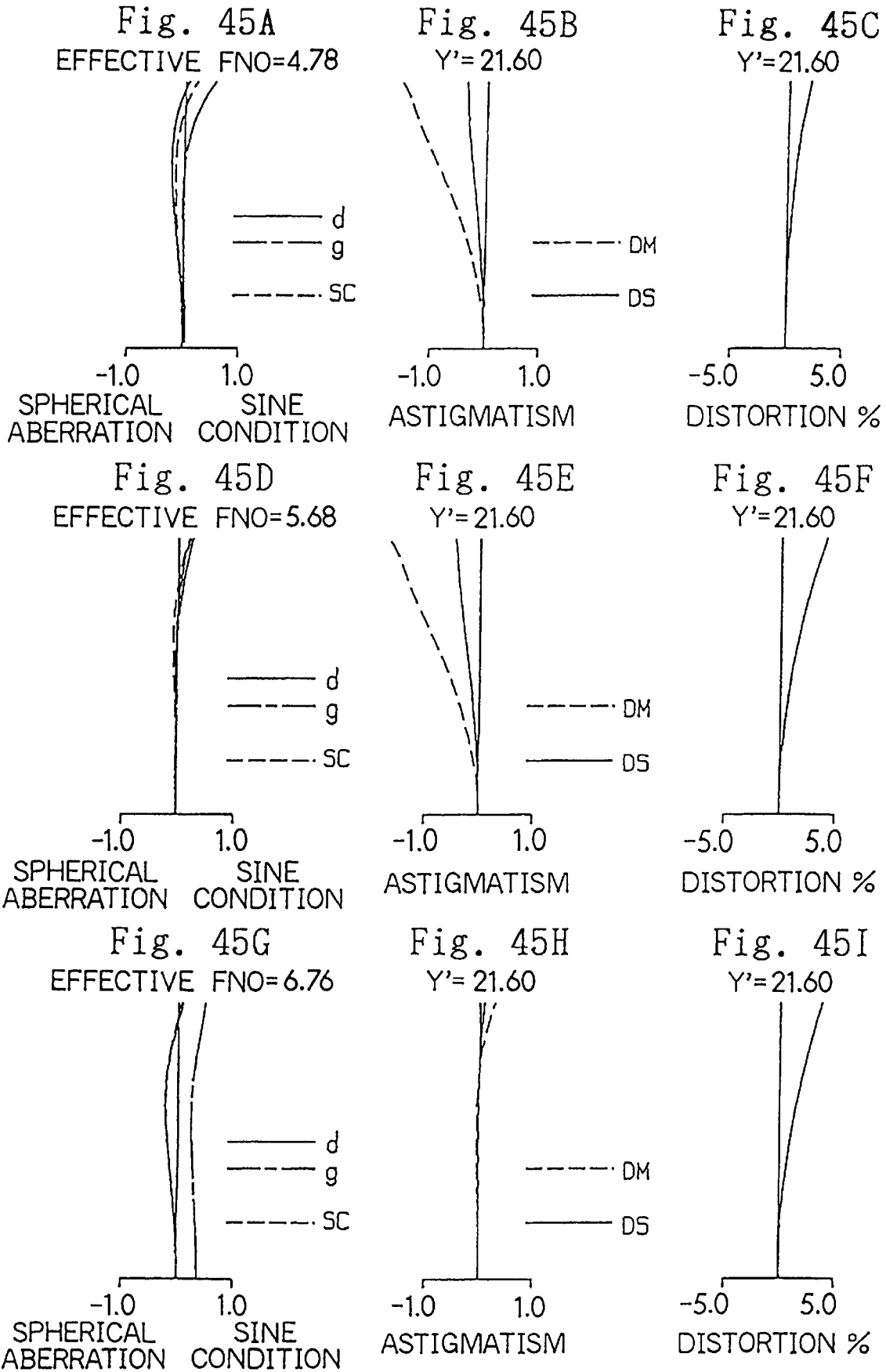

ZOOM LENS SYSTEM

This is a continuation of application Ser. No. 08/385,059, filed on Feb. 7, 1995, now abandoned.

BACKGROUND OF THE INVENTION

1. Field of the Invention

The present invention relates to a zoom lens system, and more particularly to a zoom lens system which is capable of a close photography.

2. Description of the Prior Art

Conventionally, a zoom lens system has widely been used in a 35 mm camera. However, in the conventional zoom lens system, the shortest object distance is long and the highest magnification is low compared to a fixed focal length lens system having approximately the same focal length. To compensate for this defect, a method (so called macro method) is employed to reduce the shortest object distance by moving along the optical axis a lens unit other than the lens unit moved for focusing.

However, according to the conventional macro method, since two kinds of focusing operations: a normal focusing operation and a focusing operation for a very close object are provided, the structure of the lens barrel is necessarily very complicated. In addition, since the shorter the object distance is, the more remarkable the generation of aberration is, sufficient image formation performance cannot be obtained in close photography.

Further, it is generally known that the first lens unit is moved out in focusing of the conventional zoom lens system. Although this method is simple and easy, sufficient image formation performance cannot be obtained in close photography since the image plane inclines.

Conventionally, in many high-magnification zoom lens systems including a long focal length, focusing is performed according to a front lens moving out method where the most object side lens unit (front lens) is moved out.

However, this method is not suitable for a zoom lens system of automatic focusing type since the front lens of the high-magnification zoom lens is heavy and the heavy lens unit must be moved. Since the moving out amount of the front lens is necessarily large, the size of the lens barrel increases. Further, since the optical performance deteriorates in close photography, it is impossible to secure sufficiently excellent performance up to a sufficiently high enlargement magnification.

SUMMARY OF THE INVENTION

An object of the present invention is to provide a compact zoom lens system having an excellent close photography capability in the entire zoom range.

Another object of the present invention is to provide a zoom lens system having excellent image formation performance for from infinity to a very close object with a simple focusing method.

A still another object of the present invention is to provide a zoom lens system where focusing is performed by moving a light lens unit and excellent optical performance is secured up to a high enlargement magnification.

According to one feature of the present invention, a zoom lens system includes a lens group of a positive refractive power. The lens group comprises from an object side a lens unit and a positive lens element convex to the object side, and wherein focusing for a close object is performed by moving the lens unit toward the object side, and wherein the following condition is fulfilled:

$$0.2 < \frac{r2 + r1}{r2 - r1} < 3.3$$

where r1 is a radius of curvature of an object side surface of the positive lens element and r2 is a radius of curvature of an image side surface of the positive lens element.

BRIEF DESCRIPTION OF THE DRAWINGS

These and other objects and features of this invention will become clear from the following description, taken in conjunction with the preferred embodiments with reference to the accompanied drawings in which:

FIGS. 8A to 8C show aberration curves of the first embodiment of the present invention focused on infinity at the shortest focal length condition;

FIGS. 8D to 8F show aberration curves of the first embodiment of the present invention focused on infinity at the middle focal length condition;

FIGS. 8G to 8I show aberration curves of the first embodiment of the present invention focused on infinity at the longest focal length condition;

FIGS. 10A to 10C show aberration curves of the second embodiment of the present invention focused on infinity at the shortest focal length condition;

FIGS. 10D to 10F show aberration curves of the second embodiment of the present invention focused on infinity at the middle focal length condition;

FIGS. 10G to 10I show aberration curves of the second embodiment of the present invention focused on infinity at the longest focal length condition;

FIGS. 12A to 12C show aberration curves of the third embodiment of the present invention focused on infinity at the shortest focal length condition;

FIGS. 12D to 12F show aberration curves of the third embodiment of the present invention focused on infinity at the middle focal length condition;

FIGS. 12G to 12I show aberration curves of the third embodiment of the present invention focused on infinity at the longest focal length condition;

FIGS. 13A to 13C show aberration curves of the fourth embodiment of the present invention focused on a close object at the shortest focal length condition;

FIGS. 13D to 13F show aberration curves of the fourth embodiment of the present invention focused on a close object at the middle focal length condition;

FIGS. 13G to 13I show aberration curves of the fourth embodiment of the present invention focused on a close object at the longest focal length condition;

FIGS. 18A to 18C show aberration curves of the sixth embodiment of the present invention focused on infinity at the shortest focal length condition;

FIGS. 18D to 18F show aberration curves of the sixth embodiment of the present invention focused on infinity at the middle focal length condition;

FIGS. 18G to 18I show aberration curves of the sixth embodiment of the present invention focused on infinity at the longest focal length condition;

FIGS. 21A to 21C show aberration curves of the seventh embodiment of the present invention at the shortest focal length condition when focusing is performed so that the magnification is −0.25×;

FIGS. 21D to 21F show aberration curves of the seventh embodiment of the present invention at the middle focal length condition when focusing is performed so that the magnification is −0.25×;

FIGS. 21G to 21I show aberration curves of the seventh embodiment of the present invention at the longest focal length condition when focusing is performed so that the magnification is −0.25×;

FIGS. 27A to 27C show aberration curves of the ninth embodiment of the present invention at the shortest focal length condition when focusing is performed so that the magnification is −0.25×;

FIGS. 27D to 27F show aberration curves of the ninth embodiment of the present invention at the middle focal length condition when focusing is performed so that the magnification is −0.25×;

FIGS. 27G to 27I show aberration curves of the ninth embodiment of the present invention at the longest focal length condition when focusing is performed so that the magnification is −0.25×;

FIGS. 29A to 29C show aberration curves of the tenth embodiment of the present invention focused on infinity at the shortest focal length condition;

FIGS. 29D to 29F show aberration curves of the tenth embodiment of the present invention focused on infinity at the middle focal length condition;

FIGS. 29G to 29I show aberration curves of the tenth embodiment of the present invention focused on infinity at the longest focal length condition;

FIGS. 30A to 30C show aberration curves of the tenth embodiment of the present invention at the shortest focal length condition when focusing is performed so that the magnification is −0.25×;

FIGS. 30D to 30F show aberration curves of the tenth embodiment of the present invention at the middle focal length condition when focusing is performed so that the magnification is −0.25×;

FIGS. 30G to 30I show aberration curves of the tenth embodiment of the present invention at the longest focal length condition when focusing is performed so that the magnification is −0.25×;

FIGS. 37A to 37C show aberration curves of the twelfth embodiment focused on a close object at the shortest focal length condition;

FIGS. 37D to 37F show aberration curves of the twelfth embodiment focused on a close object at the middle focal length condition;

FIGS. 37G to 37I show aberration curves of the twelfth embodiment focused on a close object at the longest focal length condition;

FIGS. 41A to 41C show aberration curves of the thirteenth embodiment focused on a close object at the shortest focal length condition;

FIGS. 41D to 41F show aberration curves of the thirteenth embodiment focused on a close object at the middle focal length condition;

FIGS. 41G to 41I show aberration curves of the thirteenth embodiment focused on a close object at the longest focal length condition;

FIGS. 45A to 45C show aberration curves of the fourteenth embodiment focused on a close object at the shortest focal length condition;

FIGS. 45D to 45F show aberration curves of the fourteenth embodiment focused on a close object at the middle focal length condition; and FIGS. 45G to 45I show aberration curves of the fourteenth embodiment focused on a close object at the longest focal length condition.

DESCRIPTION OF THE PREFERRED EMBODIMENTS

Figure 1:
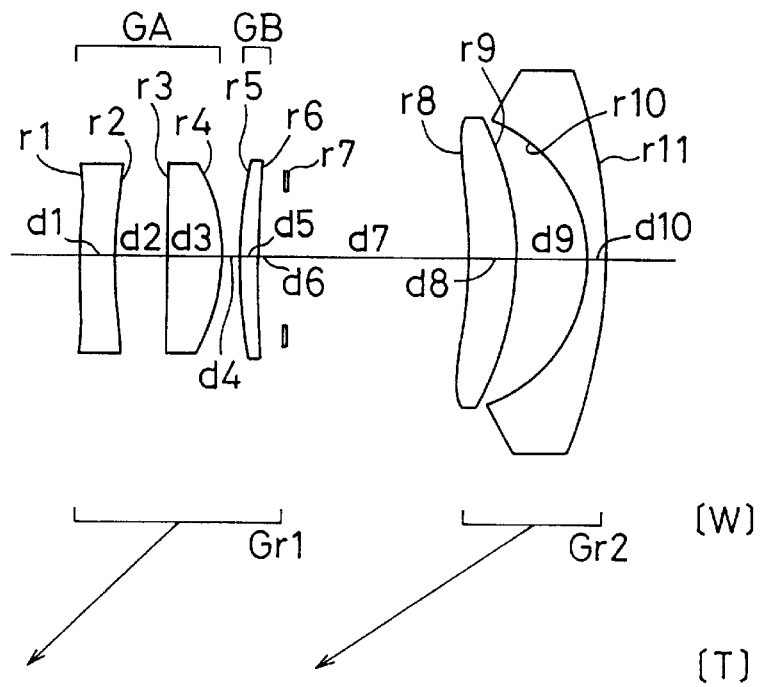
FIG. 1 shows the lens arrangement of a first embodiment of the present invention focused on infinity on the shorter focal length side.
Figure 2:
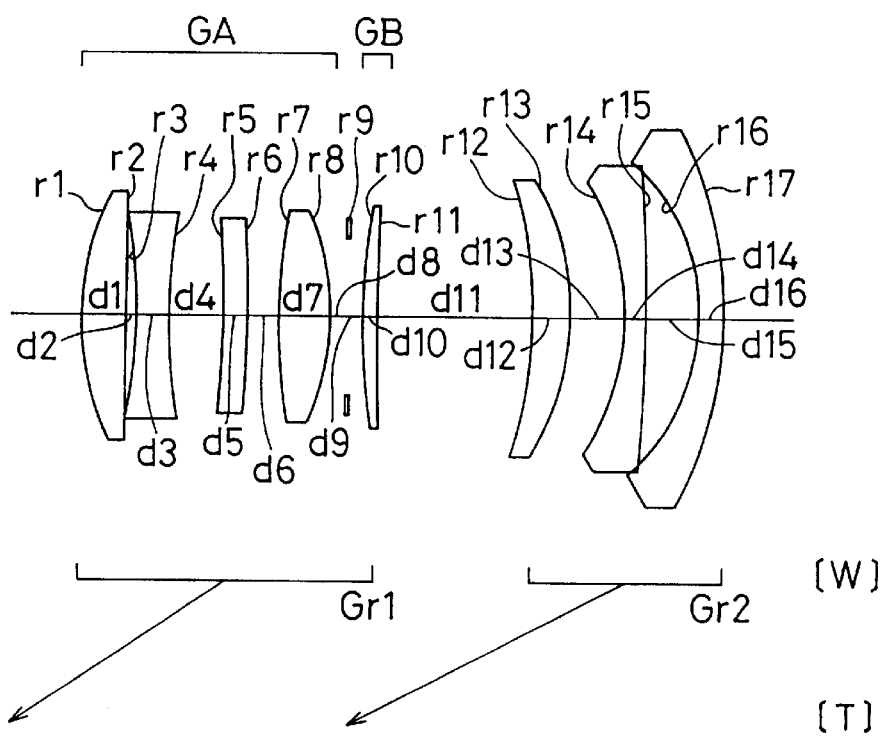
FIG. 2 shows the lens arrangement of a second embodiment of the present invention focused on infinity on the shorter focal length side.
Figure 3:
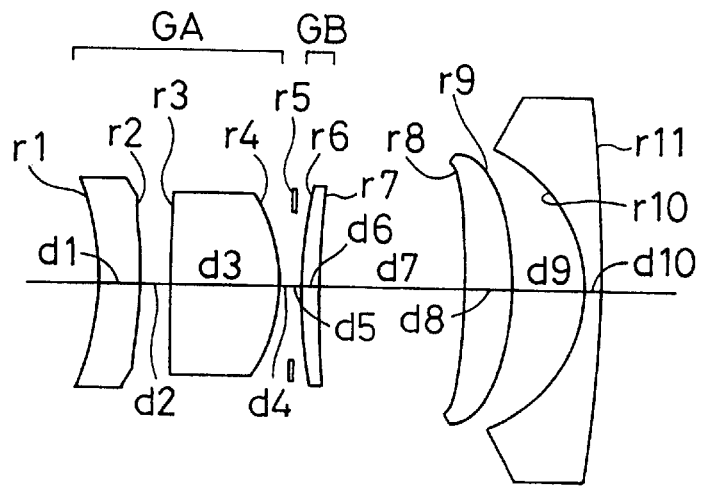
FIG. 3 shows the lens arrangement of a third embodiment of the present invention focused on infinity on the shorter focal length side.
Figure 4:
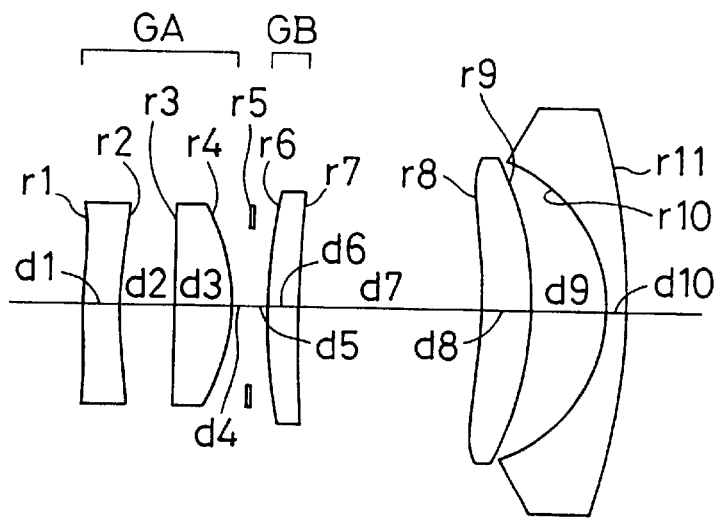
FIG. 4 shows the lens arrangement of a fourth embodiment of the present invention focused on infinity on the shorter focal length side.
Figure 5:
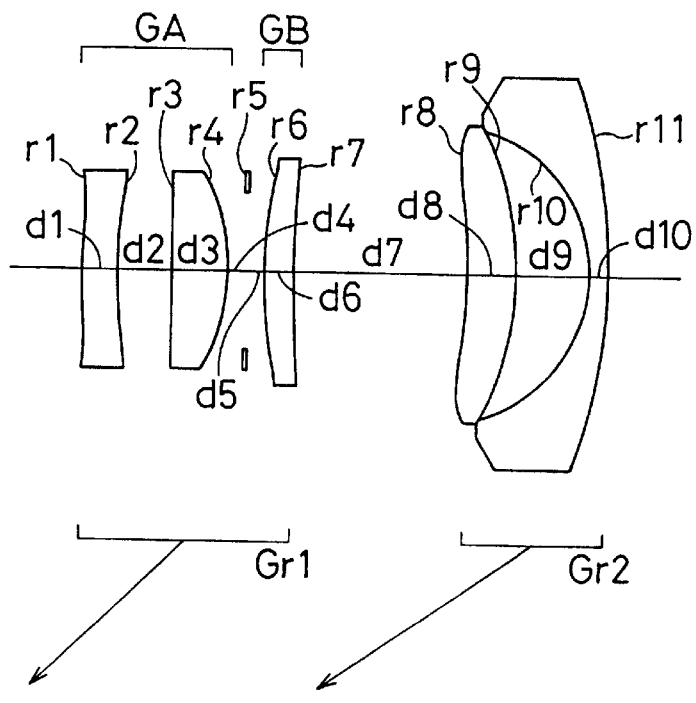
FIG. 5 shows the lens arrangement of a fifth embodiment of the present invention focused on infinity on the shorter focal length side.
Figure 6:
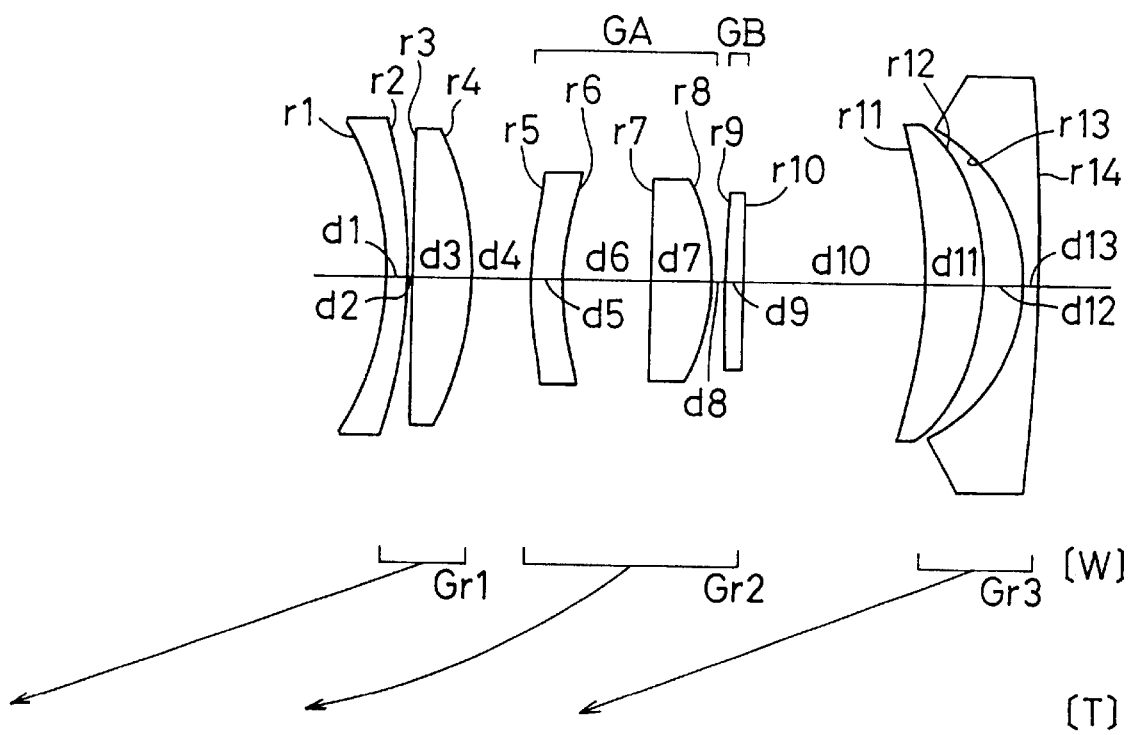
FIG. 6 shows the lens arrangement of a sixth embodiment of the present invention focused on infinity on the shorter focal length side.
Figure 7A:
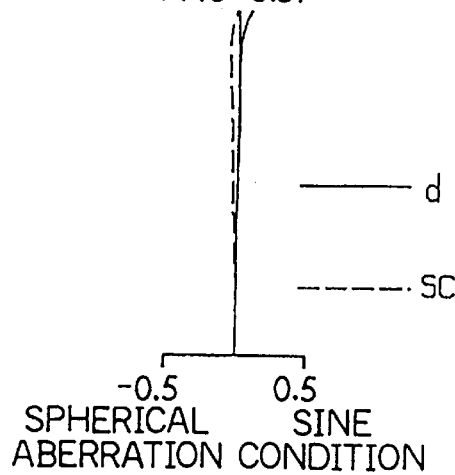
FIGS. 7A to 7C show aberration curves of the first embodiment of the present invention focused on a close object at the shortest focal length condition.
Figure 7B:
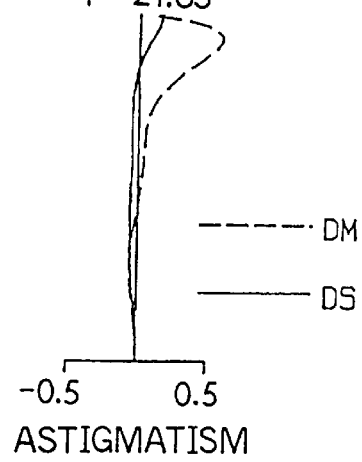
Figure 7C:
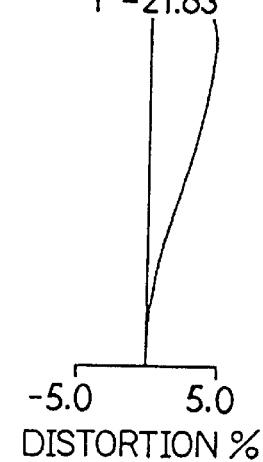
Figure 7D:
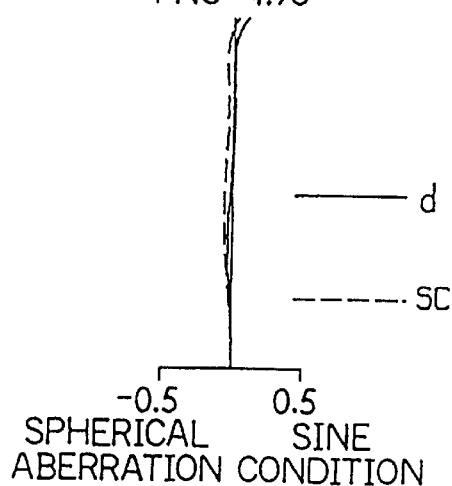
FIGS. 7D to 7F show aberration curves of the first embodiment of the present invention focused on a close object at the middle focal length condition.
Figure 7E:
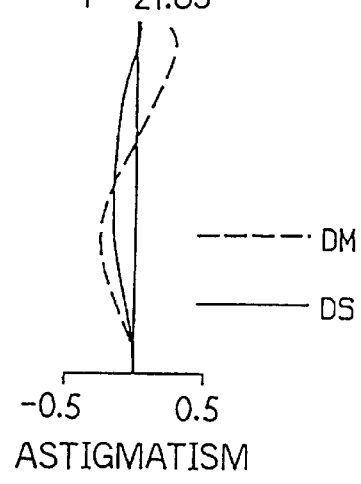
Figure 7F:
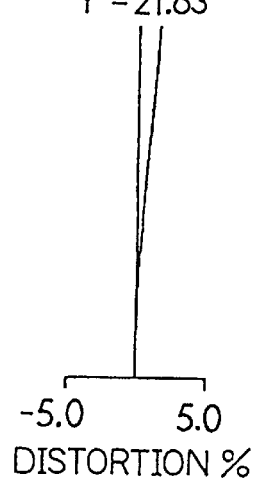
Figure 7G:
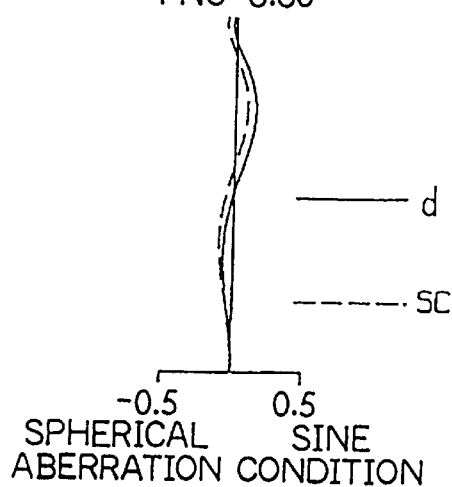
FIGS. 7G to 7I show aberration curves of the first embodiment of the present invention focused on a close object at the longest focal length condition.
Figure 7H:
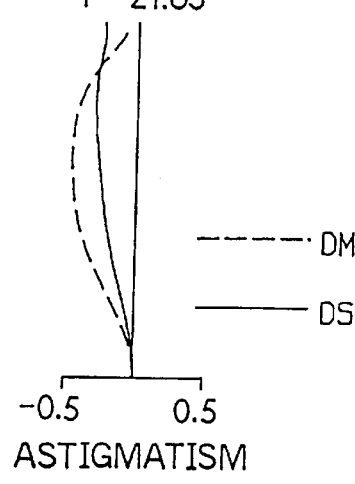
Figure 7I:
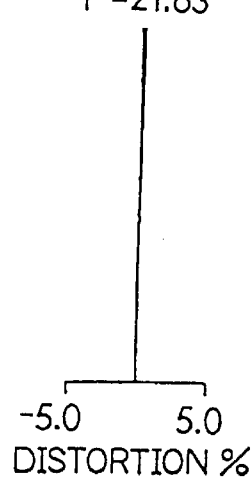
Figure 9A:
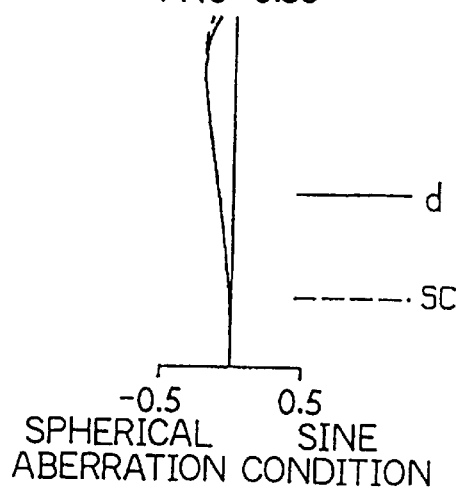
FIGS. 9A to 9C show aberration curves of the second embodiment of the present invention focused on a close object at the shortest focal length condition.
Figure 9B:
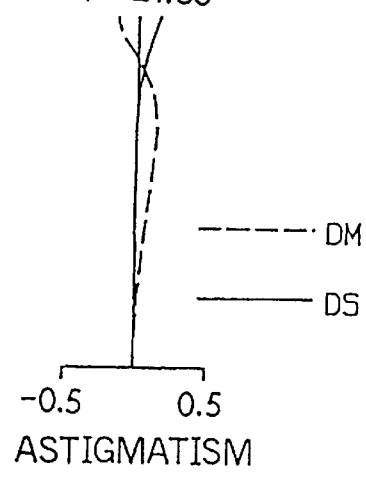
Figure 9C:
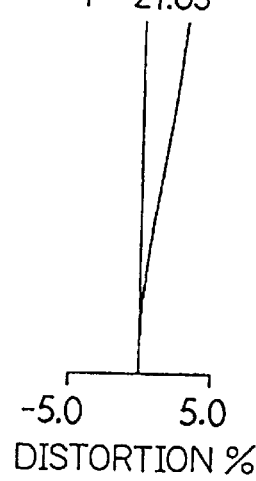
Figure 9D:
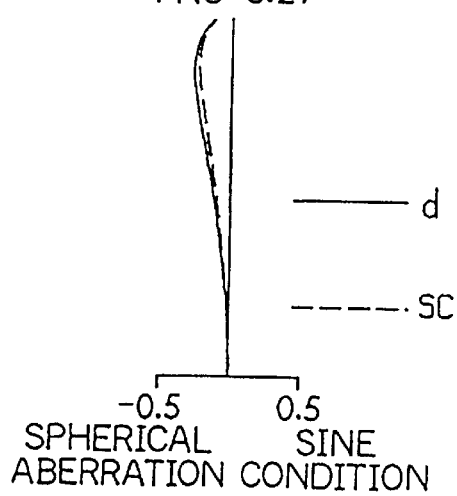
FIGS. 9D to 9F show aberration curves of the second embodiment of the present invention focused on a close object at the middle focal length condition.
Figure 9E:
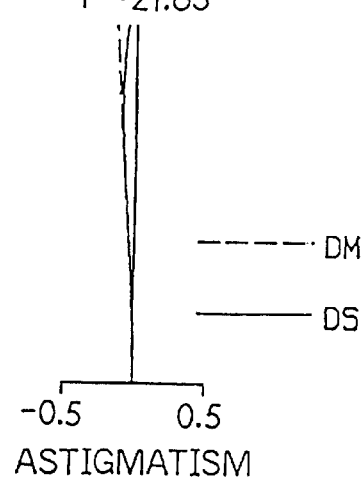
Figure 9F:
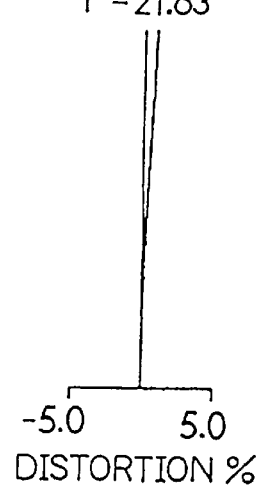
Figure 9G:
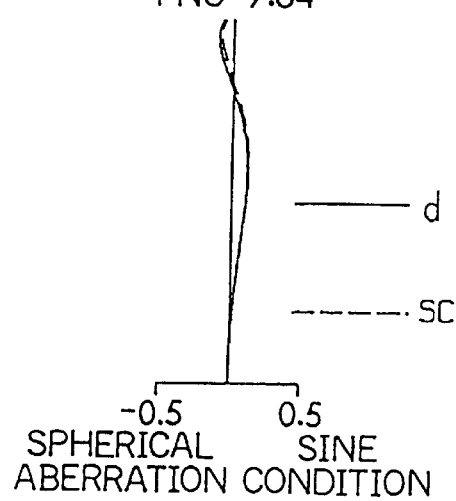
FIGS. 9G to 9I show aberration curves of the second embodiment of the present invention focused on a close object at the longest focal length condition.
Figure 9H:
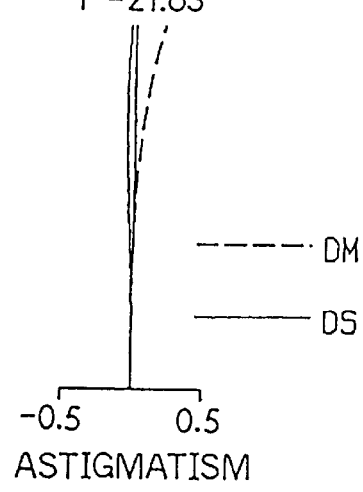
Figure 9I:
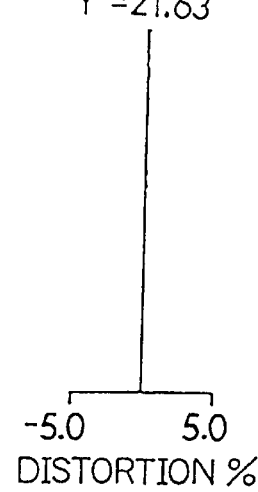
Figure 11A:
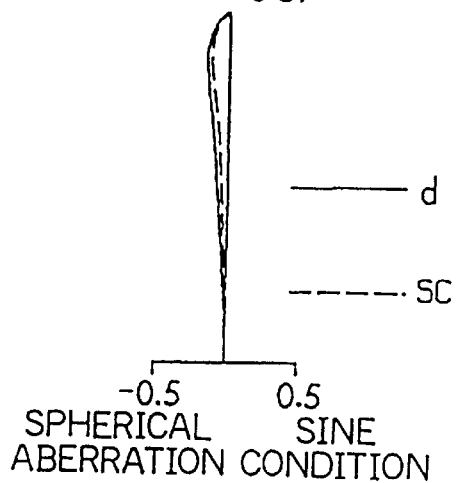
FIGS. 11A to 11C show aberration curves of the third embodiment of the present invention focused on a close object at the shortest focal length condition.
Figure 11B:
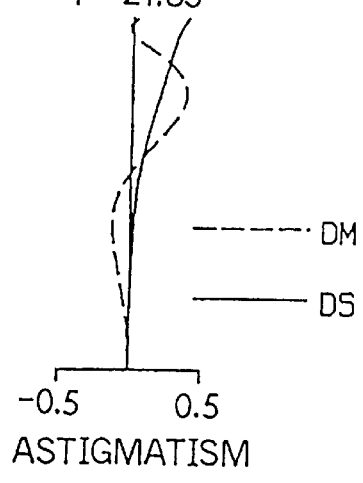
Figure 11C:
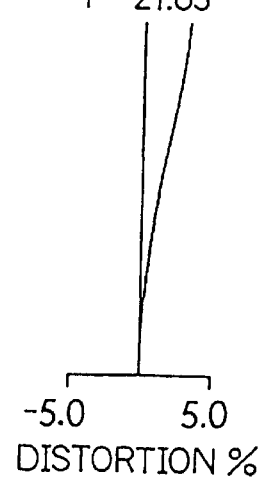
Figure 11D:
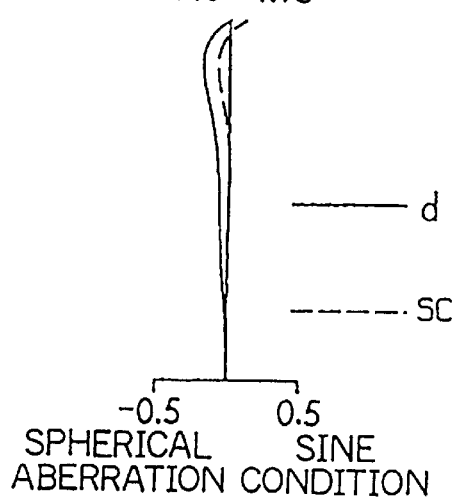
FIGS. 11D to 11F show aberration curves of the third embodiment of the present invention focused on a close object at the middle focal length condition.
Figure 11E:
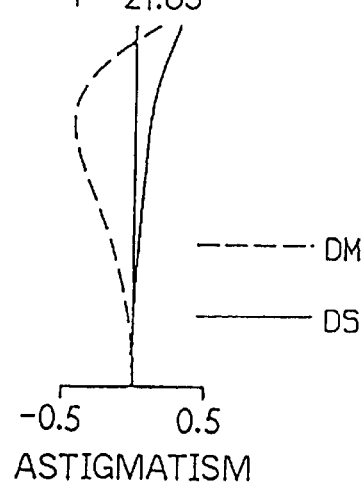
Figure 11F:
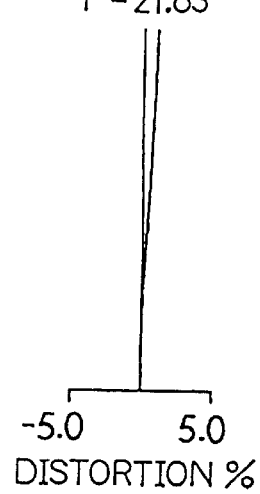
Figure 11G:
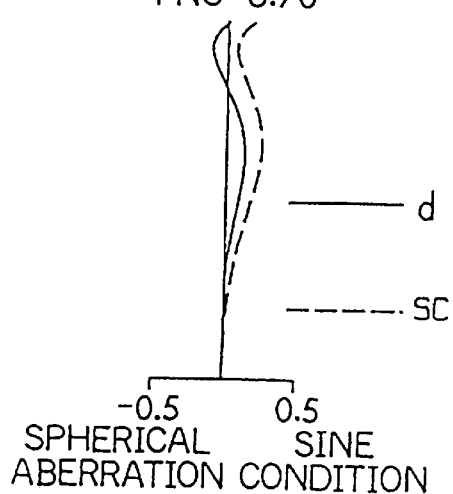
FIGS. 11G to 11I show aberration curves of the third embodiment of the present invention focused on a close object at the longest focal length condition.
Figure 11H:
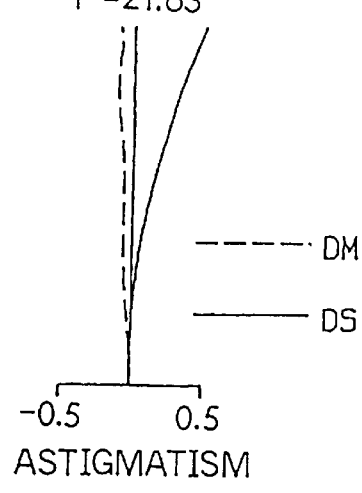
Figure 11I:
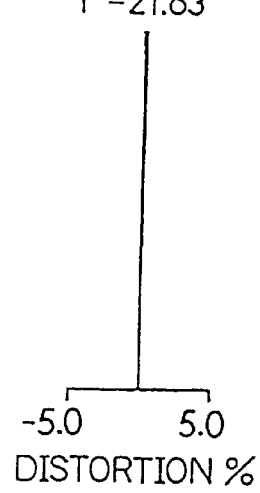
Figure 14A:
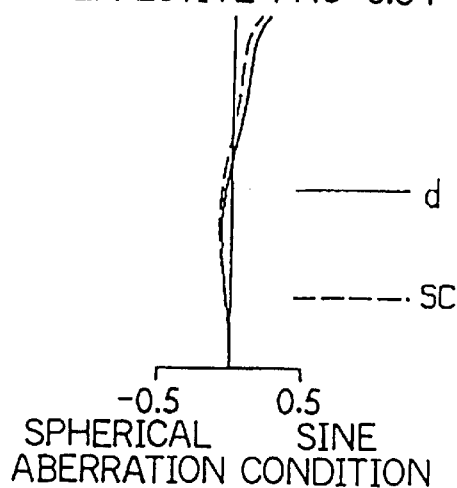
FIGS. 14A to 14C show aberration curves of the fourth embodiment of the present invention focused on infinity at the shortest focal length condition.
Figure 14B:
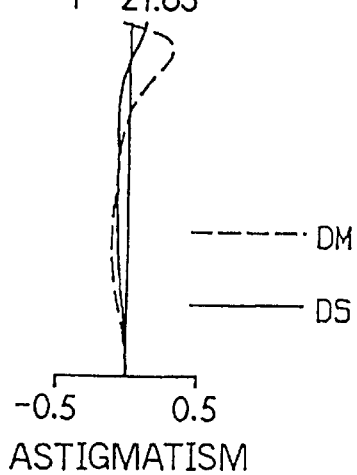
Figure 14C:
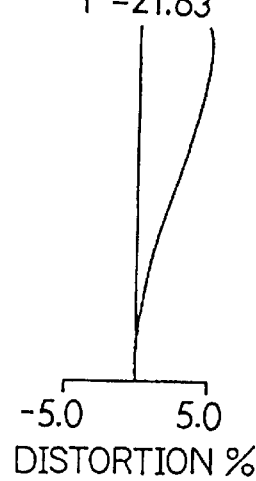
Figure 14D:
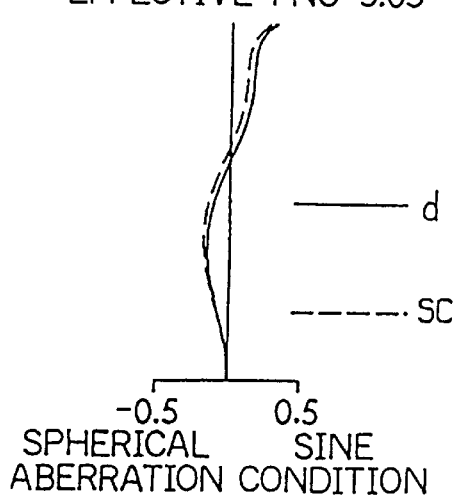
FIGS. 14D to 14F show aberration curves of the fourth embodiment of the present invention focused on infinity at the middle focal length condition.
Figure 14E:
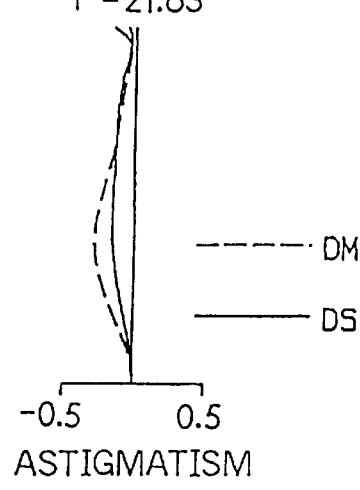
Figure 14F:
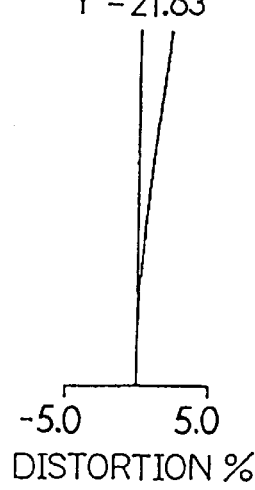
Figure 14G:
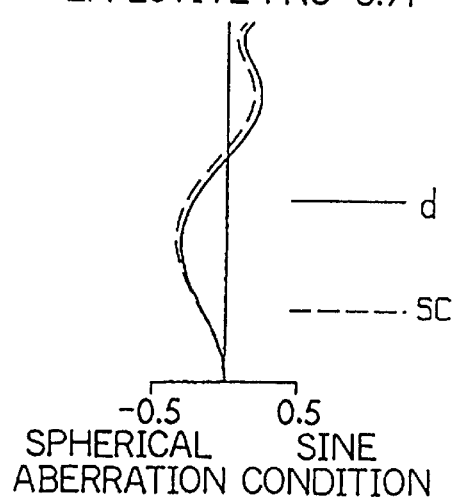
FIGS. 14G to 14I show aberration curves of the fourth embodiment of the present invention focused on infinity at the longest focal length condition.
Figure 14H:
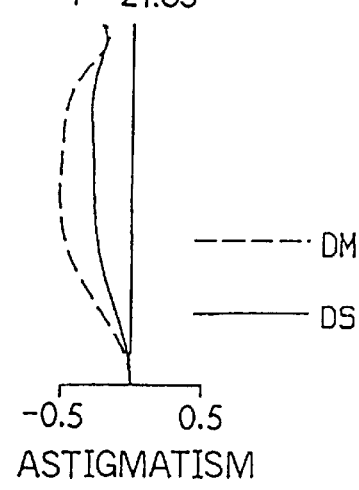
Figure 14I:
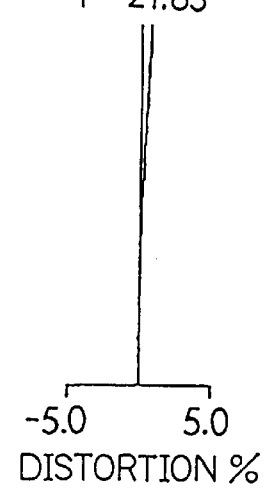
Figure 15A:
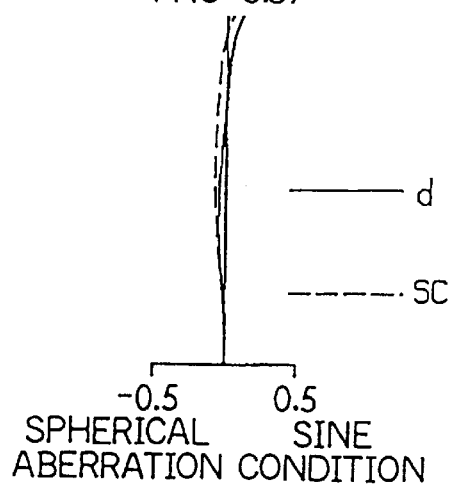
FIGS. 15A to 15C show aberration curves of the fifth embodiment of the present invention focused on a close object at the shortest focal length condition.
Figure 15B:
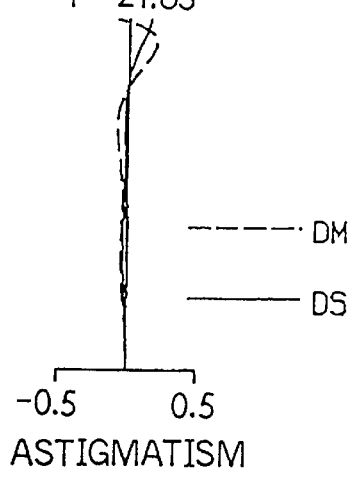
Figure 15C:
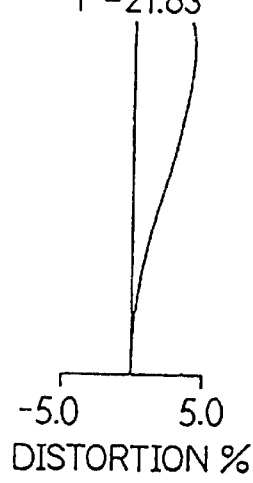
Figure 15D:
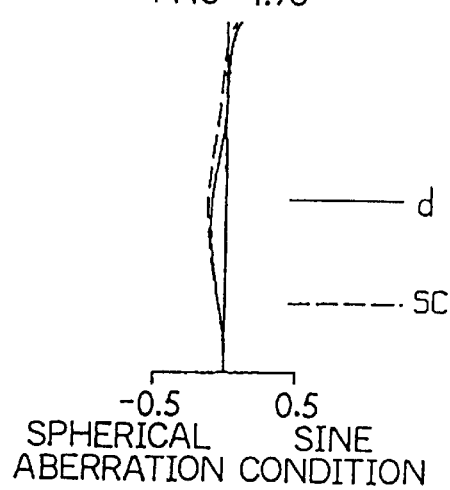
FIGS. 15D to 15F show aberration curves of the fifth embodiment of the present invention focused on a close object at the middle focal length condition.
Figure 15E:
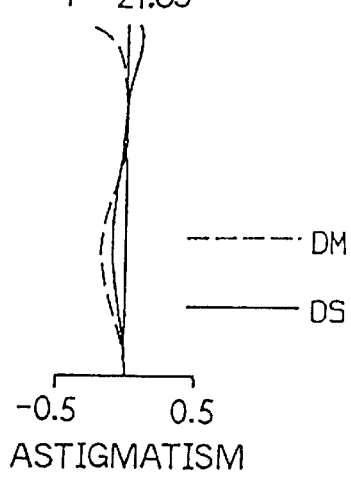
Figure 15F:
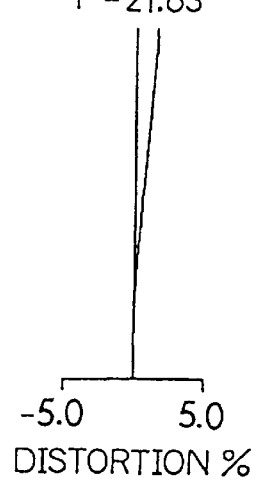
Figure 15G:
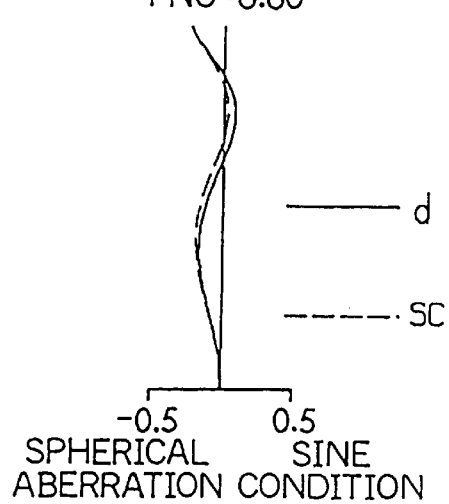
FIGS. 15G to 15I show aberration curves of the fifth embodiment of the present invention focused on a close object at the longest focal length condition.
Figure 15H:
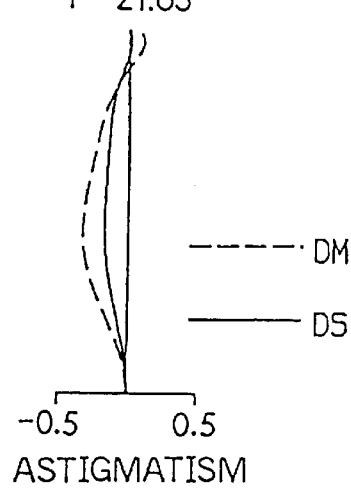
Figure 15I:
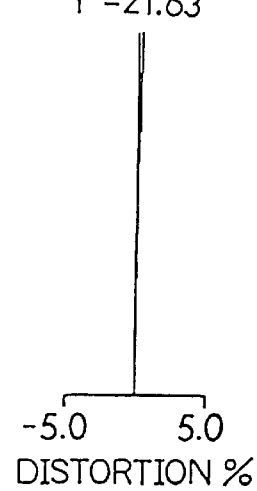
Figure 16A:
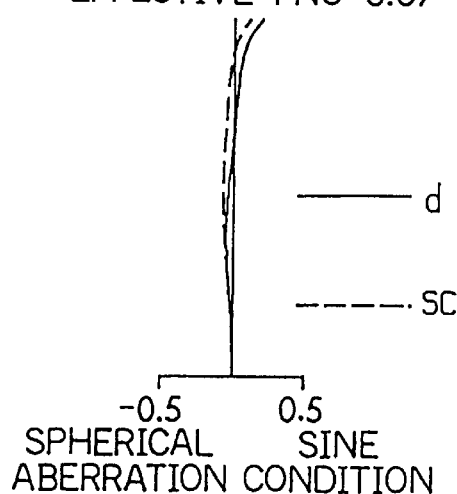
FIGS. 16A to 16C show aberration curves of the fifth embodiment of the present invention focused on infinity at the shortest focal length condition.
Figure 16B:
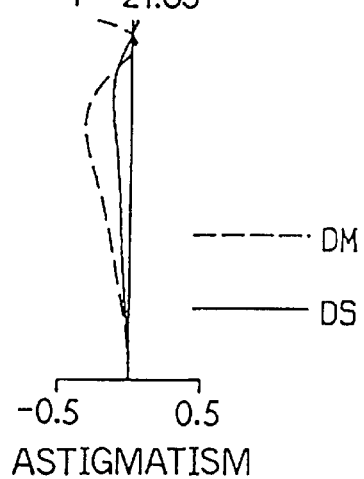
Figure 16C:
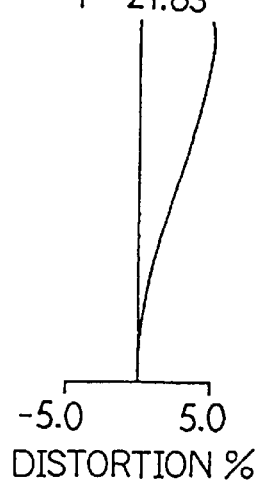
Figure 16D:
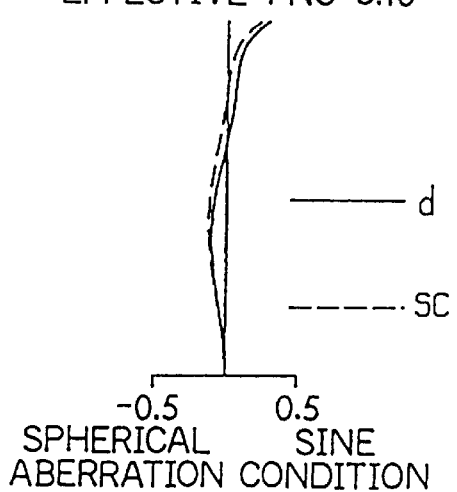
FIGS. 16D to 16F show aberration curves of the fifth embodiment of the present invention focused on infinity at the middle focal length condition.
Figure 16E:
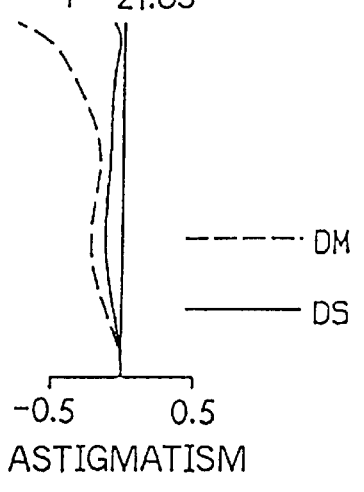
Figure 16F:
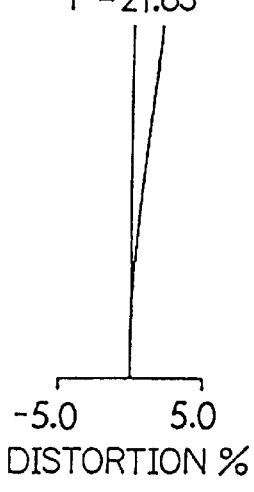
Figure 16G:
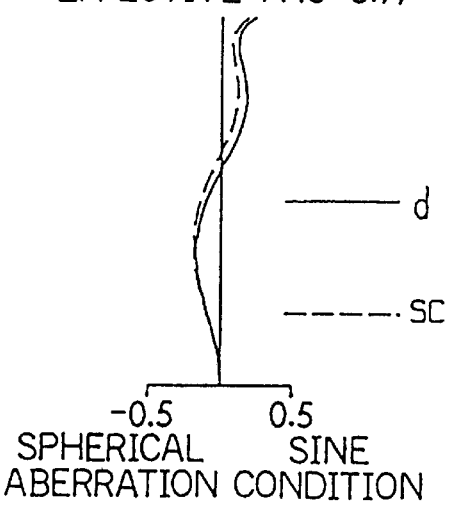
FIGS. 16G to 16I show aberration curves of the fifth embodiment of the present invention focused on infinity at the longest focal length condition.
Figure 16H:
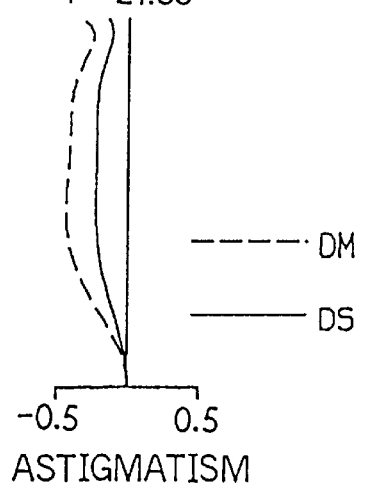
Figure 16I:
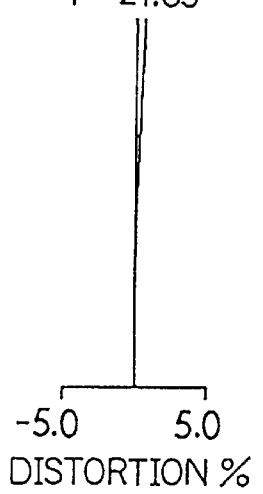
Figure 17A:
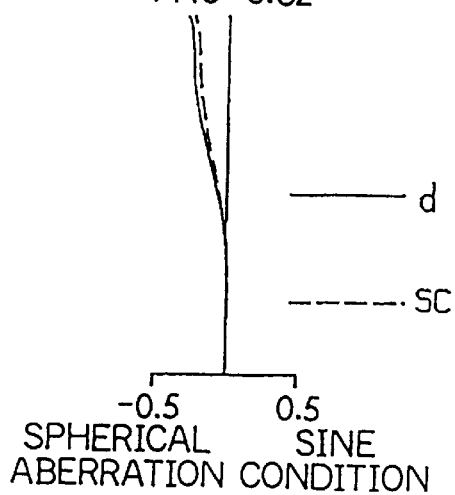
FIGS. 17A to 17C show aberration curves of the sixth embodiment of the present invention focused on a close object at the shortest focal length condition.
Figure 17B:
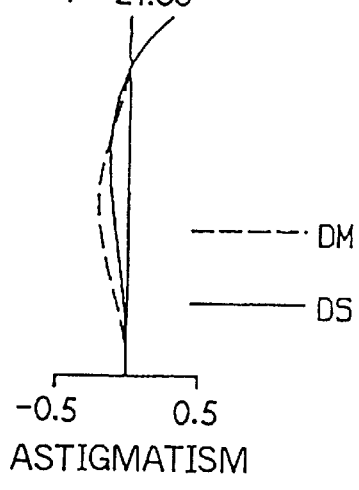
Figure 17C:
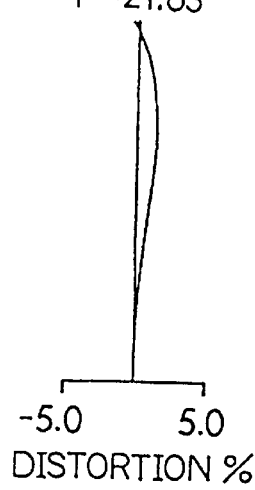
Figure 17D:
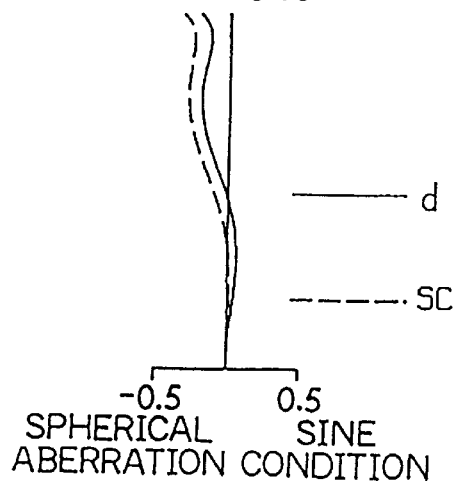
FIGS. 17D to 17F show aberration curves of the sixth embodiment of the present invention focused on a close object at the middle focal length condition.
Figure 17E:
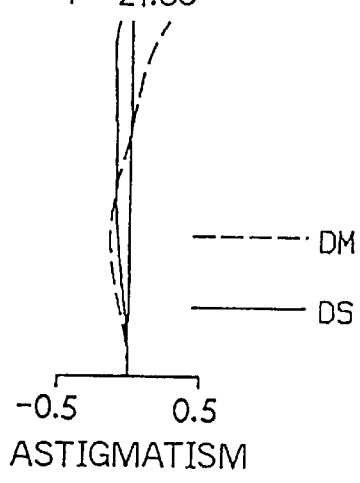
Figure 17F:
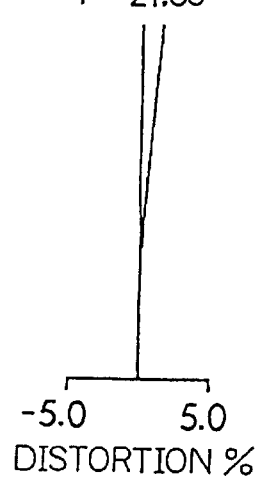
Figure 17G:
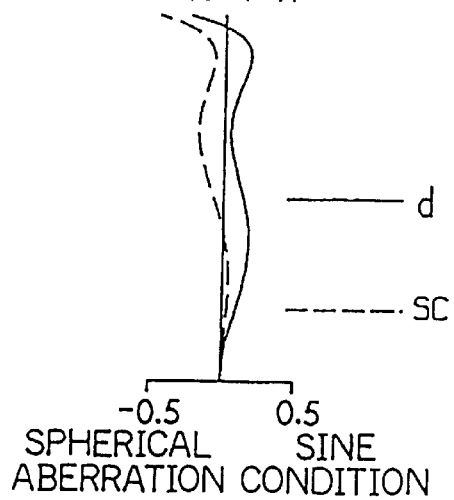
FIGS. 17G to 17I show aberration curves of the sixth embodiment of the present invention focused on a close object at the longest focal length condition.
Figure 17H:
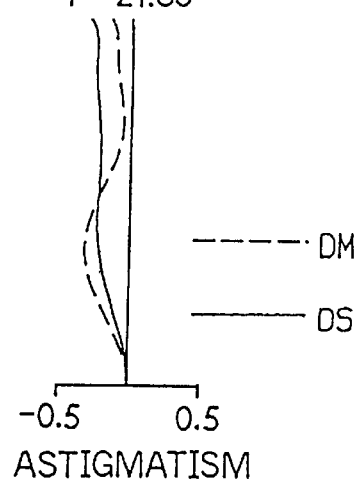
Figure 17I:
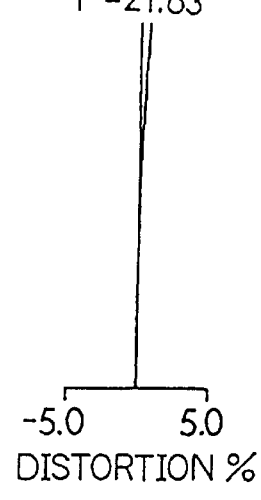

First, first to sixth embodiments of the present invention will be described. The basic feature of these embodiments is that a lens group Gi of a positive refractive power is provided which includes a positive lens element GB arranged on the most image side and convex to the object side and a lens unit GA arranged on the object side of the positive lens element GB, and that focusing for a close object is performed by moving the lens unit GA toward the object side.

When focusing is performed by using the lens group Gi, if the lens group Gi is integrally moved toward the object side in focusing for a close object, negative field curvature is generated due to the strong positive refractive power of the lens group Gi. To prevent the generation of field curvature, the refractive power of the lens group Gi is divided between the lens unit GA and the positive lens element GB, and the lens unit GA having a weak refractive power compared to the lens group Gi is moved. At this time, the following condition (1) is preferably fulfilled:

$$0.2 < \frac{r2 + r1}{r2 - r1} < 3.3 \quad (1)$$

where r1 is a radius of curvature of the object side surface of the positive lens element GB, and r2 is a radius of curvature of the image side surface of the positive lens element GB.

Since the lens group Gi serves as a zooming group in zooming, spherical aberration is corrected only by the lens group Gi itself. However, if the distance between the lens unit GA and the positive lens element GB is varied in focusing, the spherical aberration is excessively generated. To restrain the excessive generation of the spherical aberration, it is necessary to appropriately define the configuration of the positive lens element GB.

The condition (1) defines the configuration of the positive lens element GB. When the lower limit of the condition (1) is exceeded, it is difficult to restrain spherical aberration excessively generated in focusing for a close object. When the upper limit of the condition (1) is exceeded, negative spherical aberration is excessively generated in focusing for a close object. To obtain more excellent spherical aberration in the entire zoom range, it is preferable that the lower limit of the condition (1) is at least 1.

To further improve the performance, the following condition (2) is preferably fulfilled:

$$2.0 < \frac{fB}{fi} < 7.0 \quad (2)$$

where fi is a composite focal length of the lens group Gi, and fB is a focal length of the positive lens element GB.

The condition (2) defines the ratio between the focal lengths of the lens group Gi and the positive lens element GB. When the upper limit of the condition (2) is exceeded to increase the refractive power of the lens unit GA, it is difficult to restrain negative spherical aberration excessively generated in focusing for a close object. When the lower limit of the condition (2) is exceeded to decrease the refractive power of the lens unit GA, the lens movement amount in focusing increases, so that a compact lens system cannot be achieved and positive field curvature is excessively generated in focusing for a close object. To more excellently correct field curvature in focusing for a close object, it is preferable that the lower limit of the condition (2) is at least 3 and that the upper limit there of is at most 5.

Further, by moving the positive lens element GB toward the object side together with the lens unit GA, the floating effect is generated, so that field curvature and spherical aberration can be corrected at a good balance. At this time, the following condition (3) is preferably fulfilled:

$$0 \leq \frac{DB}{DA} < 0.5 \quad (3)$$

where DA is a movement amount of the lens unit GA in focusing, and DB is a movement amount of the positive lens element GB in focusing.

The condition (3) defines the ratio between the movement amounts of the lens unit GA and the positive lens element GB when the upper limit of the condition (3) is exceeded, the same results are produced as when the lens group Gi is integrally moved, so that it is difficult to restrain spherical aberration excessively generated in focusing for a close object.

To reduce the size and cost of the zoom lens system, the zoom lens system comprises a first lens group of a positive refractive power including at least three lens elements of negative, positive and positive refractive powers, respectively, and a second lens group of a negative refractive power including two lens elements of positive and negative refractive powers, respectively. The first lens group corresponds to the lens group Gi including the lens unit GA and the positive lens element GB. Zooming is performed by varying the distances among the lens groups.

To secure further improved performance, the most object side lens element of the first lens group is preferably a negative meniscus lens element convex to the object side. Since the most object side lens element of the first lens group is a negative lens (particularly, a negative lens convex to the object side), a certain extent of back focal length can be secured and the generation of coma is restrained because of the reduction in incident angle of off-axial light in focusing for a close object.

To secure a high zoom ratio, the zoom lens system preferably comprises at least three lens groups having at least two zooming groups. More specifically, the first lens group has a positive refractive power, the second lens group has a positive refractive power and the third lens group has a negative refractive power, and zooming is performed by varying the distances among the lens groups. In this case, the second lens group Gi of a positive refractive power is used for focusing.

Numerical data of the first to sixth embodiments of the present invention are shown in Tables 1 to 6. In each table, f is a focal length of the entire lens system, FNO. is an F number, ri (i=1, 2, 3, . . . ) is a radius of curvature of an ith surface counted from the object side, di (i=1, 2, 3, . . . ) is an ith axial distance counted from the object side, Ni and vi are a refractive power to the d-line (λ=587.6 nm) and an Abbe number of an ith lens counted from the object side, respectively.

In the tables, the surfaces marked with asterisks (*) are aspherical and defined by the following expression (4) representative of an aspherical surface configuration.

$$X(y) = \frac{r}{\varepsilon} \cdot \left\{ 1 - \left(1 - \varepsilon \cdot \frac{y^2}{r^2}\right)^{\frac{1}{2}} \right\} + \sum_{i \geq 2} A_i y^i \quad (4)$$

where X is a displacement amount along the optical axis from a reference surface, y is a height vertically to the optical axis, r is a reference radius of curvature of the aspherical surface, $\varepsilon$ is a conic constant, and $A_i$ is an aspherical coefficient.

While only zoom lens systems comprising two or three lens groups are shown in the numerical data tables, the present invention is not limited thereto.

The values of the first to sixth embodiments for the conditions (1), (2) and (3) are shown in Table 7.

FIGS. 1 to 6 show the lens arrangements of the first to sixth embodiments focused on infinity on the shorter focal length side. The movements of the lens groups in zooming are also shown. FIGS. 7A to 7I through 18A to 18I show aberration curves of the first to sixth embodiments focused on a close subject and on infinity. FIGS. 7A to 7C through 18A to 18C show aberration curves at the shortest focal length condition. FIGS. 7D to 7F through 18D to 18F show aberration curves at the middle focal length condition. FIGS. 7G to 7I through 18G to 18I show aberration curves at the longest focal length condition. In the figures showing the aberration curves, the solid line d represents spherical aberration, the broken line SC represents a sine condition, and the solid lines DS and DT represent astigmatism on the sagittal and meridional image planes, respectively.

The first to fifth embodiments are zoom lens systems each including a first lens group Gr1 of a positive refractive power and a second lens group Gr2 of a negative refractive power. The first lens group Gr1 serves as the lens group Gi. In the first lens group Gr1, a meniscus lens element arranged on the most image side serves as the positive lens element GB, and a plurality of lens elements arranged on the object side of the meniscus lens element serve as the lens unit GA. In focusing for a close object, in the first to fourth embodiments, only the lens unit GA is moved toward the object side, whereas in the fifth embodiment, the positive lens element GB is also moved toward the object side together with the lens unit GA (the ratio of movement amount GA/GB is 1:0.2).

The sixth embodiment is a zoom lens system including a first lens group Gr1 of a positive refractive power, a second lens group Gr2 of a positive refractive power and a third lens group Gr3 of a negative refractive power. The second lens group Gr2 serves as the lens group Gi. In the second lens group Gr2, a lens element arranged on the most image side serves as the positive lens element GB, and a plurality of lens elements arranged on the object side of the lens serve as the lens unit GA. In focusing for a close object, only the lens unit GA is moved toward the object side.

Subsequently, seventh to eleventh embodiments of the present invention will be described. Numerical data of these embodiments are shown in Tables 8 to 12.

Figure 19:
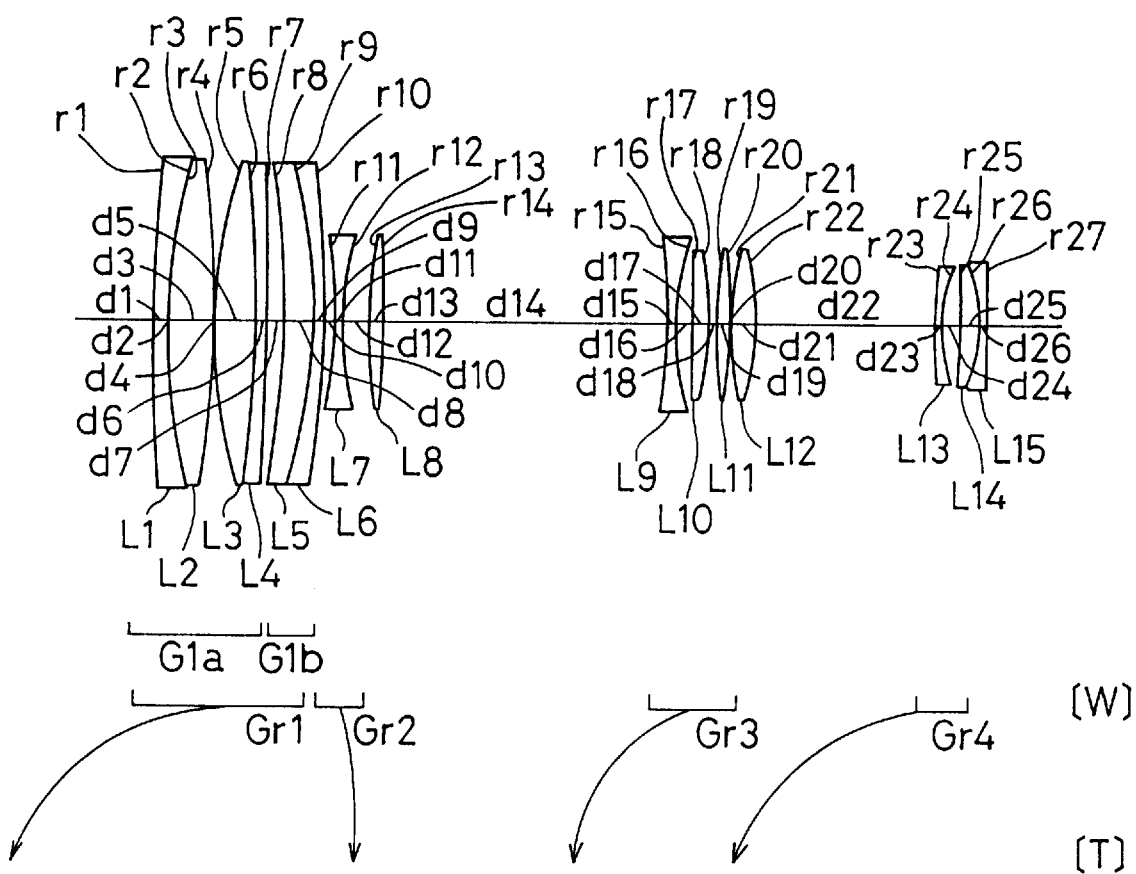
FIG. 19 shows the lens arrangement of a seventh embodiment of the present invention focused on infinity on the shorter focal length side.
Figure 20A:
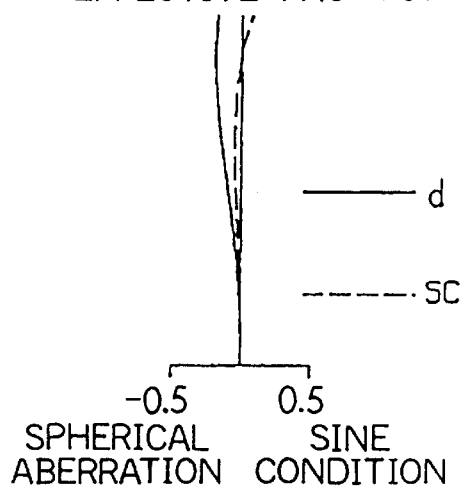
FIGS. 20A to 20C show aberration curves of the seventh embodiment of the present invention focused on infinity at the shortest focal length condition.
Figure 20B:
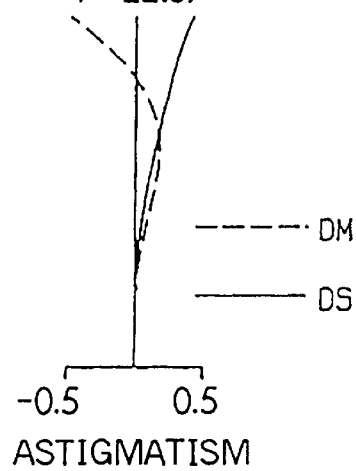
Figure 20C:
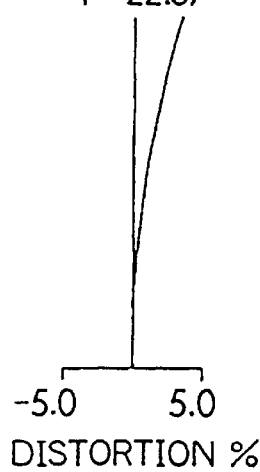
Figure 20D:
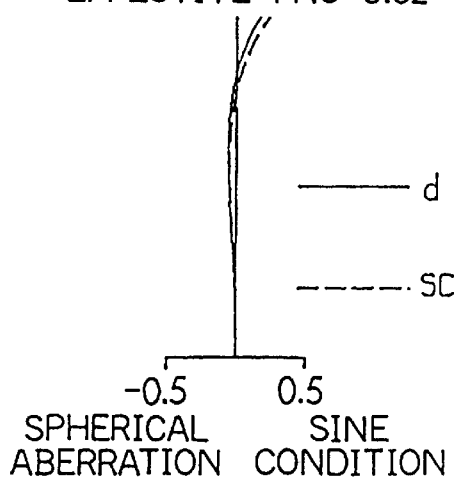
FIGS. 20D to 20F show aberration curves of the seventh embodiment of the present invention focused on infinity at the middle focal length condition.
Figure 20E:
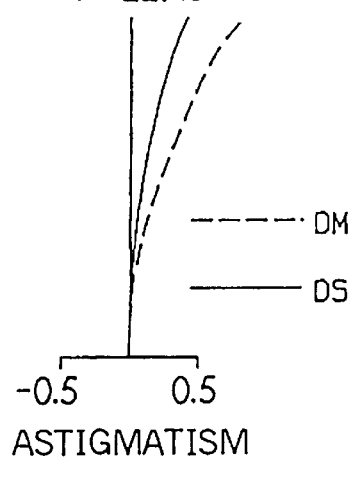
Figure 20F:
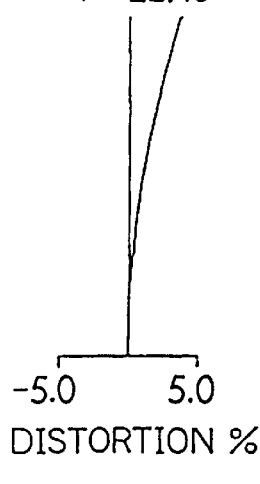
Figure 20G:
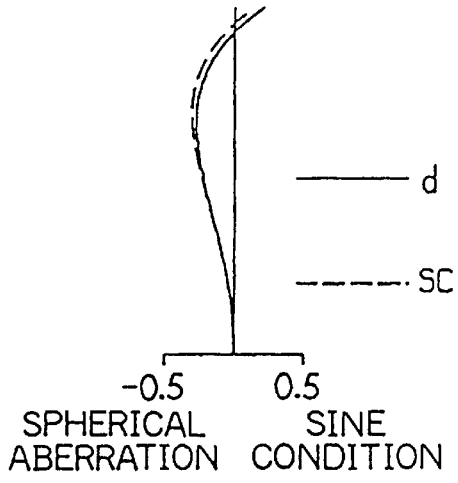
FIGS. 20G to 20I show aberration curves of the seventh embodiment of the present invention focused on infinity at the longest focal length condition.
Figure 20H:
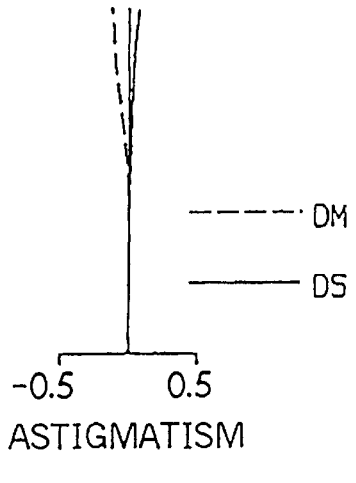
Figure 20I:
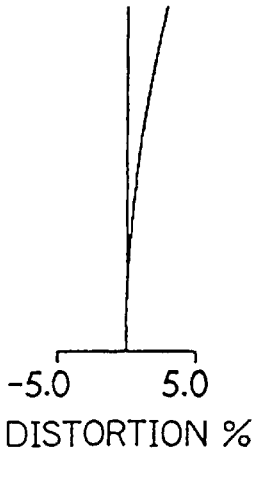

FIG. 19 shows the lens arrangement of the seventh embodiment focused on infinity on the shorter focal length side. In this figure, the movements of first to fourth lens groups Gr1 to Gr4 in zooming from a shorter focal length condition to a longer focal length condition are also shown by the arrows.

The zoom lens system of the seventh embodiment comprises from the object side a first lens group Gr1 of a positive refractive power, a second lens group Gr2 of a negative refractive power, a third lens group Gr3 of a positive refractive power, and a fourth lens group Gr4 of a negative refractive power.

The first lens group Gr1 includes a lens unit G1a of a positive refractive power and a lens unit G1b of a negative refractive power. The arrangement of the positive lens unit G1a will be described from the object side. A first lens element L1 is a negative meniscus lens convex to the object side. A second lens element L2 is a bi-convex lens of a positive refractive power. A third lens element L3 is a bi-convex lens of a positive refractive power. A fourth lens element L4 is a negative meniscus lens concave to the object side. The third lens element L3 and the fourth lens element L4 constitute a doublet lens. The negative lens unit G1b includes a fifth lens element L5 which is a positive meniscus lens concave to the object side and a sixth lens element L6 which is a negative meniscus lens.

The second lens group Gr2 includes a doublet lens consisting of a seventh lens element L7 which is a bi-concave lens and an eighth lens element L8 which is a bi-convex lens. The third lens group Gr3 includes from the object side a ninth lens element L9 which is a bi-concave lens and tenth to twelfth lens elements L10 to L12 which are bi-convex lenses. The fourth lens group Gr4 includes from the object side a thirteenth lens element L13 which is a negative meniscus lens convex to the object side, a fourteenth lens element L14 which is a positive meniscus lens concave to the object side and a fifteenth lens element L15 which is a bi-concave lens. The fourteenth lens element L14 and the fifteenth lens element L15 constitute a doublet lens.

Figure 22:
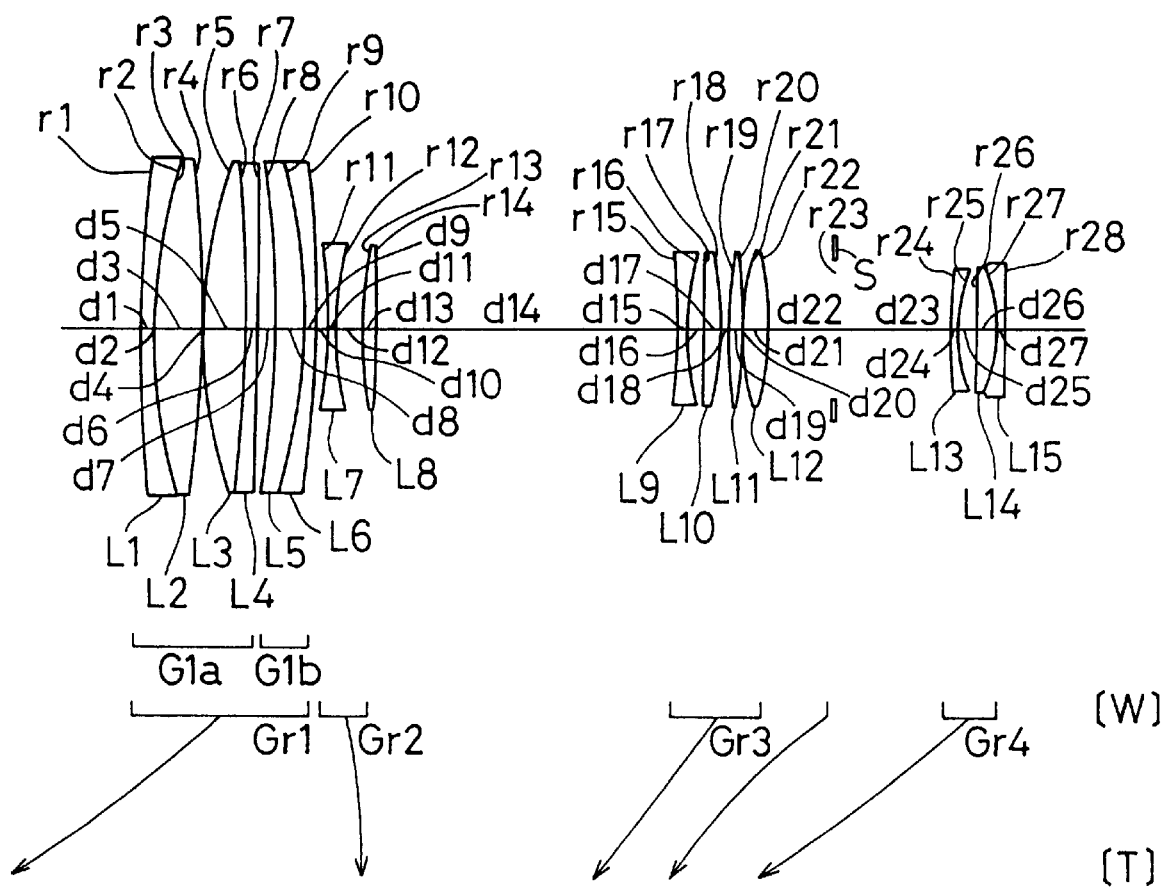
FIG. 22 shows the lens arrangement of an eighth embodiment of the present invention focused on infinity on the shorter focal length side.
Figure 23A:
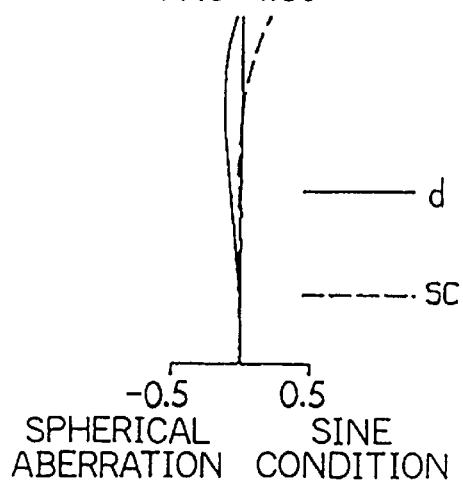
FIGS. 23A to 23C show aberration curves of the eighth embodiment of the present invention focused on infinity at the shortest focal length condition.
Figure 23B:
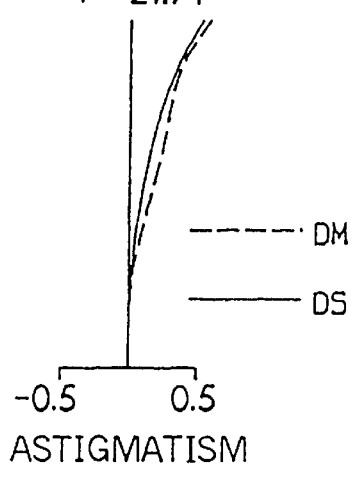
Figure 23C:
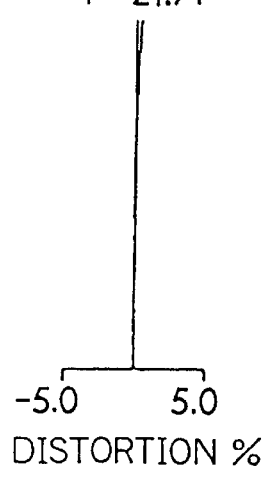
Figure 23D:
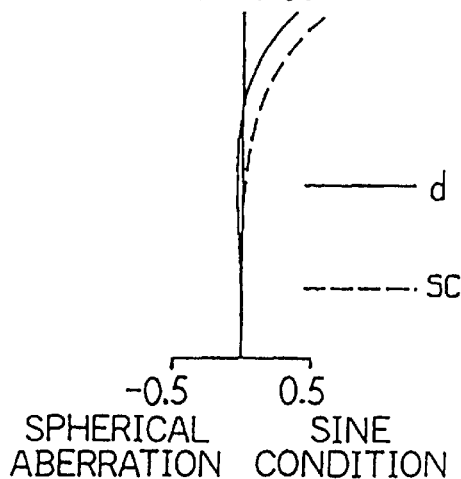
FIGS. 23D to 23F show aberration curves of the eighth embodiment of the present invention focused on infinity at the middle focal length condition.
Figure 23E:
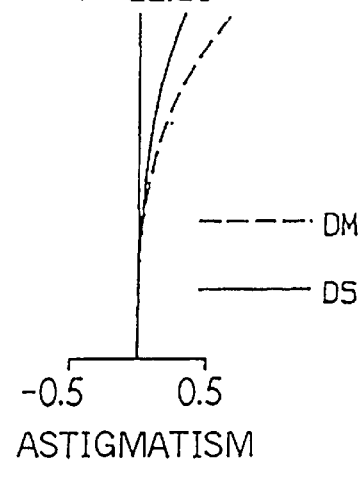
Figure 23F:
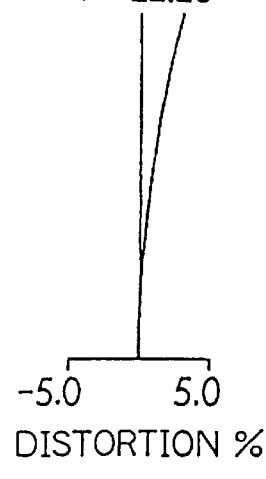
Figure 23G:
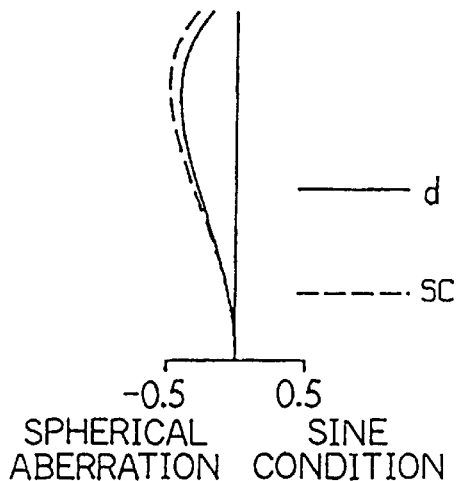
FIGS. 23G to 23I show aberration curves of the eighth embodiment of the present invention focused on infinity at the longest focal length condition.
Figure 23H:
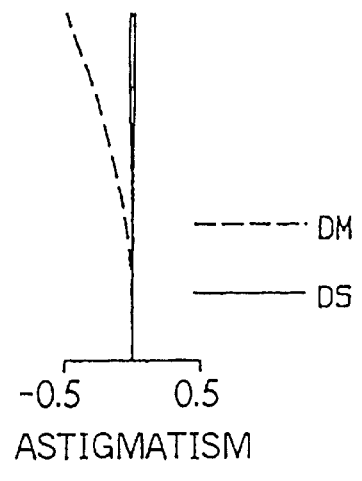
Figure 23I:
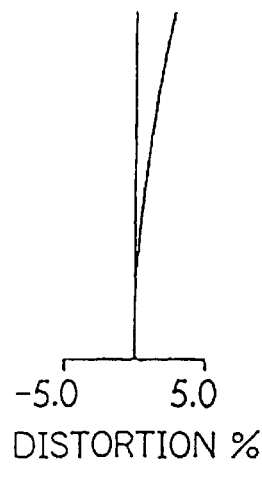
Figure 24A:
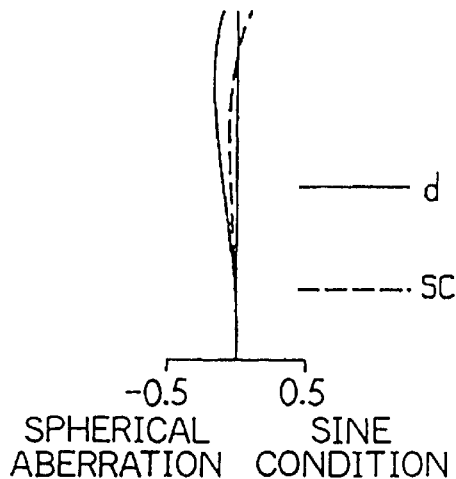
FIGS. 24A to 24C show aberration curves of the eighth embodiment of the present invention at the shortest focal length condition when focusing is performed so that the magnification is −0.25×.
Figure 24B:
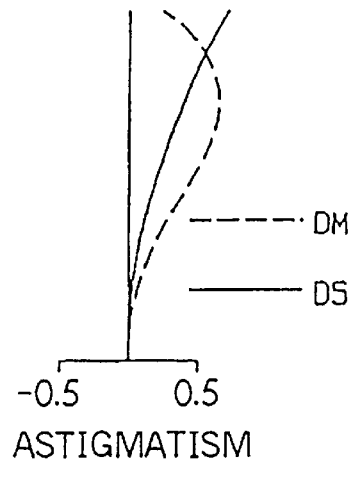
Figure 24C:
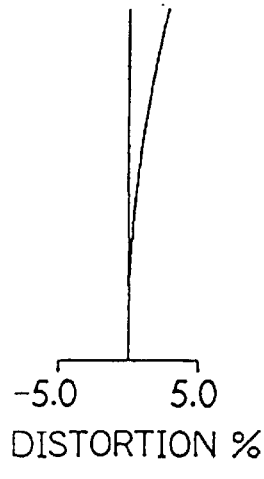
Figure 24D:
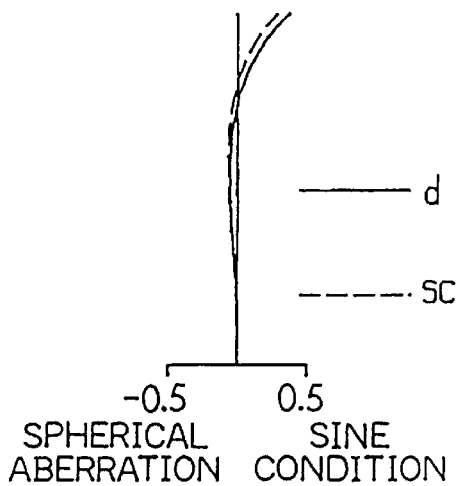
FIGS. 24D to 24F show aberration curves of the eighth embodiment of the present invention at the middle focal length condition when focusing is performed so that the magnification is −0.25×.
Figure 24E:
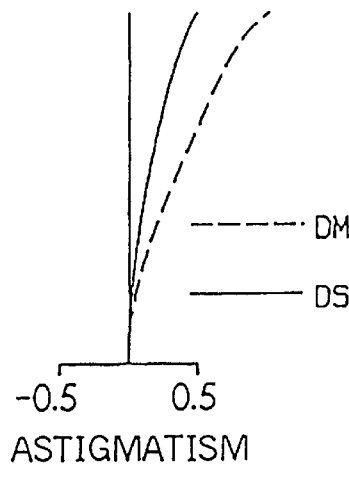
Figure 24F:
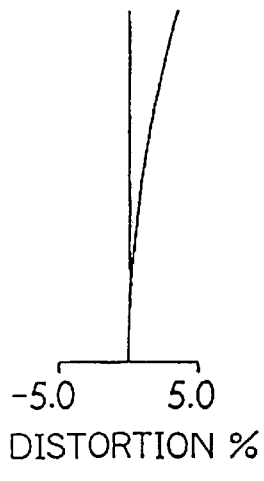
Figure 24G:
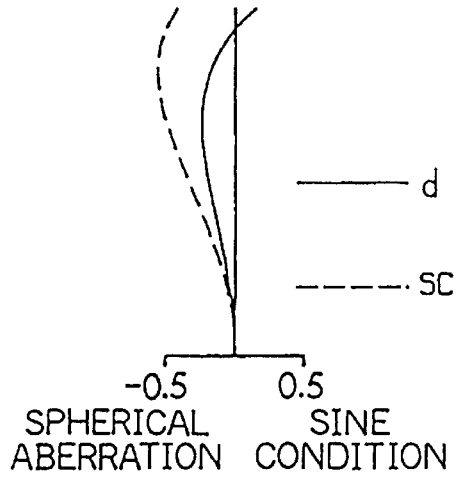
FIGS. 24G to 24I show aberration curves of the eighth embodiment of the present invention at the longest focal length condition when focusing is performed so that the magnification is −0.25×.
Figure 24H:
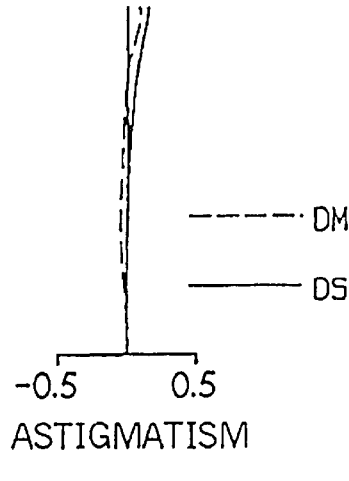
Figure 24I:
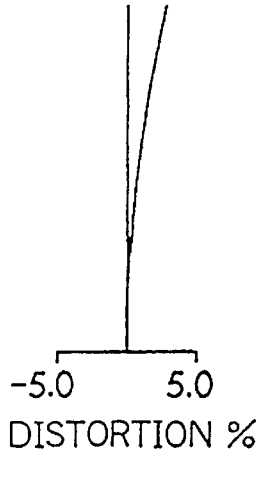
Figure 25:
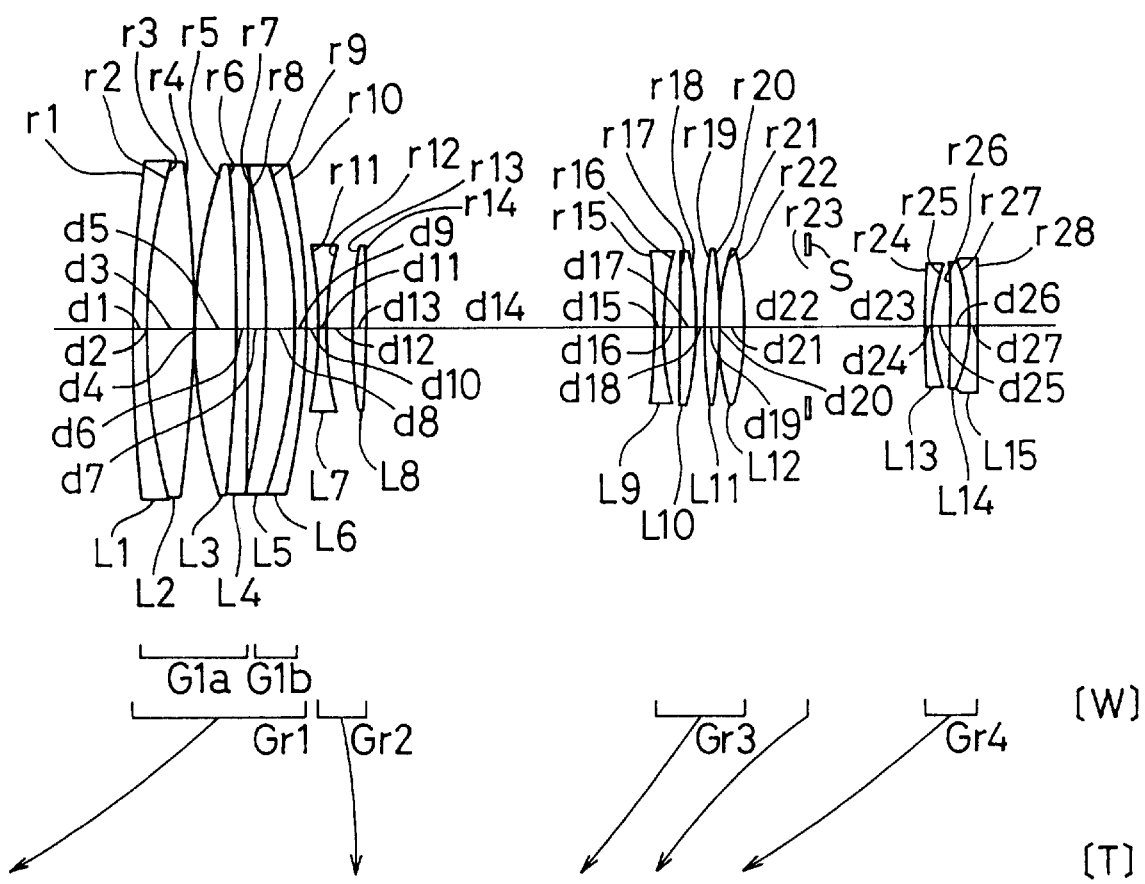
FIG. 25 shows the lens arrangement of a ninth embodiment of the present invention focused on infinity on the shorter focal length side.
Figure 26A:
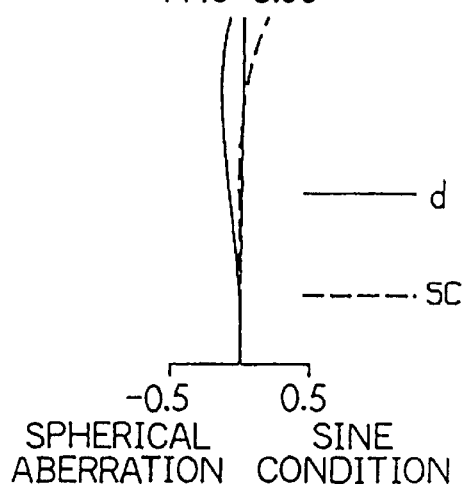
FIGS. 26A to 26C show aberration curves of the ninth embodiment of the present invention focused on infinity at the shortest focal length condition.
Figure 26B:
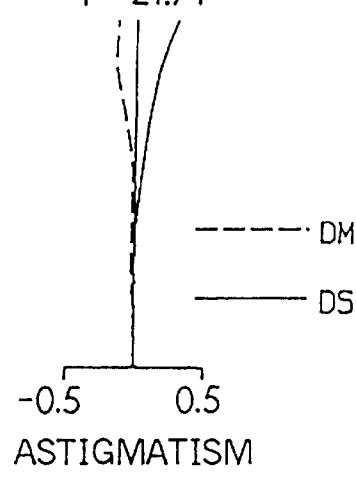
Figure 26C:
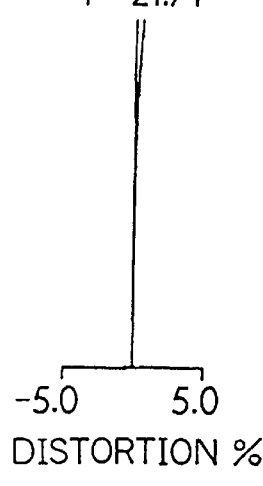
Figure 26D:
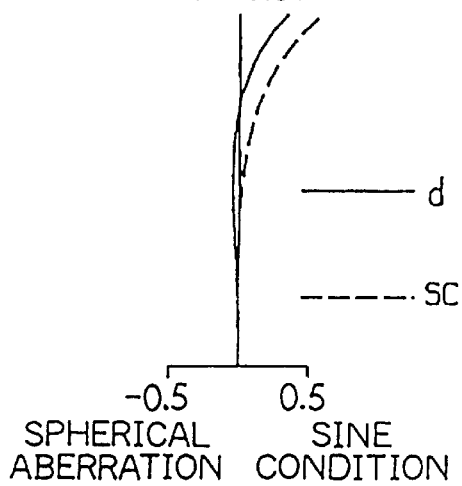
FIGS. 26D to 26F show aberration curves of the ninth embodiment of the present invention focused on infinity at the middle focal length condition.
Figure 26E:
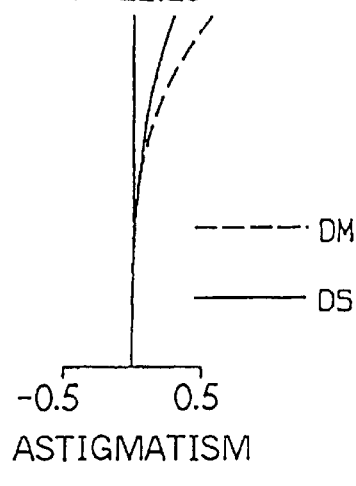
Figure 26F:
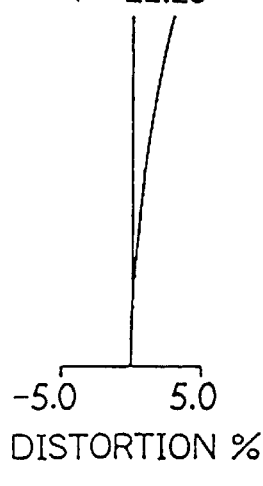
Figure 26G:
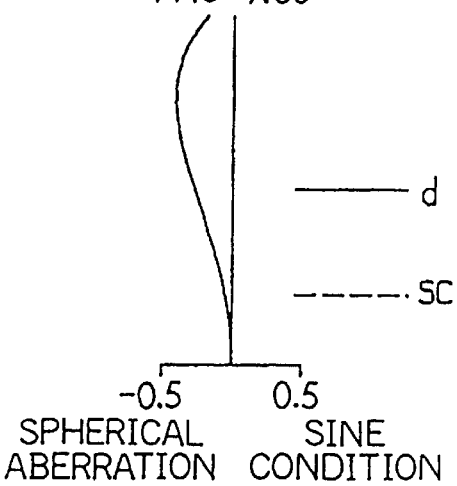
FIGS. 26G to 26I show aberration curves of the ninth embodiment of the present invention focused on infinity at the longest focal length condition.
Figure 26H:
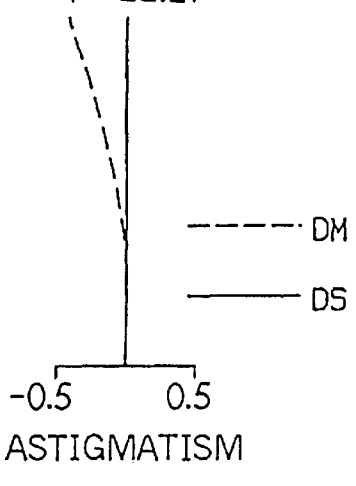
Figure 26I:
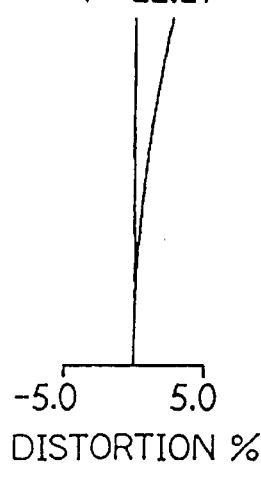

FIGS. 22 and 25 show the lens arrangements of the eighth and ninth embodiments. The lens arrangements of the eighth and ninth embodiments resemble the lens arrangement of the seventh embodiment. In the eighth and ninth embodiments, an aperture stop S is provided between the third lens group Gr3 and the fourth lens group Gr4. While the fourth lens element L4 of the seventh and eighth embodiments is a meniscus lens concave to the object side, the fourth lens element L4 of the ninth embodiment is a bi-concave lens.

Figure 28:
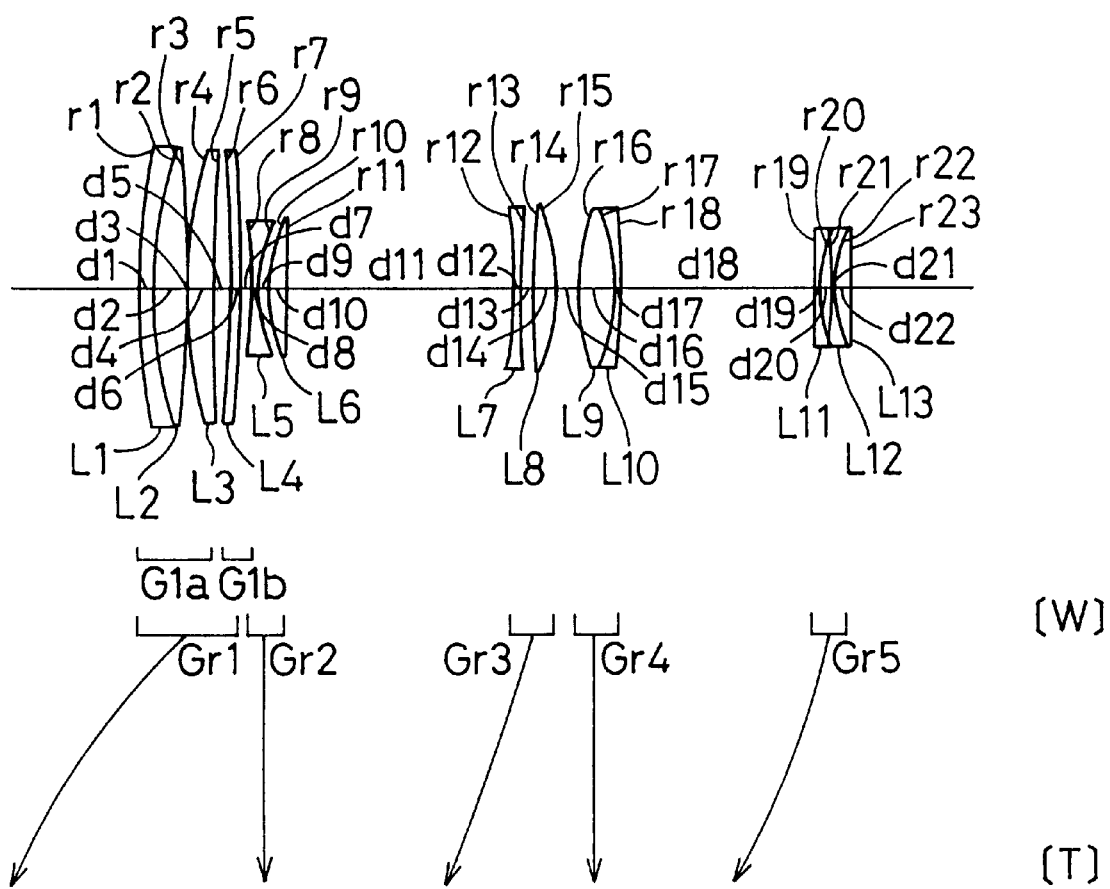
FIG. 28 shows the lens arrangement of a tenth embodiment of the present invention focused on infinity on the shorter focal length side.
Figure 31:
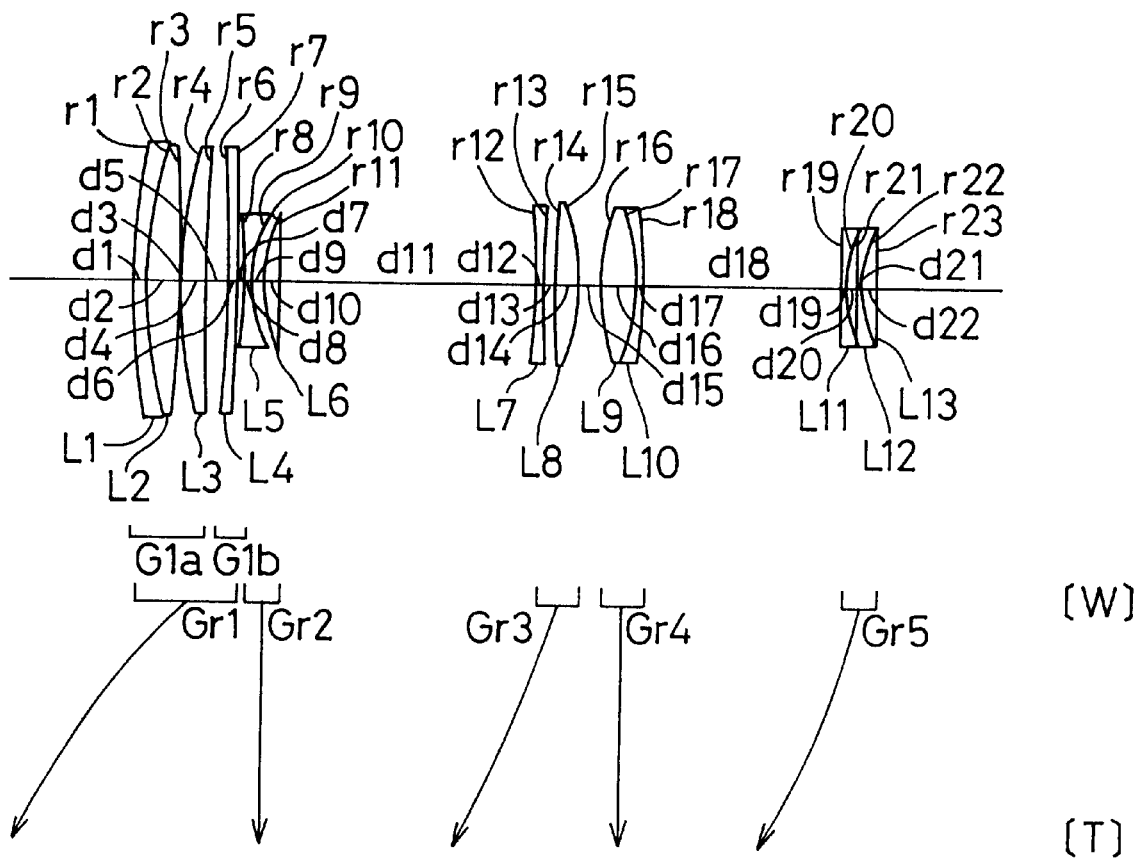
FIG. 31 shows the lens arrangement of an eleventh embodiment of the present invention focused on infinity on the shorter focal length side.
Figure 32A:
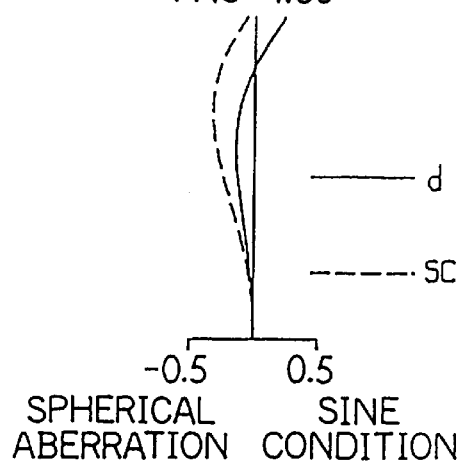
FIGS. 32A to 32C show aberration curves of the eleventh embodiment of the present invention focused on infinity at the shortest focal length condition.
Figure 32B:
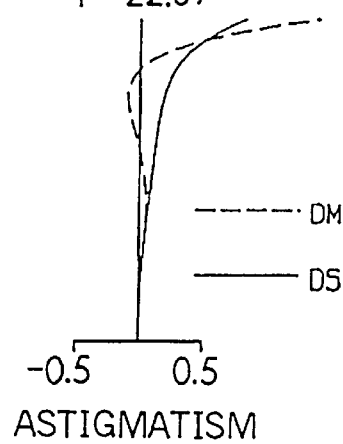
Figure 32C:
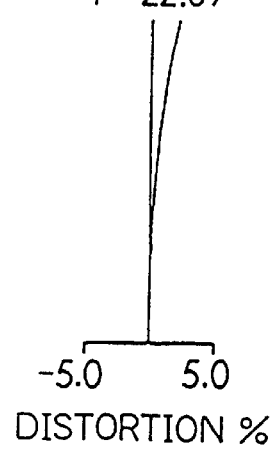
Figure 32D:
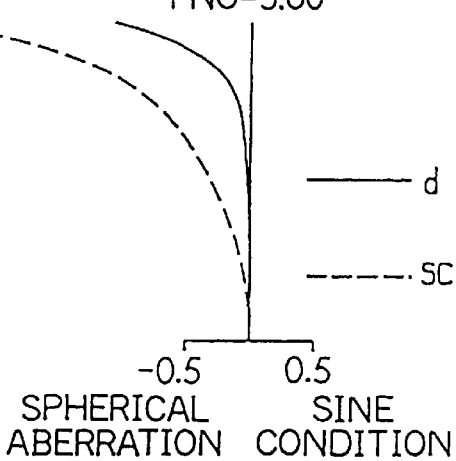
FIGS. 32D to 32F show aberration curves of the eleventh embodiment of the present invention focused on infinity at the middle focal length condition.
Figure 32E:
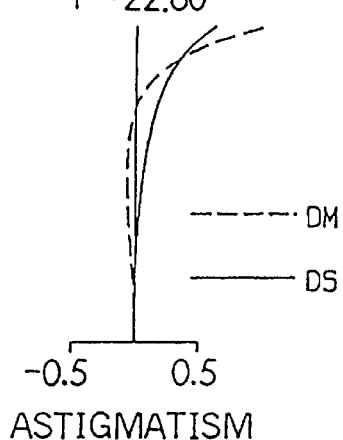
Figure 32F:
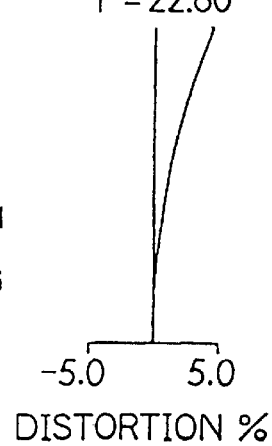
Figure 32G:
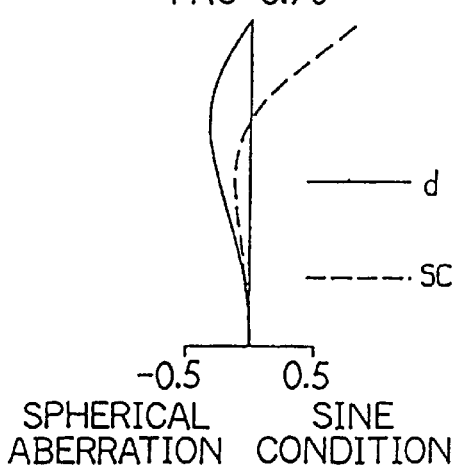
FIGS. 32G to 32I show aberration curves of the eleventh embodiment of the present invention focused on infinity at the longest focal length condition.
Figure 32H:
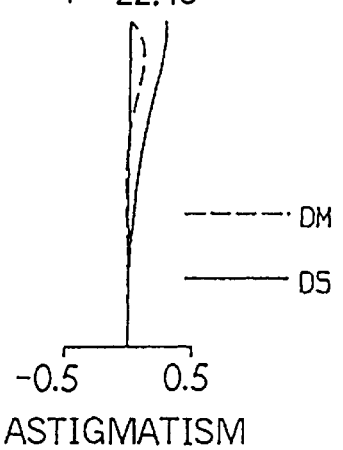
Figure 32I:
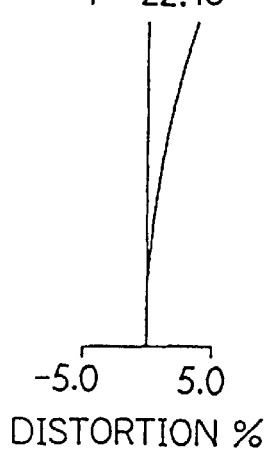
Figure 33A:
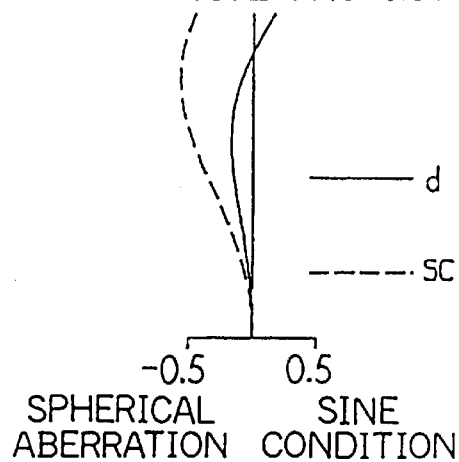
FIGS. 33A to 33C show aberration curves of the eleventh embodiment of the present invention at the shortest focal length condition when focusing is performed so that the magnification is −0.25×.
Figure 33B:
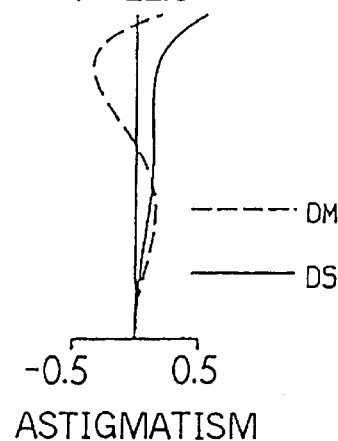
Figure 33C:
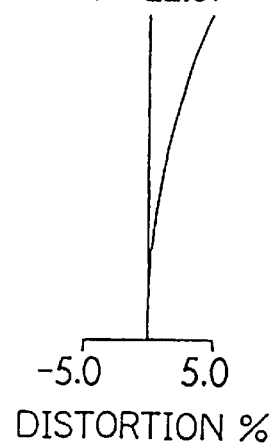
Figure 33D:
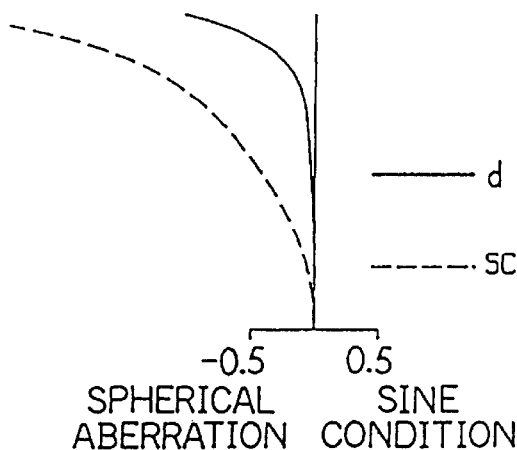
FIGS. 33D to 33F show aberration curves of the eleventh embodiment of the present invention at the middle focal length condition when focusing is performed so that the magnification is −0.25×.
Figure 33E:
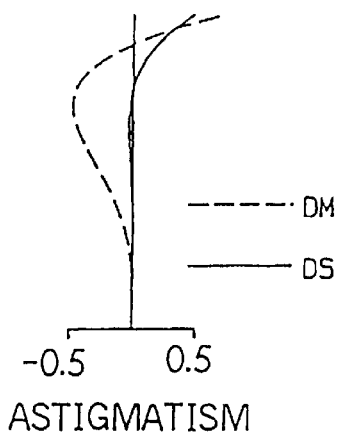
Figure 33F:
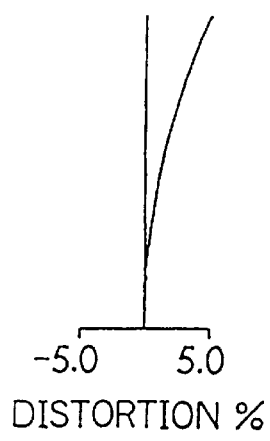
Figure 33G:
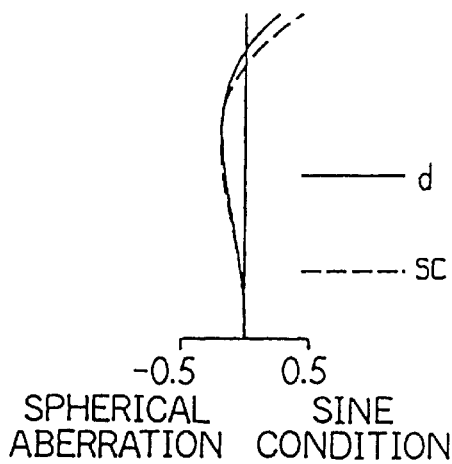
FIGS. 33G to 33I show aberration curves of the eleventh embodiment of the present invention at the longest focal length condition when focusing is performed so that the magnification is −0.25×.
Figure 33H:
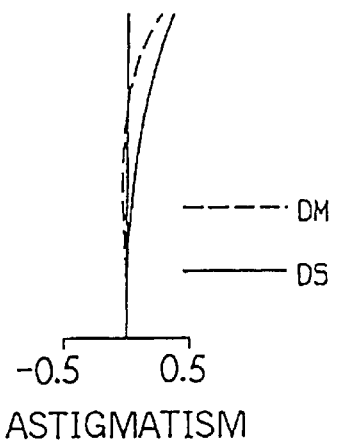
Figure 33I:
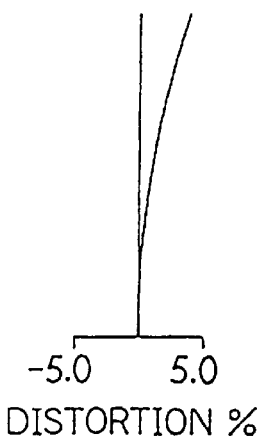

FIGS. 28 and 31 show the lens arrangements of the tenth and eleventh embodiments. The zoom lens systems of the tenth and eleventh embodiments comprise from the object side a first lens group Gr1 of a positive refractive power, a second lens group Gr2 of a negative refractive power, a third lens group Gr3 of a positive refractive power, a fourth lens group Gr4 of a positive refractive power and a fifth lens group Gr5 of a negative refractive power.

The first lens group Gr1 includes a lens unit G1a of a positive refractive power and a lens unit G1b of a negative refractive power. The positive lens unit G1a will be described from the object side. A first lens element L1 is a negative meniscus lens convex to the object side. A second lens element L2 is a bi-convex lens. A third lens element L3 is a positive meniscus lens convex to the object side. The negative lens unit G1b includes a fourth lens element L4 which is a negative meniscus lens concave to the object side. The first lens element L1 and the second lens element L2 constitute a doublet lens.

The second lens group Gr2 includes a fifth lens element L5 which is a bi-concave lens and a sixth lens element L6 which is a positive meniscus lens convex to the object side. The third lens group Gr3 includes a seventh lens element L7 which is a bi-concave lens and an eighth lens element L8 which is a bi-convex lens. The fourth lens group Gr4 includes a doublet lens consisting of a ninth lens element L9 which is a bi-convex lens and a tenth lens element L10 which is a positive meniscus lens concave to the object side. The fifth lens group Gr5 includes from the object side eleventh and twelfth lens elements L11 and L12 which are negative meniscus lenses concave to the object side. The twelfth and thirteenth lens elements L12 and L13 constitute a doublet lens.

If the first lens group Gr1 of a positive refractive power is integrally moved in focusing, spherical aberration and field curvature increase in close photography. According to the present invention, to restrain these aberrations, the positive lens unit G1a and the negative lens unit G1b of the first lens group Gr1 are separately moved in focusing. Field curvature is corrected by varying the refractive power of the negative lens unit G1b. Spherical aberration is corrected by varying the configuration of the negative lens unit G1b. To restrain positive field curvature, the lens unit G1b preferably has a negative refractive power like in the seventh to eleventh embodiments.

If the movement amount of the negative lens unit G1b is smaller than the movement amount of the positive lens unit G1a in focusing, the floating effect is obtained, so that field curvature is further corrected in close photography. The variation in axial distance in focusing of each embodiment is shown in Table 13.

As is apparent from Table 13, in the seventh embodiment, both the lens units G1a and G1b are moved in focusing. Thereby, a distance d7 between the lens units G1a and G1b and a distance d10 between the negative lens unit G1b and the second lens group Gr2 are varied. In the eighth to eleventh embodiments, only the positive lens unit G1a is moved in focusing. Thereby, only a distance between the positive lens unit G1a and the second lens group Gr2 (a distance d10 in the eighth and ninth embodiments, a distance d5 in the tenth and eleventh embodiments) is varied.

Thus, by not moving the negative lens unit G1b in focusing, the structure of the lens barrel is simplified, so that the manufacture cost is restrained.

The seventh to eleventh embodiments fulfill the following condition (5):

$$\left|\frac{D1b}{D1a}\right| < 0.5 \tag{5}$$

where D1a is a movement amount of the positive lens unit G1a, and D1b is a movement amount of the negative lens unit G1b.

The condition (5) defines the ratio between the movement amounts of the positive lens unit G1a and the negative lens unit G1b. When the ratio exceeds the limit of the condition (5), the movement amount of the negative lens unit G1b increases in focusing, so that it is difficult to restrain field curvature in close photography.

The seventh to eleventh embodiments also fulfill the following condition (6):

$$-90.0 < \frac{f1b}{f1a} < -10.0 \tag{6}$$

where f1a is a focal length of the positive lens unit G1a and f1b is a focal length of the negative lens unit G1b.

The condition (6) defines the ratio between the focal lengths of the positive lens unit G1a and the negative lens unit G1b. When the ratio exceeds the upper limit of the condition (6), the refractive power of the positive lens unit G1a decreases, so that it is necessary to largely move the positive lens unit G1a in focusing. When the ratio exceeds the lower limit of the condition (6), the refractive power of the positive lens unit G1a is too strong, so that it is difficult to appropriately correct aberrations.

Since the negative lens unit G1b has a weak refractive power and is mainly used to correct only field curvature in close photography, it is desirable to reduce the number of lens elements of the negative lens unit G1b to restrain the manufacture cost. In view of this, the negative lens unit G1b is a doublet lens in the seventh to ninth embodiments and a single lens in the tenth to eleventh embodiments. The doublet lens and the single lens fulfill the following condition (7):

$$5.0 < \frac{R1 + R1}{R2 - R1} < 40.0 \tag{7}$$

where R1 is a radius of curvature of the object side surface of the negative lens unit G1b and R2 is a radius of curvature of the image side surface of the negative lens unit G1b.

A relationship between the conditions (5) to (7) and the seventh to eleventh embodiments are shown in Table 14.

FIGS. 20A to 20I, 23A to 23I, 26A to 26I, 29A to 29I and 32A to 32I show aberration curves of the seventh to eleventh embodiments focused on infinity. FIGS. 21A to 21I, 24A to 24I, 27A to 27I, 30A to 30I and 33A to 33I show aberration curves of the seventh to eleventh embodiments when focusing is performed so that the magnification is −0.25×. FIGS. 20A to 20C, 21A to 21C, 23A to 23C, 24A to 24C, 26A to 26C, 27A to 27C, 29A to 29C, 30A to 30C, 32A to 32C and 33A to 33C show aberration curves at the shortest focal length condition. FIGS. 20D to 20F, 21D to 21F, 23D to 23F, 24D to 24F, 26D to 26F, 27D to 27F, 29D to 29F, 30D to 30F, 32D to 32F and 33D to 33F show aberration curves at the middle focal length condition. FIGS. 20G to 20I, 21G to 21I, 23G to 23I, 24G to 24I, 26G to 26I, 27G to 27I, 29G to 29I, 30G to 30I, 32G to 32I and 33G to 33I show aberration curves at the longest focal length condition.

Subsequently, twelfth to fourteenth embodiments of the present invention will be described. Numerical data of the twelfth to fourteenth embodiments are shown in Tables 15 to 20. Tables 15, 17 and 19 show the data when the zoom lens system is focused on an infinity object. Tables 16, 18 and 20 show the data when the zoom lens system is focused on a close object.

Figure 34:
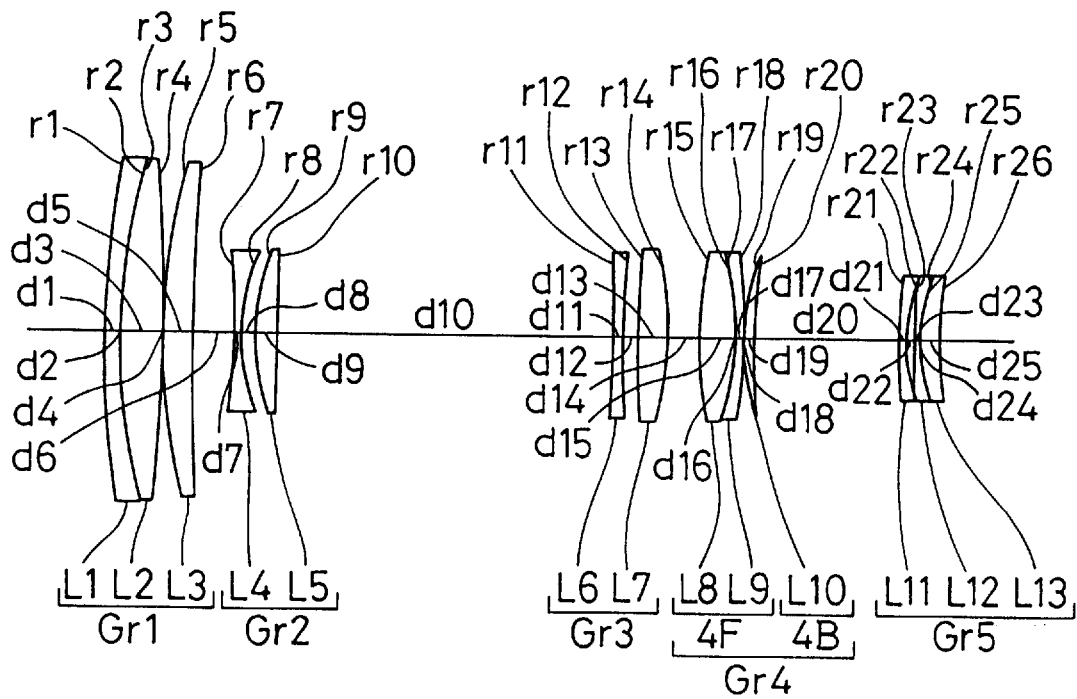
FIG. 34 shows the lens arrangement of a twelfth embodiment of the present invention focused on infinity at the shortest focal length condition.
Figure 35:
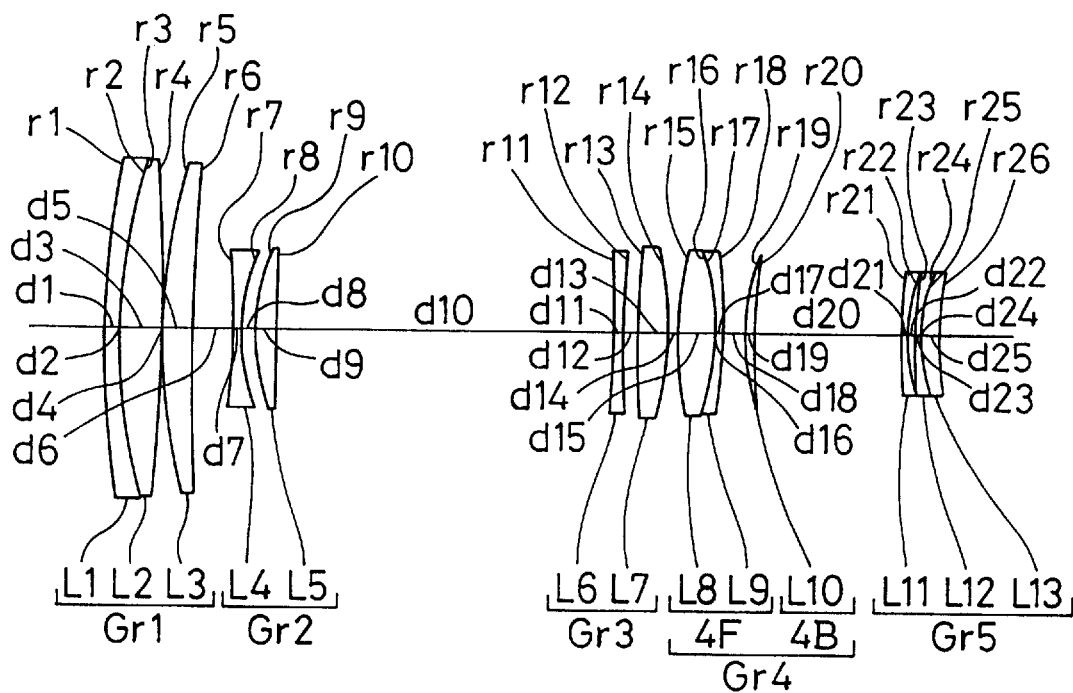
FIG. 35 shows the lens arrangement of the twelfth embodiment of the present invention focused on a close object at the shortest focal length condition.
Figure 36A:
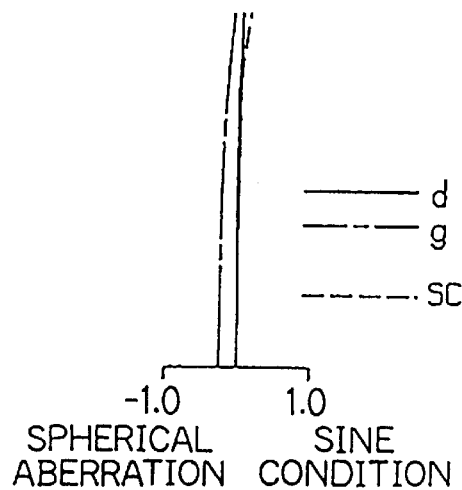
FIGS. 36A to 36C show aberration curves of the twelfth embodiment focused on infinity at the shortest focal length condition.
Figure 36B:
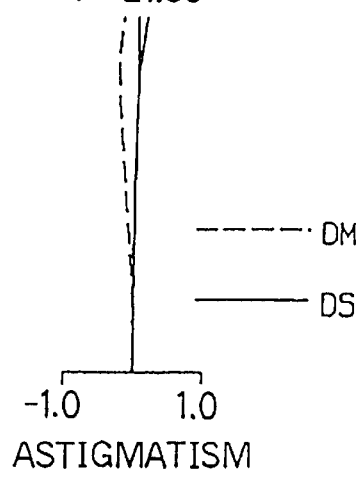
Figure 36C:
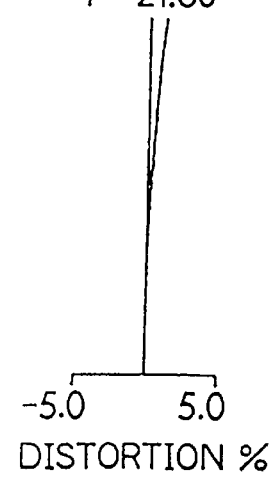
Figure 36D:
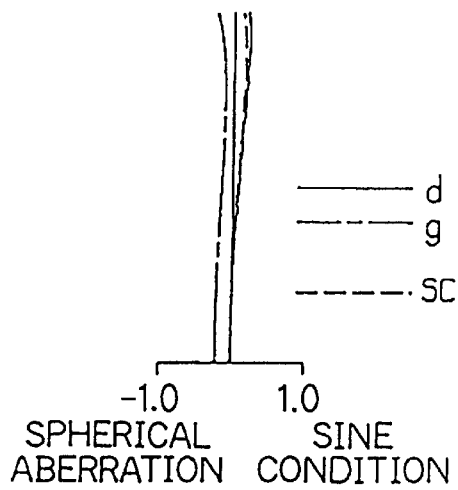
FIGS. 36D to 36F show aberration curves of the twelfth embodiment focused on infinity at the middle focal length condition.
Figure 36E:
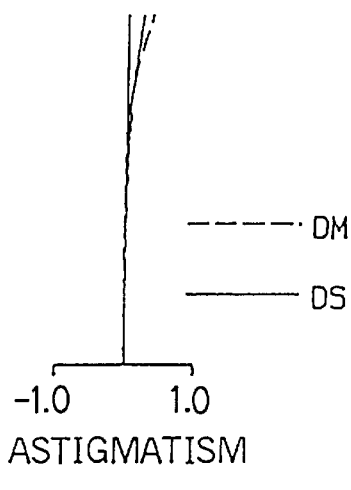
Figure 36F:
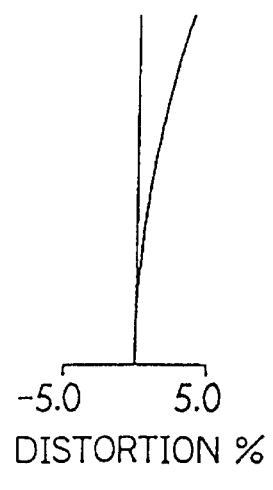
Figure 36G:
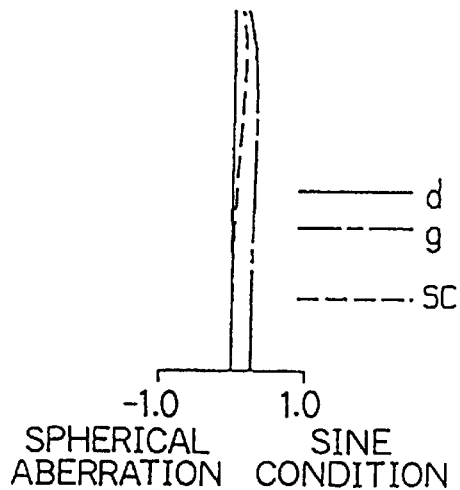
FIGS. 36G to 36I show aberration curves of the twelfth embodiment focused on infinity at the longest focal length condition.
Figure 36H:
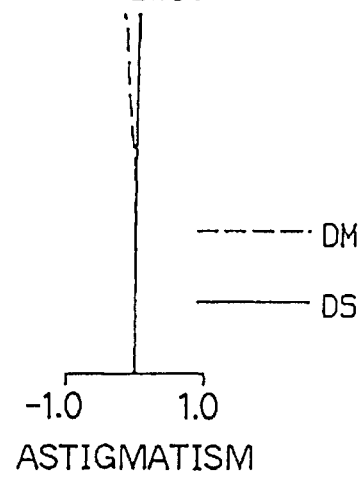
Figure 36I:
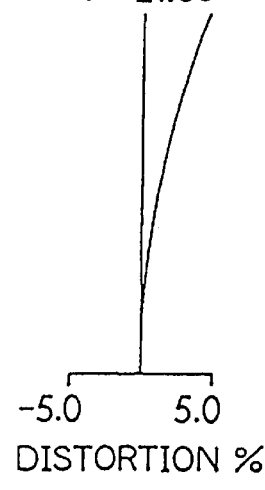
Figure 38:
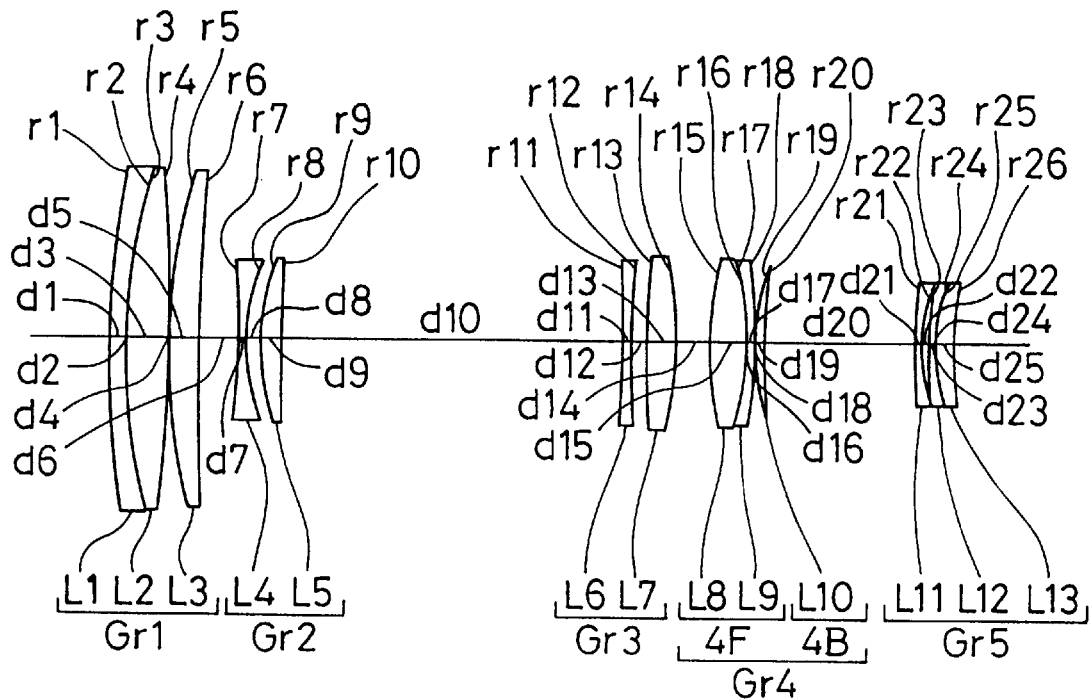
FIG. 38 shows the lens arrangement of a thirteenth embodiment of the present invention focused on infinity at the shortest focal length condition.
Figure 39:
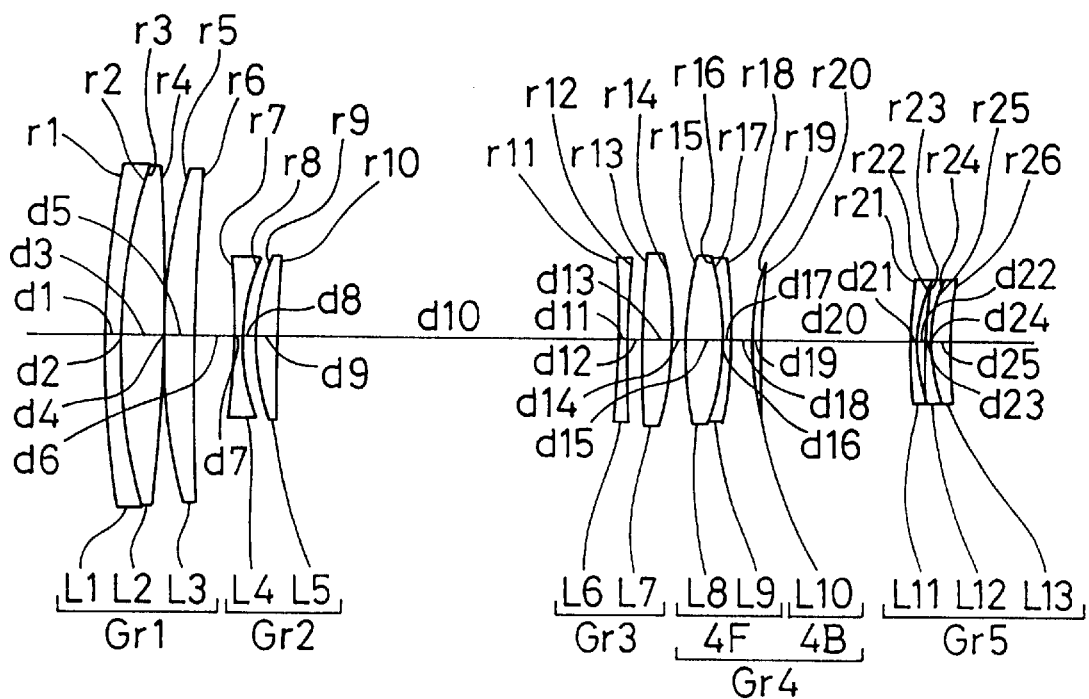
FIG. 39 shows the lens arrangement of the thirteenth embodiment of the present invention focused on a close object at the shortest focal length condition.
Figure 40A:
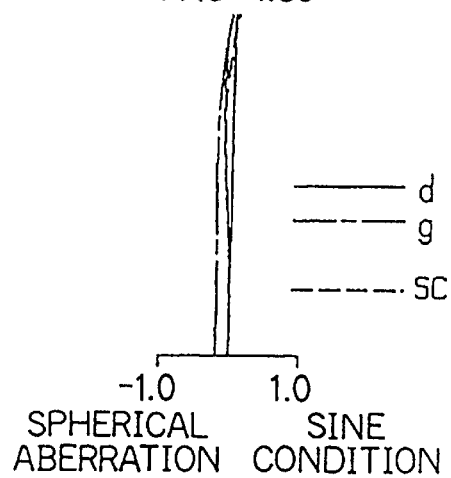
FIGS. 40A to 40C show aberration curves of the thirteenth embodiment focused on infinity at the shortest focal length condition.
Figure 40B:
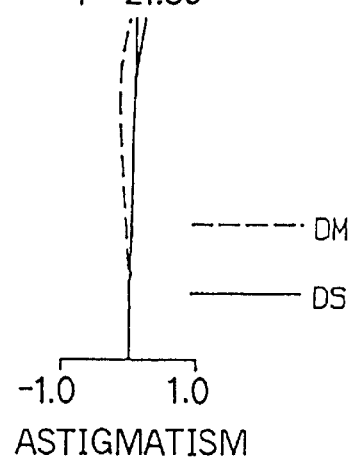
Figure 40C:
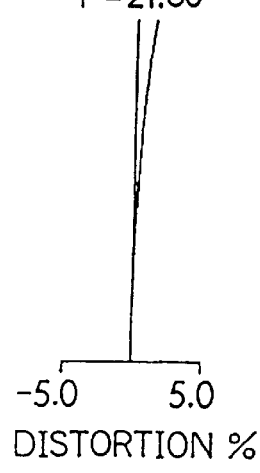
Figure 40D:
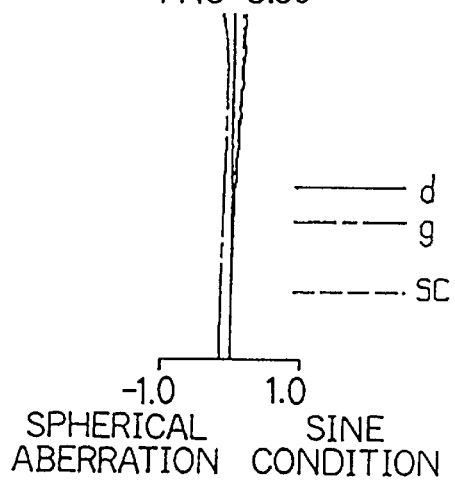
FIGS. 40D to 40F show aberration curves of the thirteenth embodiment focused on infinity at the middle focal length condition.
Figure 40E:
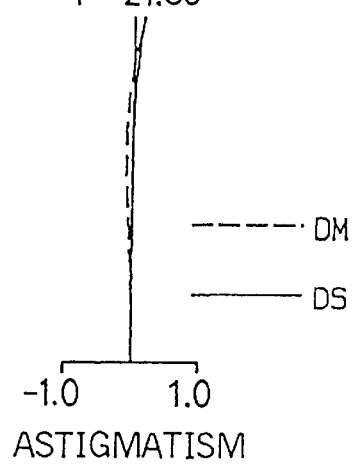
Figure 40F:
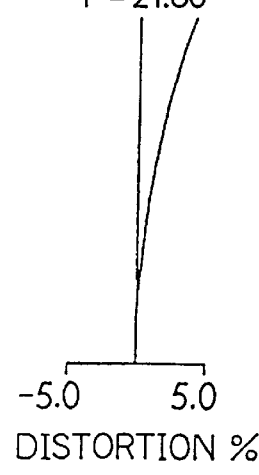
Figure 40G:
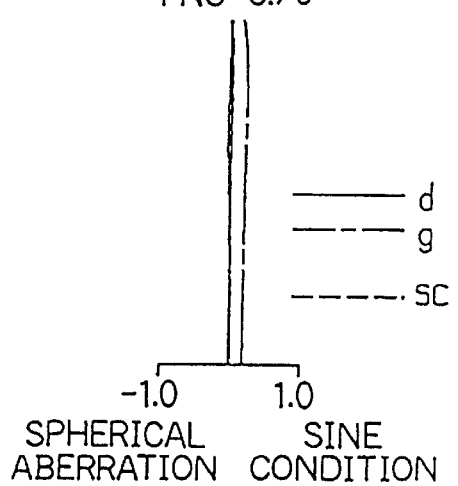
FIGS. 40G to 40I show aberration curves of the thirteenth embodiment focused on infinity at the longest focal length condition.
Figure 40H:
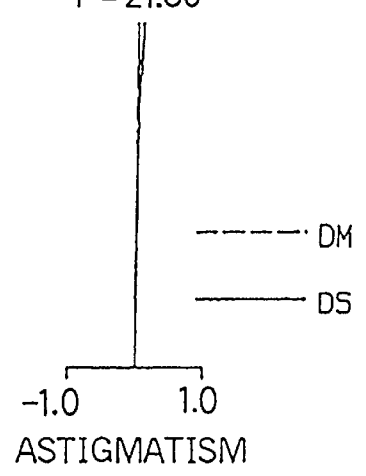
Figure 40I:
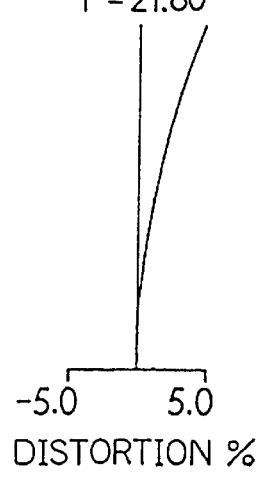
Figure 42:
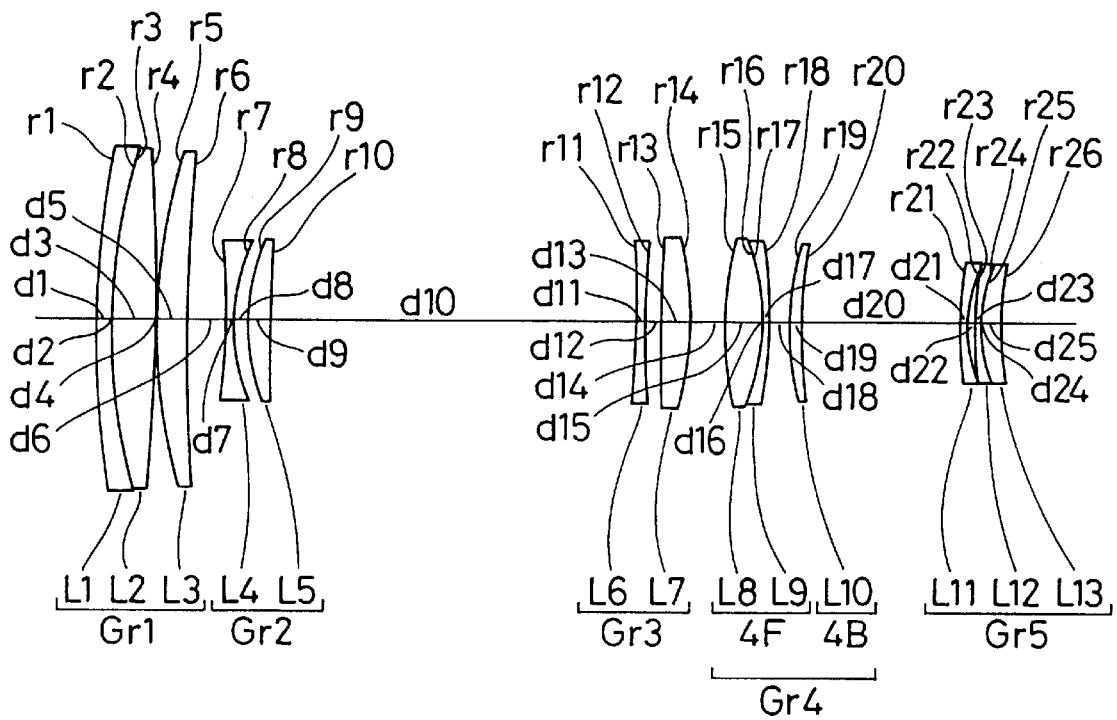
FIG. 42 shows the lens arrangement of a fourteenth embodiment of the present invention focused on infinity at the shortest focal length condition.
Figure 43:
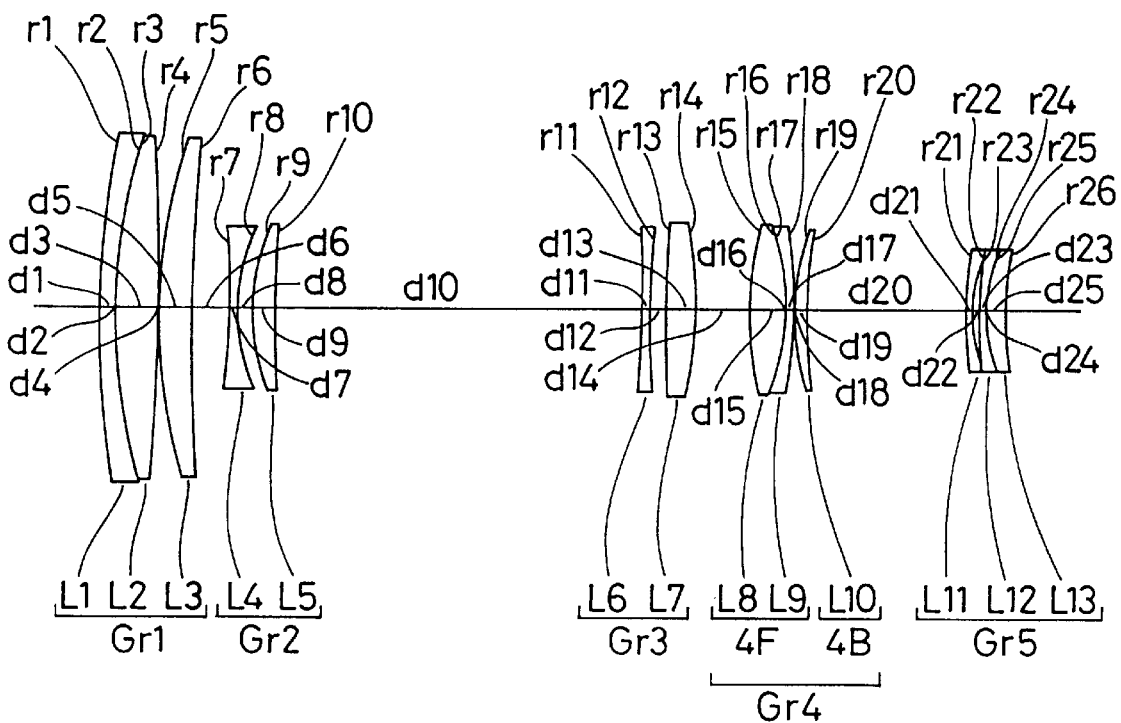
FIG. 43 shows the lens arrangement of the fourteenth embodiment of the present invention focused on a close object at the shortest focal length condition.
Figure 44A:
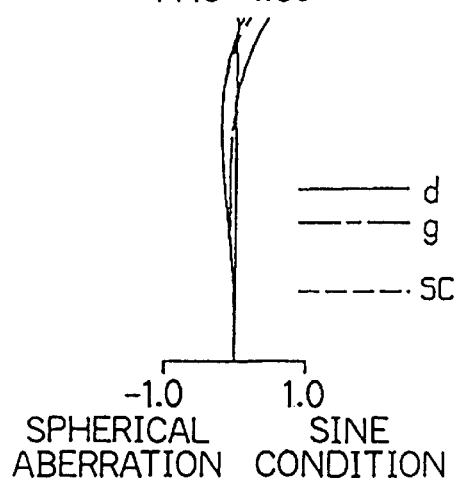
FIGS. 44A to 44C show aberration curves of the fourteenth embodiment focused on infinity at the shortest focal length condition.
Figure 44B:
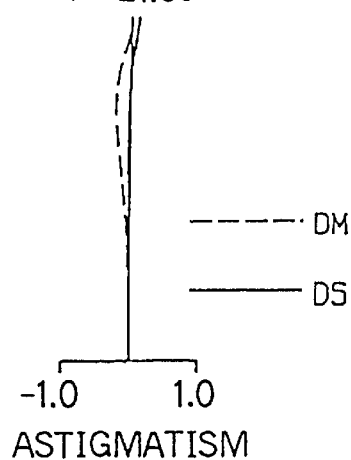
Figure 44C:
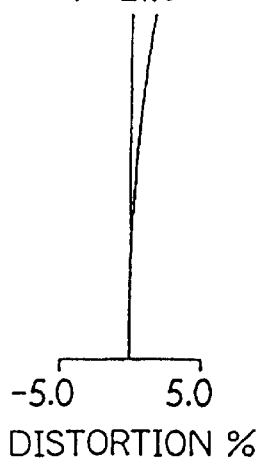
Figure 44D:
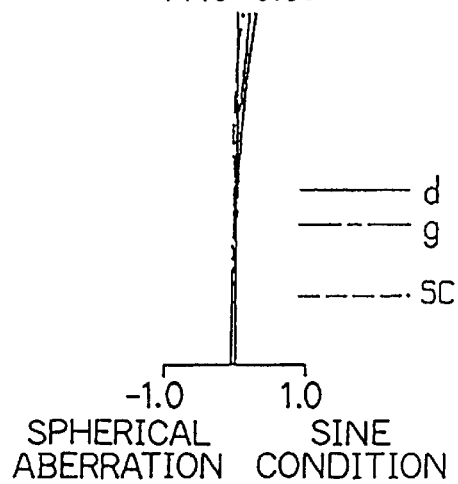
FIGS. 44D to 44F show aberration curves of the fourteenth embodiment focused on infinity at the middle focal length condition.
Figure 44E:
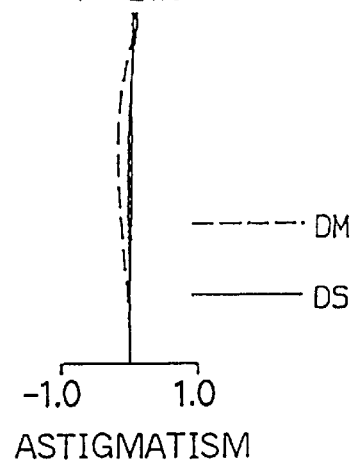
Figure 44F:
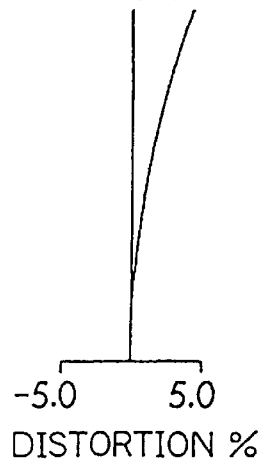
Figure 44G:
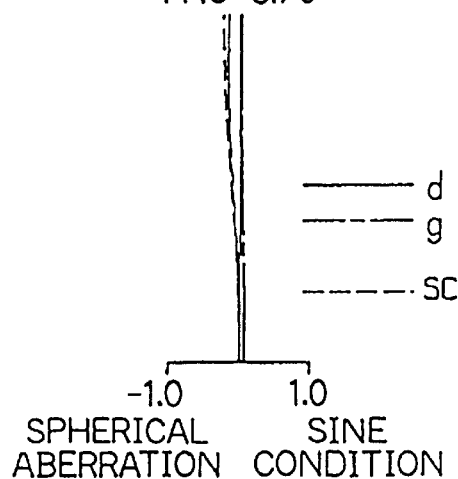
FIGS. 44G to 44I show aberration curves of the fourteenth embodiment focused on infinity at the longest focal length condition.
Figure 44H:
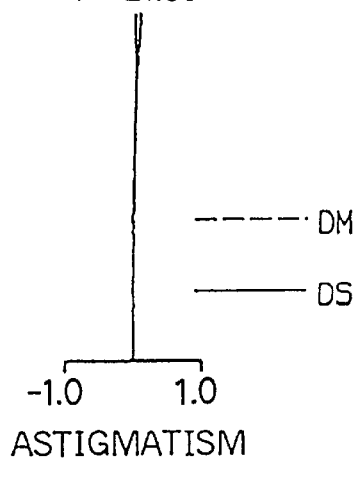
Figure 44I:
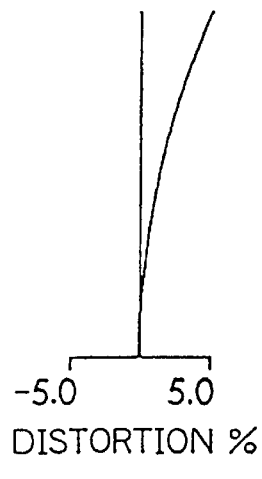

FIGS. 34, 36 and 38 show the lens arrangement of the twelfth to fourteenth embodiments focused on infinity at the shortest focal length. FIGS. 35, 37 and 39 show the lens arrangement of the twelfth to fourteenth embodiments focused on a close object (object distance is 1.5 mm) at the shortest focal length condition. The lens arrangements of the twelfth to fourteenth embodiments are substantially the same and will be described together.

The zoom lens systems of the twelfth to fourteenth embodiment comprise from the object side a first lens group Gr1 of a positive refractive power, a second lens group Gr2 of a negative refractive power, a third lens group Gr3 of a positive refractive power, a fourth lens group Gr4 of a positive refractive power and a fifth lens group Gr5 of a negative refractive power.

The first lens group Gr1 includes a first lens element L1 which is a negative meniscus lens convex to the object side, a second lens element L2 which is a bi-convex lens, and a third lens element L3 which is a positive meniscus lens convex to the object side.

The second lens group Gr2 includes a fourth lens element L4 which is a bi-concave lens and a fifth lens element L5 which is a positive meniscus lens convex to the object side.

The third lens group Gr3 includes a sixth lens element L6 which is a bi-concave lens and a seventh lens element L7 which is a bi-convex lens.

The fourth lens group Gr4 includes an eighth lens element L8 which is a bi-convex lens, a ninth lens element L9 which is a negative meniscus lens concave to the object side and a tenth lens element L10 which is a positive meniscus lens convex to the object side.

The fifth lens group Gr5 includes an eleventh lens element L11 and a twelfth lens element L12 which are negative meniscus lenses convex to the object side and a thirteenth lens element L13 which is a positive meniscus lens convex to the object side.

In the twelfth to fourteenth embodiments, the fourth lens group Gr4 includes an object side positive lens unit 4F and an image side positive lens unit 4B. The eighth lens element L8 and the ninth lens element L9 constitute the object side positive lens unit 4F, and the tenth lens element L10 corresponds to the image side positive lens unit 4B. Focusing for a close object is realized by integrally moving out the eighth and ninth lens elements L8 and L9 toward the object side.

FIGS. 36A to 36I, 40A to 40I and 44A to 44I show aberration curves of the twelfth to fourteenth embodiments focused on infinity. FIGS. 36A to 36C, 40A to 40C and 44A to 44C show aberration curves at the shortest focal length condition. FIGS. 36D to 36F, 40D to 40F and 44D to 44F show aberration curves at the middle focal length condition. FIGS. 36G to 36I, 40G to 40I and 44G to 44I show aberration curves at the longest focal length condition. FIGS. 37A to 37I, 41A to 41I and 45A to 45I show aberration curves when focusing is performed for a close object. FIGS. 37A to 37C, 41A to 41C and 45A to 45C show aberration curves at the shortest focal length condition (object distance is 1.5 m). FIGS. 37D to 37F, 41D to 41F and 45D to 45F show aberration curves at the middle focal length condition (object distance is 1.5 m). FIGS. 37G to 37I, 41G to 41I and 45G to 45I show aberration curves at the longest focal length condition (object distance is 0.85 m, magnification $\beta$ is $-0.5$).

As described above, in the twelfth to fourteenth embodiments, a positive lens group (fourth lens group Gr4) on the image side of the second lens group Gr2 is divided into the object side positive lens unit 4F and the image side positive lens unit 4B, and focusing is performed by moving out the object side positive lens unit 4F. Thus, since the refractive power of the moved-out unit (object side positive lens unit 4F) is reduced by performing focusing by a floating in the lens group of a positive refractive power, spherical aberration, field curvature and coma can excellently be corrected. In particular, at the longest focal length condition, excellent performance is secured even up to a magnification $\beta$ of $-0.5$.

Tables 21 to 23 show the coefficients of spherical aberration, coma and field curvature of the twelfth embodiment when the zoom lens system is focused on infinity and when focusing is performed by floating the object side positive lens unit 4F for an object located 0.85 m away. For comparison, these tables also show the aberration coefficients when focusing is performed by moving the entire fourth lens group Gr4 for an object located 0.85 m away.

With respect to spherical aberration, as is apparent from Table 21, when focusing is performed by the floating of the object side positive lens unit 4F, the aberration coefficients of the first to third lens groups Gr1 to Gr3 increase toward the plus side. However, since the aberration coefficient of the object side positive lens unit 4F increases toward the minus side, these increases countervail each other, so that the aberration coefficient of the entire lens system is a low minus value. When focusing is performed by moving out the fourth lens group Gr4, the plus coefficients of the first to third lens groups Gr1 to Gr3 and the image side positive lens unit 4B are small, so that the aberration coefficients of the entire lens system is a high minus value.

With respect to field curvature, as is apparent from Table 22, when focusing is performed by floating the object side positive lens unit 4F, the aberration coefficients of the first to third lens groups Gr1 to Gr3 increase toward the minus side. However, since the aberration coefficient of the object side positive lens unit 4F increases toward the plus side, these increases countervail each other, so that the aberration coefficients of the entire lens system is a low plus value. When focusing is performed by moving out the entire fourth lens group Gr4, the minus coefficient of the first to third lens groups Gr1 to Gr3 cannot sufficiently be countervail the plus coefficients of the fourth and fifth lens groups Gr4 and Gr5, so that the aberration coefficient of the entire lens system is a high plus value.

With respect to coma, as is apparent from Table 23, when focusing is performed by floating the object side positive lens unit 4F, although the aberration coefficient of each lens group is large, the aberration coefficient of the entire lens system is smaller than that of the case where focusing is performed by moving the entire fourth lens group Gr4.

Generally, the movement amount of the lens group in focusing is larger on the longer focal length side than on the shorter focal length side. For this reason, it is preferable that the distance between a lens group moved in focusing and a lens group toward which the moved lens group moves increases in zooming from the shorter focal length side to the longer focal length side. In the twelfth to fourteenth embodiments, the distance between the object side positive lens unit 4F moved in focusing and the third lens group Gr3 toward which the positive lens unit 4F is moved increases in zooming toward the longer focal length side.

The twelfth to fourteenth embodiments secure excellent performance by fulfilling the following condition (8):

$$0.2 < \frac{\phi B}{\phi} < 0.6 \qquad (8)$$

where $\phi \beta B$ is a refractive power of the image side positive lens unit 4B and $\phi$ is a refractive power of the fourth lens group Gr4.

The condition (8) is for excellently securing a close photography performance in enlargement photography. When $\phi B/\phi$ exceeds the lower limit of the condition (8), i.e. when the refractive power of the object side positive lens unit 4F is too strong, spherical aberration is undercorrected in close photography, so that off-axial coma and field curvature cannot be corrected. When φB/φ exceeds the upper limit of the condition (8), i.e. when the refractive power of the object side positive lens unit 4F is too weak, spherical aberration is overcorrected in close photography, so that the variation in axial chromatic aberration cannot be restrained. In the above embodiments, the refractive power of the object side positive lens unit 4F is 0.165. The coefficients of spherical aberration and coma at the longest focal length condition when the refractive power of the object side positive lens unit 4F is increased to 0.175 are shown in Table 24 with respect to the cases where the zoom lens system is focused on infinity and where focusing is performed for an object located 0.85 m away. As is apparent from Table 24, with respect to spherical aberration in close photography, the minus coefficients of the first to third lens groups Gr1 to Gr3 decrease and the plus coefficient of the object side positive lens unit 4F having the increased refractive power increases, so that the coefficient of the entire system is a high plus value to generate minus spherical aberration. With respect to coma, the coefficient of the object side positive lens unit 4F increases toward the minus side in close photography, so that the coefficient of the entire lens system is a high minus value.

When the refractive power of the object side positive lens unit 4F is weak, it is necessary that the object side positive lens unit 4F should largely be moved in focusing, so that interference readily occurs between the object side positive lens unit 4F and a lens group (third lens group Gr3 in the embodiments) adjoining the positive lens unit 4F on the object side. To prevent the interference, the distance between the object side positive lens unit 4F and the adjoining lens group is necessarily large in infinity photography, so that the size of the entire lens system increases.

In the twelfth to fourteenth embodiments, the image side positive lens unit 4B is a positive meniscus lens convex to the object side fulfilling the following condition (9):

$$1 < \left| \frac{R1 + R2}{R1 - R2} \right| < 4 \tag{9}$$

where R1 is a radius of curvature of the object side surface of the image side positive lens unit 4B (=r19) and R2 is a radius of curvature of the image side surface of the image side positive lens unit 4B (=r20).

The condition (9) defines the configuration of the image side positive lens unit 4B. When the lower limit of the condition (9) is exceeded, spherical aberration is overcorrected in close photography, so that off-axial coma cannot be removed. When the upper limit of the condition (9) is exceeded, spherical aberration is undercorrected in close photography, so that coma cannot be removed. In the above embodiments, |(R1+R2)/(R1−R2)| is 2.2. The coefficients of spherical aberration at the longest focal length condition when |(R1+R2)/(R1−R2)| is changed to 1.68 are shown in Table 25 with respect to the cases where the zoom lens system is focused on infinity and where focusing is performed for an object located at 0.85 m. As is apparent from Table 25, with respect to spherical aberration in close photography, the coefficient of the object side positive lens unit 4F increases toward the minus side, so that the coefficient of the entire lens system is a high minus value to generate plus spherical aberration.

The twelfth to fourteenth embodiments also fulfill the following conditions (10) and (11):

$$0.05 < \beta F1 < 0.9 \tag{10}$$

$$0.15 < \beta F2 < 0.4 \tag{11}$$

where βF1 is a magnification of the object side positive lens unit 4F when focusing is performed for infinity at the longest focal length condition and βF2 is a magnification of the object side positive lens unit 4F when focusing is performed for the shortest object distance at the longest focal length condition.

When βF1 exceeds the lower limit of the condition (10), i.e. when the magnification of the object side positive lens unit 4F is low in infinity photography, other lens groups necessarily have a high magnification, so that the size of the entire lens system increases. When βF1 exceeds the upper limit of the condition (10), the object side positive lens unit 4F should have a large variation in magnification, so that the number of lens elements of the object side positive lens unit 4F inevitably increases. Further, when βF1 exceeds 1, focusing cannot be performed in some ranges according to the distance.

When βF2 exceeds the lower limit of the condition (11), the magnification of the subject is too high in taking a subject located at the shortest object distance, so that the movement amount in focusing increases. When the upper limit of the condition (11) is exceeded, the variation in magnification of the object side positive lens unit 4F from the infinity photography is small, so that a desired magnification cannot be obtained.

The relationship between the conditions (8) to (11) and the twelfth to fourteenth embodiments are shown in Table 26.

Obviously, many modifications and variations of the present invention are possible in light of the above teachings. It is therefore to be understood that within the scope of the appended claims, the invention may be practiced other than as specifically described.

TABLE 1

(1st Embodiment)

| f = 36.00 to 50.00 to 68.60 | | FNo = 3.57 to 4.96 to 6.81 | |
|---|---|---|---|
| Radius of Curvature | Axial Distance | Refractive Index | Abbe Number |
| r1* 44.786 | d1 2.485 | N1 1.84506 | ν1 23.66 |
| r2* 24.678 | d2 3.803 | | |
| r3 5035.754 | d3 3.854 | N2 1.51680 | ν2 64.20 |
| r4 −13.438 | d4 1.261 | | |
| r5 35.223 | d5 1.261 | N3 1.51680 | ν3 64.20 |
| r6 90.000 | d6 2.028 | | |
| r7 Aperture stop | d7 12.976 to 7.393 to 3.500 | | |
| r8* −30.316 | d8 3.397 | N4 1.52510 | ν4 56.38 |
| r9 −21.109 | d9 5.042 | | |
| r10 −10.596 | d10 1.261 | N5 1.71300 | ν5 53.93 |
| r11 −37.363 | | | |

Aspherical Coefficients r1: ε = 0.9985  r2: ε = 1.0000
A4 = −0.24279759 × 10⁻³   A4 = −0.21274712 × 10⁻³
A6 = −0.12102189 × 10⁻⁵   A6 = −0.26432666 × 10⁻⁶
A8 = 0.29762773 × 10⁻⁷   A8 = 0.87221156 × 10⁻⁸
A10 = −0.52047570 × 10⁻⁹   A10 = 0.30952036 × 10⁻⁹
A12 = 0.41344317 × 10⁻¹¹   A12 = −0.52846106 × 10⁻¹¹
r8: ε = 1.0000
A3 = 0.54419114 × 10⁻⁴

TABLE 1-continued (1st Embodiment)

A4 = 0.48059016 × 10$^{-4}$
A5 = 0.30448522 × 10$^{-5}$
A6 = -0.68965777 × 10$^{-6}$
A7 = -0.36342435 × 10$^{-7}$
A8 = 0.42758928 × 10$^{-7}$
A9 = -0.19327248 × 10$^{-8}$
A10 = -0.28786801 × 10$^{-9}$
A11 = -0.12610123 × 10$^{-11}$
A12 = 0.24513587 × 10$^{-11}$
A14 = -0.35116931 × 10$^{-14}$

TABLE 2

(2nd Embodiment)

f = 39.35 to 58.50 to 86.63     FNo = 3.56 to 5.30 to 7.84

| | Radius of Curvature | | Axial Distance | | Refractive Index | | Abbe Number |
|---|---|---|---|---|---|---|---|
| r1 | 19.696 | d1 | 3.200 | N1 | 1.54072 | ν1 | 47.22 |
| r2 | -5523.946 | d2 | 0.700 | | | | |
| r3 | -37.888 | d3 | 2.360 | N2 | 1.83400 | ν2 | 37.05 |
| r4 | 44.635 | d4 | 3.790 | | | | |
| r5* | -104.751 | d5 | 1.700 | N3 | 1.58400 | ν3 | 31.00 |
| r6 | -124.708 | d6 | 2.240 | | | | |
| r7 | 42.602 | d7 | 3.650 | N4 | 1.49310 | ν4 | 83.58 |
| r8 | -18.189 | d8 | 1.200 | | | | |
| r9 | Aperture stop | d9 | 1.000 | | | | |
| r10 | 44.912 | d10 | 1.000 | N5 | 1.51680 | ν5 | 64.20 |
| r11 | 170.569 | d11 | 11.131 to 5.678 to 2.040 | | | | |
| r12 | -31.515 | d12 | 2.700 | N6 | 1.70055 | ν6 | 27.58 |
| r13 | -18.608 | d13 | 3.810 | | | | |
| r14 | -17.762 | d14 | 1.500 | N7 | 1.80500 | ν7 | 40.97 |
| r15 | -118.068 | d15 | 3.700 | | | | |
| r16 | -14.870 | d16 | 1.800 | N8 | 1.71700 | ν8 | 47.86 |
| r17 | -28.071 | | | | | | |

Aspherical Coefficients r5: ε = 1.0000
A4 = -0.40802208 × 10$^{-4}$
A6 = -0.23185547 × 10$^{-6}$
A8 = 0.21236418 × 10$^{-8}$
A10 = -0.51349555 × 10$^{-10}$
A12 = -0.52008093 × 10$^{-12}$

TABLE 3

(3rd Embodiment)

f = 31.00 to 43.00 to 58.20     FNo = 3.57 to 4.96 to 6.71

| | Radius of Curvature | | Axial Distance | | Refractive Index | | Abbe Number |
|---|---|---|---|---|---|---|---|
| r1* | -17.012 | d1 | 2.808 | N1 | 1.84506 | ν1 | 23.66 |
| r2* | -26.731 | d2 | 2.025 | | | | |
| r3 | 181.494 | d3 | 7.451 | N2 | 1.48749 | ν2 | 70.44 |
| r4 | -11.703 | d4 | 0.904 | | | | |
| r5 | Aperture stop | d5 | 0.608 | | | | |
| r6* | 35.592 | d6 | 1.216 | N3 | 1.52510 | ν3 | 56.38 |
| r7 | 76.842 | d7 | 9.842 to 5.757 to 3.000 | | | | |
| r8* | -49.850 | d8 | 3.240 | N4 | 1.52510 | ν4 | 56.38 |
| r9* | -21.084 | d9 | 4.861 | | | | |
| r10 | -10.256 | d10 | 1.080 | N5 | 1.78100 | ν5 | 44.55 |
| r11 | -88.858 | | | | | | |

Aspherical Coefficients r1: ε = -8.2358                                r2: ε = -2.2959
A4 = -0.19676585 × 10$^{-3}$      A4 = 0.98340436 × 10$^{-4}$
A6 = 0.30075765 × 10$^{-5}$       A6 = 0.16463165 × 10$^{-5}$
A8 = -0.10160416 × 10$^{-7}$      A8 = -0.41041506 × 10$^{-8}$

TABLE 3-continued (3rd Embodiment)

A10 = 0.22016812 × 10$^{-9}$      A10 = 0.42036179 × 10$^{-9}$
A12 = -0.60688073 × 10$^{-11}$    A12 = -0.13190606 × 10$^{-11}$

TABLE 4

(4th Embodiment)

f = 36.00 to 50.00 to 68.60     FNo = 3.57 to 4.96 to 6.81

| | Radius of Curvature | | Axial Distance | | Refractive Index | | Abbe Number |
|---|---|---|---|---|---|---|---|
| r1* | 41.000 | d1 | 2.485 | N1 | 1.84506 | ν1 | 23.66 |
| r2* | 23.818 | d2 | 3.803 | | | | |
| r3 | 4874.482 | d3 | 3.854 | N2 | 1.51680 | ν2 | 64.20 |
| r4 | -12.949 | d4 | 1.261 | | | | |
| r5 | Aperture stop | d5 | 1.261 | | | | |
| r6 | 37.895 | d6 | 2.028 | N3 | 1.51680 | ν3 | 64.20 |
| r7 | 90.000 | d7 | 12.407 to 7.159 to 3.500 | | | | |
| r8* | -33.818 | d8 | 3.397 | N4 | 1.52510 | ν4 | 56.38 |
| r9 | -22.227 | d9 | 5.042 | | | | |
| r10 | -10.594 | d10 | 1.261 | N5 | 1.71300 | ν5 | 53.93 |
| r11 | -42.637 | | | | | | |

Aspherical Coefficients r1: ε = 0.9960                                 r2: ε = 1.0000
A4 = -0.24279759 × 10$^{-3}$      A4 = -0.21274712 × 10$^{-3}$
A6 = -0.39296531 × 10$^{-6}$      A6 = 0.15034135 × 10$^{-5}$
A8 = 0.68863972 × 10$^{-9}$       A8 = -0.59831747 × 10$^{-7}$
A10 = -0.25225397 × 10$^{-9}$     A10 = 0.12386784 × 10$^{-8}$
A12 = 0.40201387 × 10$^{-11}$     A12 = -0.83577193 × 10$^{-11}$
r8: ε = 1.0000
A3 = 0.54419114 × 10$^{-4}$
A4 = 0.48059016 × 10$^{-4}$
A5 = 0.30448522 × 10$^{-5}$
A6 = -0.30343573 × 10$^{-6}$
A7 = -0.36342435 × 10$^{-7}$
A8 = 0.26691497 × 10$^{-7}$
A9 = -0.19327248 × 10$^{-8}$
A10 = -0.17101988 × 10$^{-10}$
A11 = -0.12610123 × 10$^{-11}$
A12 = 0.47962514 × 10$^{-12}$
A14 = 0.12987522 × 10$^{-14}$

TABLE 5

(5th Embodiment)

f = 36.00 to 50.00 to 68.60     FNo = 3.57 to 4.96 to 6.81

| | Radius of Curvature | | Axial Distance | | Refractive Index | | Abbe Number |
|---|---|---|---|---|---|---|---|
| r1* | 42.117 | d1 | 2.485 | N1 | 1.84506 | ν1 | 23.66 |
| r2* | 24.487 | d2 | 3.803 | | | | |
| r3 | -370.113 | d3 | 3.854 | N2 | 1.51680 | ν2 | 64.20 |
| r4 | -13.069 | d4 | 1.261 | | | | |
| r5 | Aperture stop | d5 | 1.261 | | | | |
| r6* | 32.401 | d6 | 2.028 | N3 | 1.51680 | ν3 | 64.20 |
| r7 | 85.000 | d7 | 12.089 to 7.028 to 3.500 | | | | |
| r8* | -33.106 | d8 | 3.397 | N4 | 1.52510 | ν4 | 56.38 |
| r9 | -22.270 | d9 | 5.042 | | | | |
| r10 | -10.324 | d10 | 1.261 | N5 | 1.71300 | ν5 | 53.93 |
| r11 | -39.540 | | | | | | |

Aspherical Coefficients r1: ε = 0.9953                                 r2: ε = 1.0000
A4 = -0.24279759 × 10$^{-3}$      A4 = -0.21274712 × 10$^{-3}$
A6 = -0.42126858 × 10$^{-6}$      A6 = 0.13146605 × 10$^{-5}$
A8 = 0.25437191 × 10$^{-8}$       A8 = -0.56256766 × 10$^{-7}$
A10 = -0.28686297 × 10$^{-9}$     A10 = 0.12424906 × 10$^{-8}$
A12 = 0.42969158 × 10$^{-11}$     A12 = -0.89415740 × 10$^{-11}$

TABLE 5-continued (5th Embodiment)

r6: $\epsilon$ = 1.0000
A6 = 0.65996618 × 10$^{-6}$
A8 = -0.36475126 × 10$^{-7}$
A10 = 0.68877530 × 10$^{-9}$
A14 = -0.10873675 × 10$^{-12}$ r8: $\epsilon$ = 1.0000
A3 = 0.54419114 × 10$^{-4}$
A4 = 0.48059016 × 10$^{-4}$
A5 = 0.30448522 × 10$^{-5}$
A6 = -0.19922398 × 10$^{-6}$
A7 = -0.36342435 × 10$^{-7}$
A8 = 0.28682819 × 10$^{-7}$
A9 = -0.19327248 × 10$^{-8}$
A10 = -0.77665404 × 10$^{-10}$
A11 = -0.12610123 × 10$^{-11}$
A12 = 0.10609660 × 10$^{-11}$
A14 = -0.42068622 × 10$^{-16}$

TABLE 6

(6th Embodiment)

f = 38.90 to 68.01 to 111.94    FNo = 3.62 to 6.04 to 9.42

| Radius of Curvature | | Axial Distance | Refractive Index | | Abbe Number | |
|---|---|---|---|---|---|---|
| r1 | -20.058 | d1 | 1.513 | N1 1.77250 | v1 | 49.77 |
| r2 | -34.580 | d2 | 0.388 | | | |
| r3 | -1117.518 | d3 | 4.080 | N2 1.48749 | v2 | 70.44 |
| r4 | -22.622 | d4 | 4.081 to 9.883 to 15.936 | | | |
| r5* | 21.932 | d5 | 2.249 | N3 1.84666 | v3 | 23.82 |
| r6* | 17.785 | d6 | 6.213 | | | |
| r7 | -418.480 | d7 | 4.204 | N4 1.48749 | v4 | 70.44 |
| r8 | -14.788 | d8 | 0.860 | | | |
| r9 | 107.418 | d9 | 1.360 | N5 1.48749 | v5 | 70.44 |
| r10 | -272.028 | d10 | 12.573 to 6.352 to 2.880 | | | |
| r11* | -26.549 | d11 | 4.080 | N6 1.58340 | v6 | 30.23 |
| r12* | -17.150 | d12 | 2.721 | | | |
| r13 | -12.101 | d13 | 1.009 | N7 1.77250 | v7 | 49.77 |
| r14 | -147.813 | | | | | |

Aspherical Coefficients r5: $\epsilon$ = 1.0000
A4 = -0.10126723 × 10$^{-3}$
A6 = -0.10718036 × 10$^{-5}$
A8 = 0.73987697 × 10$^{-9}$
A10 = 0.56968173 × 10$^{-10}$
A12 = -0.14414220 × 10$^{-11}$ r6: $\epsilon$ = 1.0000
A4 = -0.78735391 × 10$^{-4}$
A6 = -0.16288561 × 10$^{-5}$
A8 = 0.22410632 × 10$^{-7}$
A10 = -0.19247309 × 10$^{-9}$
A12 = -0.14501733 × 10$^{-11}$
A14 = 0.58742733 × 10$^{-15}$
A16 = 0.51688259 × 10$^{-16}$ r11: $\epsilon$ = 1.0000
A3 = -0.34470686 × 10$^{-3}$
A4 = 0.23008151 × 10$^{-3}$
A5 = -0.40972197 × 10$^{-4}$
A6 = 0.42710106 × 10$^{-5}$
A7 = 0.71600003 × 10$^{-7}$
A8 = -0.42456378 × 10$^{-7}$
A9 = -0.39633816 × 10$^{-9}$
A10 = 0.31118291 × 10$^{-9}$
A11 = 0.72490426 × 10$^{-11}$
A12 = -0.18483754 × 10$^{-11}$
A13 = 0.54285163 × 10$^{-15}$
A14 = 0.57168123 × 10$^{-15}$
A15 = 0.89417486 × 10$^{-16}$
A16 = 0.10188280 × 10$^{-16}$ r12: $\epsilon$ = 1.0000
A3 = -0.32130132 × 10$^{-3}$
A4 = 0.11904510 × 10$^{-3}$
A5 = -0.12503235 × 10$^{-4}$
A6 = -0.28083488 × 10$^{-6}$
A7 = 0.37825719 × 10$^{-7}$
A8 = 0.38436424 × 10$^{-7}$
A9 = -0.63265745 × 10$^{-8}$
A10 = 0.11170748 × 10$^{-9}$
A11 = 0.28043181 × 10$^{-10}$
A12 = -0.14326286 × 10$^{-11}$
A13 = -0.14113636 × 10$^{-14}$

TABLE 7

| Conditions | (1) | (2) | (3) |
|---|---|---|---|
| Claimed ranges | 0.2 to 3.3 | 2.0 to 7.0 | 0 to 0.5 |
| 1st Embodiment | 2.3 | 4.00 | — |
| 2nd Embodiment | 1.7 | 4.19 | — |
| 3rd Embodiment | 2.7 | 5.65 | — |
| 4th Embodiment | 2.5 | 4.58 | — |
| 5th Embodiment | 2.2 | 3.72 | 0.2 |
| 6th Embodiment | 0.4 | 5.04 | — |

TABLE 8

(7th Embodiment)

f = 102.49 to 200.00 to 390.00    FNo = 4.60 to 5.80 to 6.90

| Radius of Curvature | | Axial Distance | Refractive Index | | Abbe Number | |
|---|---|---|---|---|---|---|
| r1 | 305.150 | d1 | 2.500 | N1 1.74950 | v1 | 35.17 |
| r2 | 113.747 | d2 | 0.100 | | | |
| r3 | 113.747 | d3 | 8.000 | N2 1.49520 | v2 | 79.74 |
| r4 | -201.331 | d4 | 0.200 | | | |
| r5 | 97.280 | d5 | 7.000 | N3 1.48749 | v3 | 70.44 |
| r6 | -241.963 | d6 | 2.000 | N4 1.66446 | v4 | 35.84 |
| r7 | -912.542 | d7 | 3.000 | | | |
| r8 | -175.089 | d8 | 5.000 | N5 1.75690 | v5 | 31.79 |
| r9 | -105.000 | d9 | 1.926 | N6 1.70500 | v6 | 54.86 |
| r10 | -210.949 | d10 | 2.000 to 38.139 to 78.698 | | | |
| r11 | -84.155 | d11 | 1.400 | N7 1.69680 | v7 | 56.47 |
| r12 | 66.744 | d12 | 4.350 | | | |
| r13 | 89.458 | d13 | 2.400 | N8 1.75520 | v8 | 27.51 |
| r14 | -405.569 | d14 | 50.186 to 26.566 to 3.801 | | | |
| r15 | -102.412 | d15 | 1.500 | N9 1.84666 | v9 | 23.83 |
| r16 | 52.264 | d16 | 2.700 | | | |
| r17 | 396.646 | d17 | 3.000 | N10 1.59270 | v10 | 35.45 |
| r18 | -58.865 | d18 | 1.400 | | | |
| r19 | 93.421 | d19 | 2.400 | N11 1.54072 | v11 | 47.20 |
| r20 | -121.347 | d20 | 0.100 | | | |
| r21 | 49.680 | d21 | 4.500 | N12 1.48749 | v12 | 70.44 |
| r22 | -56.036 | d22 | 31.312 to 18.794 to 0.999 | | | |
| r23 | 166.429 | d23 | 1.200 | N13 1.75450 | v13 | 51.57 |
| r24 | 31.241 | d24 | 3.300 | | | |
| r25 | -222.323 | d25 | 3.200 | N14 1.67339 | v14 | 29.25 |
| r26 | -28.701 | d26 | 1.200 | N15 1.69680 | v15 | 56.47 |
| r27 | 929.092 | | | | | |

TABLE 9

(8th Embodiment)

f = 102.50 to 200.02 to 390.03    FNo = 4.60 to 5.80 to 6.90

| Radius of Curvature | | Axial Distance | Refractive Index | | Abbe Number | |
|---|---|---|---|---|---|---|
| r1 | 261.642 | d1 | 2.500 | N1 1.74950 | v1 | 35.17 |
| r2 | 108.759 | d2 | 0.100 | | | |
| r3 | 108.759 | d3 | 8.000 | N2 1.49520 | v2 | 79.74 |
| r4 | -207.571 | d4 | 0.200 | | | |
| r5 | 96.329 | d5 | 7.000 | N3 1.48749 | v3 | 70.44 |
| r6 | -265.736 | d6 | 2.000 | N4 1.66446 | v4 | 35.84 |
| r7 | -2709.366 | d7 | 3.000 | | | |
| r8 | -178.334 | d8 | 5.000 | N5 1.75690 | v5 | 31.79 |
| r9 | -103.567 | d9 | 1.926 | N6 1.70500 | v6 | 54.86 |
| r10 | -207.712 | d10 | 62.168 to 38.075 to 78.409 | | | |
| r11 | -83.651 | d11 | 1.400 | N7 1.69680 | v7 | 56.47 |
| r12 | 64.171 | d12 | 4.350 | | | |
| r13 | 87.300 | d13 | 2.400 | N8 1.75520 | v8 | 27.51 |
| r14 | -366.027 | d14 | 12.101 to 26.483 to 3.801 | | | |
| r15 | -100.969 | d15 | 1.500 | N9 1.84666 | v9 | 23.83 |
| r16 | 50.672 | d16 | 2.700 | | | |
| r17 | 413.244 | d17 | 3.000 | N10 1.59270 | v10 | 35.45 |
| r18 | -58.845 | d18 | 1.400 | | | |
| r19 | 92.379 | d19 | 2.400 | N11 1.54072 | v11 | 47.20 |
| r20 | -117.153 | d20 | 0.100 | | | |

TABLE 9-continued (8th Embodiment)

f = 102.50 to 200.02 to 390.03    FNo = 4.60 to 5.80 to 6.90

| | Radius of Curvature | | Axial Distance | | Refractive Index | | Abbe Number |
|---|---|---|---|---|---|---|---|
| r21 | 49.906 | d21 | 4.500 | N12 | 1.48749 | v12 | 70.44 |
| r22 | −53.703 | d22 | 11.113 | | | | |
| r23 | ∞ | d23 | 8.940 to 18.652 to 0.999 | | | | |
| r24 | 159.038 | d24 | 1.200 | N13 | 1.75450 | v13 | 51.57 |
| r25 | 31.715 | d25 | 3.300 | | | | |
| r26 | −222.323 | d26 | 3.200 | N14 | 1.67339 | v14 | 29..25 |
| r27 | −28.417 | d27 | 1.210 | N15 | 1.69680 | v15 | 56.47 |
| r28 | 550.903 | | | | | | |

TABLE 10

(9th Embodiment)

f = 102.50 to 200.02 to 390.04    FNo = 5.00 to 5.80 to 7.30

| | Radius of Curvature | | Axial Distance | | Refractive Index | | Abbe Number |
|---|---|---|---|---|---|---|---|
| r1 | 240.822 | d1 | 2.500 | N1 | 1.74950 | v1 | 35.17 |
| r2 | 118.569 | d2 | 0.100 | | | | |
| r3 | 118.569 | d3 | 8.000 | N2 | 1.49520 | v2 | 79.74 |
| r4 | −196.862 | d4 | 0.200 | | | | |
| r5 | 100.147 | d5 | 7.000 | N3 | 1.48749 | v3 | 70.44 |
| r6 | −271.323 | d6 | 2.000 | N4 | 1.66446 | v4 | 35.84 |
| r7 | 2446.723 | d7 | 3.000 | | | | |
| r8 | −121.797 | d8 | 5.000 | N5 | 1.75690 | v5 | 31.79 |
| r9 | −89.356 | d9 | 1.926 | N6 | 1.70500 | v6 | 54.86 |
| r10 | −130.709 | d10 | 62.301 to 38.133 to 78.623 | | | | |
| r11 | −85.703 | d11 | 1.400 | N7 | 1.69680 | v7 | 56.47 |
| r12 | 63.693 | d12 | 4.350 | | | | |
| r13 | 86.379 | d13 | 2.400 | N8 | 1.75520 | v8 | 27.51 |
| r14 | −403.613 | d14 | 12.154 to 26.579 to 3.802 | | | | |
| r15 | −101.095 | d15 | 1.500 | N9 | 1.84666 | v9 | 23.83 |
| r16 | 51.784 | d16 | 2.700 | | | | |
| r17 | 398.268 | d17 | 3.000 | N10 | 1.59270 | v10 | 35.45 |
| r18 | −59.574 | d18 | 1.400 | | | | |
| r19 | 90.912 | d19 | 2.400 | N11 | 1.54072 | v11 | 47.20 |
| r20 | −116.354 | d20 | 0.100 | | | | |
| r21 | 50.397 | d21 | 4.500 | N12 | 1.48749 | v12 | 70.44 |
| r22 | −55.300 | d22 | 11.113 | | | | |
| r23 | ∞ | d23 | 8.969 to 18.711 to 0.999 | | | | |
| r24 | 168.915 | d24 | 1.200 | N13 | 1.75450 | v13 | 51.57 |
| r25 | 31.943 | d25 | 3.300 | | | | |
| r26 | −222.323 | d26 | 3.200 | N14 | 1.67339 | v14 | 29.25 |
| r27 | −28.240 | d27 | 1.210 | N15 | 1.69680 | v15 | 56.47 |
| r28 | 602.824 | | | | | | |

TABLE 11

(10th Embodiment)

f = 103.03 to 200.05 to 388.09    FNo = 4.60 to 6.70 to 6.70

| | Radius of Curvature | | Axial Distance | | Refractive Index | | Abbe Number |
|---|---|---|---|---|---|---|---|
| r1 | 155.811 | d1 | 2.746 | N1 | 1.79850 | v1 | 22.60 |
| r2 | 94.669 | d2 | 7.250 | N2 | 1.51112 | v2 | 60.49 |
| r3 | −307.341 | d3 | 0.200 | | | | |
| r4 | 120.327 | d4 | 4.983 | N3 | 1.48749 | v3 | 70.15 |
| r5 | 447.173 | d5 | 4.000 | | | | |
| r6 | −279.735 | d6 | 2.000 | N4 | 1.74400 | v4 | 44.93 |
| r7 | −301.315 | d7 | 2.245 to 45.672 to 74.540 | | | | |
| r8 | −108.961 | d8 | 1.423 | N5 | 1.80500 | v5 | 40.97 |
| r9 | 30.251 | d9 | 2.415 | | | | |
| r10 | 36.409 | d10 | 3.592 | N6 | 1.78472 | v6 | 25.70 |
| r11 | 628.504 | d11 | 47.968 to 31.949 to 11.930 | | | | |
| r12 | −124.983 | d12 | 1.593 | N7 | 1.84666 | v7 | 23.89 |
| r13 | 357.276 | d13 | 2.574 | | | | |
| r14 | 225.977 | d14 | 5.289 | N8 | 1.61772 | v8 | 49.82 |

TABLE 11-continued (10th Embodiment)

f = 103.03 to 200.05 to 388.09    FNo = 4.60 to 6.70 to 6.70

| | Radius of Curvature | | Axial Distance | | Refractive Index | | Abbe Number |
|---|---|---|---|---|---|---|---|
| r15 | −42.260 | d15 | 4.380 to 20.398 to 40.417 | | | | |
| r16 | 50.844 | d16 | 8.000 | N9 | 1.51680 | v9 | 64.20 |
| r17 | −40.778 | d17 | 1.371 | N10 | 1.83400 | v10 | 37.17 |
| r18 | −120.316 | d18 | 41.280 to 26.877 to 1.567 | | | | |
| r19 | 2689.329 | d19 | 1.169 | N11 | 1.80500 | v11 | 40.97 |
| r20 | 37.244 | d20 | 2.000 | | | | |
| r21 | 203.245 | d21 | 1.097 | N12 | 1.77250 | v12 | 49.77 |
| r22 | 28.531 | d22 | 3.207 | N13 | 1.75000 | v13 | 25.14 |
| r23 | 155.833 | | | | | | |

TABLE 12

(11th Embodiment)

f = 103.03 to 200.05 to 388.08    FNo = 4.60 to 5.60 to 6.70

| | Radius of Curvature | | Axial Distance | | Refractive Index | | Abbe Number |
|---|---|---|---|---|---|---|---|
| r1 | 180.745 | d1 | 2.746 | N1 | 1.79850 | v1 | 22.60 |
| r2 | 104.321 | d2 | 7.250 | N2 | 1.51112 | v2 | 60.49 |
| r3 | −292.520 | d3 | 0.200 | | | | |
| r4 | 120.622 | d4 | 4.983 | N3 | 1.48749 | v3 | 70.15 |
| r5 | 578.152 | d5 | 5.000 | | | | |
| r6 | −431.624 | d6 | 2.000 | N4 | 1.74400 | v4 | 44.93 |
| r7 | −609.184 | d7 | 1.781 to 45.208 to 74.076 | | | | |
| r8 | −128.666 | d8 | 1.423 | N5 | 1.80500 | v5 | 40.97 |
| r9 | 31.620 | d9 | 2.415 | | | | |
| r10 | 37.473 | d10 | 3.592 | N6 | 1.78472 | v6 | 25.70 |
| r11 | 868.855 | d11 | 55.735 to 36.385 to 11.931 | | | | |
| r12 | −132.424 | d12 | 1.593 | N7 | 1.84666 | v7 | 23.89 |
| r13 | 331.299 | d13 | 2.574 | | | | |
| r14 | 237.754 | d14 | 5.289 | N8 | 1.61772 | v8 | 49.82 |
| r15 | −45.344 | d15 | 4.742 to 24.092 to 48.546 | | | | |
| r16 | 52.512 | d16 | 8.000 | N9 | 1.51680 | v9 | 64.20 |
| r17 | −42.807 | d17 | 1.371 | N10 | 1.83400 | v10 | 37.17 |
| r18 | −120.151 | d18 | 42.740 to 27.450 to 1.567 | | | | |
| r19 | 5621.451 | d19 | 1.169 | N11 | 1.80500 | v11 | 40.97 |
| r20 | 38.089 | d20 | 2.000 | | | | |
| r21 | 206.554 | d21 | 1.097 | N12 | 1.77250 | v12 | 49.77 |
| r22 | 28.480 | d22 | 3.207 | N13 | 1.75000 | v13 | 25.14 |
| r23 | 147.650 | | | | | | |

TABLE 13

| | | W | M | T |
|---|---|---|---|---|
| 7th Embodiment | d7 | 3.000 to 33.177 | 3.000 to 18.491 | 3.000 to 10.952 |
| | d10 | 2.000 to 14.933 | 38.138 to 44.778 | 78.698 to 82.105 |
| 8th Embodiment | d7 | 3.000 to 46.043 | 3.000 to 25.056 | 3.000 to 14.311 |
| 9th embodiment | d7 | 3.000 to 38.511 | 3.000 to 25.746 | 3.000 to 14.665 |
| 10th Embodiment | d5 | 4.000 to 58.391 | 4.000 to 32.012 | 4.000 to 18.439 |
| 11th Embodiment | d5 | 5.000 to 61.184 | 5.000 to 33.935 | 5.000 to 19.915 |

TABLE 14

|  | Power Arrangement | G1b | $\frac{D1b}{D1a}$ | $\frac{f1b}{f1a}$ | $\frac{R2 + R1}{R2 - R1}$ |
|---|---|---|---|---|---|
| 7th Embodiment | PNPN | N | 0.3 | −18.0 | 10.8 |
| 8th Embodiment | PNPN | N | 0 | −26.0 | 13.1 |
| 9th Embodiment | PNPN | N | 0 | −74.1 | 28.3 |
| 10th Embodiment | PNPPN | N | 0 | −37.1 | 26.9 |
| 11th Embodiment | PNPPN | N | 0 | −13.1 | 5.9 |

P: Positive
N: Negative

TABLE 15

(12th Embodiment)(Infinity)
f = 103.0 to 200.0 to 388.0    FNo = 4.6

| Radius of Curvature | Axial Distance | Refractive Index | Abbe Number |
|---|---|---|---|
| r1   167.916 | d1   2.746 | N1   1.80518 | v1   25.43 |
| r2   107.289 | d2   0.010 | N2   1.51400 | v2   42.83 |
| r3   107.289 | d3   7.240 | N3   1.48749 | v3   70.15 |
| r4  −354.482 | d4   0.200 | | |
| r5   112.116 | d5   4.983 | N4   1.48749 | v4   70.15 |
| r6   438.989 | d6   7.107 to 50.107 to 79.402 | | |
| r7  −126.463 | d7   1.423 | N5   1.80500 | v5   40.97 |
| r8    35.938 | d8   2.415 | | |
| r9    39.795 | d9   3.592 | N6   1.78472 | v6   25.70 |
| r10   315.000 | d10  59.218 to 29.111 to 11.930 | | |
| r11  −199.356 | d11  1.593 | N7   1.84666 | v7   23.89 |
| r12   156.117 | d12  2.574 | | |
| r13   165.707 | d13  5.289 | N8   1.60729 | v8   49.34 |
| r14   −58.284 | d14  5.596 to 35.703 to 52.884 | | |
| r15    68.284 | d15  6.450 | N9   1.51728 | v9   69.43 |
| r16   −46.789 | d16  0.010 | N10  1.51400 | v10  42.83 |
| r17   −46.789 | d17  1.361 | N11  1.80750 | v11  35.43 |
| r18   −99.502 | d18  0.200 | | |
| r19    42.106 | d19  1.500 | N12  1.48749 | v12  70.44 |
| r20   112.634 | d20  25.493 to 17.297 to 0.800 | | |
| r21   121.357 | d21  1.169 | N13  1.78100 | v13  44.55 |
| r22    28.750 | d22  1.262 | | |
| r23   109.922 | d23  1.097 | N14  1.77250 | v14  49.77 |
| r24    29.324 | d24  0.010 | N15  1.51400 | v15  42.83 |
| r25    29.324 | d25  3.197 | N16  1.79850 | v16  22.60 |
| r26    63.152 | | | |

Σd = 145.735 to 180.539 to 193.337

TABLE 16

(12th Embodiment)(Close)

| Radius of Curvature | Axial Distance | Refractive Index | Abbe Number |
|---|---|---|---|
| r1   167.916 | d1   2.746 | N1   1.80518 | v1   25.43 |
| r2   107.289 | d2   0.010 | N2   1.51400 | v2   42.83 |
| r3   107.289 | d3   7.240 | N3   1.48749 | v3   70.15 |
| r4  −354.482 | d4   0.200 | | |
| r5   112.116 | d5   4.983 | N4   1.48749 | v4   70.15 |
| r6   438.989 | d6   7.107 to 50.107 to 79.402 | | |
| r7  −126.463 | d7   1.423 | N5   1.80500 | v5   40.97 |
| r8    35.938 | d8   2.415 | | |
| r9    39.795 | d9   3.592 | N6   1.78472 | v6   25.70 |
| r10   315.000 | d10  59.218 to 29.111 to 11.930 | | |
| r11  −199.356 | d11  1.593 | N7   1.84666 | v7   23.89 |
| r12   156.117 | d12  2.574 | | |
| r13   165.707 | d13  5.289 | N8   1.60729 | v8   49.34 |
| r14   −58.284 | d14  1.772 to 24.944 to 14.619 | | |
| r15    68.284 | d15  6.450 | N9   1.51728 | v9   69.43 |
| r16   −46.789 | d16  0.010 | N10  1.51400 | v10  42.83 |
| r17   −46.789 | d17  1.361 | N11  1.80750 | v11  35.43 |
| r18   −99.502 | d18  4.024 to 10.959 to 41.465 | | |
| r19    42.106 | d19  1.500 | N12  1.48749 | v12  70.44 |
| r20   112.634 | d20  25.493 to 17.297 to 0.800 | | |
| r21   121.357 | d21  1.169 | N13  1.78100 | v13  44.55 |
| r22    28.750 | d22  1.262 | | |
| r23   109.922 | d23  1.097 | N14  1.77250 | v14  49.77 |
| r24    29.324 | d24  0.010 | N15  1.51400 | v15  42.83 |
| r25    29.324 | d25  3.197 | N16  1.79850 | v16  22.60 |
| r26    63.152 | | | |

Σd = 145.735 to 180.539 to 193.337

TABLE 17

(13th Embodiment)(Infinity)
f = 103.0 to 200.0 to 388.0    FNo = 4.6

| Radius of Curvature | Axial Distance | Refractive Index | Abbe Number |
|---|---|---|---|
| r1   167.096 | d1   2.746 | N1   1.80518 | v1   25.43 |
| r2   107.646 | d2   0.010 | N2   1.51400 | v2   42.83 |
| r3   107.646 | d3   7.240 | N3   1.48749 | v3   70.15 |
| r4  −361.420 | d4   0.200 | | |
| r5   112.509 | d5   4.983 | N4   1.48749 | v4   70.15 |
| r6   442.521 | d6   6.892 to 49.392 to 79.188 | | |
| r7  −132.645 | d7   1.423 | N5   1.80500 | v5   40.97 |
| r8    36.331 | d8   2.415 | | |
| r9    40.160 | d9   3.592 | N6   1.78472 | v6   25.70 |
| r10   281.044 | d10  59.925 to 27.488 to 11.930 | | |
| r11  −201.161 | d11  1.593 | N7   1.84666 | v7   23.89 |
| r12   161.464 | d12  2.574 | | |
| r13   169.703 | d13  5.289 | N8   1.60729 | v8   49.34 |
| r14   −60.029 | d14  5.914 to 38.351 to 53.909 | | |
| r15    64.506 | d15  6.450 | N9   1.51728 | v9   69.43 |
| r16   −45.291 | d16  0.010 | N10  1.51400 | v10  42.83 |
| r17   −45.291 | d17  1.361 | N11  1.80750 | v11  35.43 |
| r18   −95.231 | d18  0.200 | | |
| r19    44.562 | d19  1.500 | N12  1.48749 | v12  70.44 |
| r20   113.719 | d20  25.709 to 17.516 to 0.800 | | |
| r21   104.733 | d21  1.169 | N13  1.78100 | v13  44.55 |
| r22    28.042 | d22  1.262 | | |
| r23   109.941 | d23  1.097 | N14  1.77250 | v14  49.77 |
| r24    28.854 | d24  0.010 | N15  1.51400 | v15  42.83 |
| r25    28.854 | d25  3.197 | N16  1.79850 | v16  22.60 |
| r26    62.970 | | | |

Σd = 146.761 to 181.068 to 194.148

TABLE 18

(13th Embodiment)(Close)

| Radius of Curvature | Axial Distance | Refractive Index | Abbe Number |
|---|---|---|---|
| r1   167.096 | d1   2.746 | N1   1.80518 | v1   25.43 |
| r2   107.646 | d2   0.010 | N2   1.51400 | v2   42.83 |
| r3   107.646 | d3   7.240 | N3   1.48749 | v3   70.15 |
| r4  −361.420 | d4   0.200 | | |
| r5   112.509 | d5   4.983 | N4   1.48749 | v4   70.15 |
| r6   442.521 | d6   6.892 to 49.392 to 79.188 | | |
| r7  −132.645 | d7   1.423 | N5   1.80500 | v5   40.97 |
| r8    36.331 | d8   2.415 | | |
| r9    40.160 | d9   3.592 | N6   1.78472 | v6   25.70 |
| r10   281.044 | d10  59.925 to 27.488 to 11.930 | | |
| r11  −201.161 | d11  1.593 | N7   1.84666 | v7   23.89 |
| r12   161.464 | d12  2.574 | | |

TABLE 18-continued (13th Embodiment)(Close)

| | Radius of Curvature | | Axial Distance | Refractive Index | | Abbe Number |
|---|---|---|---|---|---|---|
| r13 | 169.703 | d13 | 5.289 | N8 1.60729 | v8 | 49.34 |
| r14 | −60.029 | d14 | 2.374 to 28.1277 to 14.937 | | | |
| r15 | 64.506 | d15 | 6.450 | N9 1.51728 | v9 | 69.43 |
| r16 | −45.291 | d16 | 0.010 | N10 1.51400 | v10 | 42.83 |
| r17 | −45.291 | d17 | 1.361 | N11 1.80750 | v11 | 35.43 |
| r18 | −95.231 | d18 | 3.740 to 10.273 to 39.172 | | | |
| r19 | 44.562 | d19 | 1.500 | N12 1.48749 | v12 | 70.44 |
| r20 | 113.719 | d20 | 25.709 to 17.516 to 0.800 | | | |
| r21 | 104.733 | d21 | 1.169 | N13 1.78100 | v13 | 44.55 |
| r22 | 28.042 | d22 | 1.262 | | | |
| r23 | 109.941 | d23 | 1.097 | N14 1.77250 | v14 | 49.77 |
| r24 | 28.854 | d24 | 0.010 | N15 1.51400 | v15 | 42.83 |
| r25 | 28.854 | d25 | 3.197 | N16 1.79850 | v16 | 22.60 |
| r26 | 62.970 | | | | | |

$\Sigma d$ = 146.761 to 181.068 to 194.148

TABLE 19

(14th Embodiment)(Infinity)
f = 103.0 to 200.0 to 388.0    FNO = 4.6

| | Radius of Curvature | | Axial Distance | Refractive Index | | Abbe Number |
|---|---|---|---|---|---|---|
| r1 | 166.430 | d1 | 2.746 | N1 1.80518 | v1 | 25.43 |
| r2 | 108.177 | d2 | 0.010 | N2 1.51400 | v2 | 42.83 |
| r3 | 108.177 | d3 | 7.240 | N3 1.48749 | v3 | 70.15 |
| r4 | −348.883 | d4 | 0.200 | | | |
| r5 | 111.339 | d5 | 4.983 | N4 1.48749 | v4 | 70.15 |
| r6 | 395.382 | d6 | 6.436 to 49.435 to 78.731 | | | |
| r7 | −154.939 | d7 | 1.423 | N5 1.80500 | v5 | 40.97 |
| r8 | 36.001 | d8 | 2.415 | | | |
| r9 | 39.633 | d9 | 3.592 | N6 1.78472 | v6 | 25.70 |
| r10 | 251.024 | d10 | 62.503 to 27.184 to 11.930 | | | |
| r11 | −178.514 | d11 | 1.593 | N7 1.84666 | v7 | 23.89 |
| r12 | 210.531 | d12 | 2.574 | | | |
| r13 | 284.527 | d13 | 5.289 | N8 1.60729 | v8 | 49.34 |
| r14 | −61.280 | d14 | 9.231 to 44.551 to 59.804 | | | |
| r15 | 58.478 | d15 | 6.450 | N9 1.51728 | v9 | 69.43 |
| r16 | −39.975 | d16 | 0.010 | N10 1.51400 | v10 | 42.83 |
| r17 | −39.975 | d17 | 1.361 | N11 1.80750 | v11 | 35.43 |
| r18 | −79.440 | d18 | 0.200 | | | |
| r19 | 48.492 | d19 | 2.000 | N12 1.48749 | v12 | 70.44 |
| r20 | 95.172 | d20 | 26.668 to 18.129 to 0.800 | | | |
| r21 | 70.393 | d21 | 1.169 | N13 1.78831 | v13 | 47.32 |
| r22 | 27.038 | d22 | 1.262 | | | |
| r23 | 100.160 | d23 | 1.097 | N14 1.77250 | v14 | 49.77 |
| r24 | 28.182 | d24 | 0.010 | N15 1.51400 | v15 | 42.83 |
| r25 | 28.182 | d25 | 3.197 | N16 1.79850 | v16 | 22.60 |
| r26 | 55.917 | | | | | |

$\Sigma d$ = 153.659 to 188.120 to 200.086

TABLE 20

(14th Embodiment)(Close)

| | Radius of Curvature | | Axial Distance | Refractive Index | | Abbe Number |
|---|---|---|---|---|---|---|
| r1 | 166.430 | d1 | 2.746 | N1 1.80518 | v1 | 25.43 |
| r2 | 108.177 | d2 | 0.010 | N2 1.51400 | v2 | 42.83 |
| r3 | 108.177 | d3 | 7.240 | N3 1.48749 | v3 | 70.15 |
| r4 | −348.883 | d4 | 0.200 | | | |
| r5 | 111.339 | d5 | 4.983 | N4 1.48749 | v4 | 70.15 |
| r6 | 395.382 | d6 | 6.436 to 49.435 to 78.731 | | | |
| r7 | −154.939 | d7 | 1.423 | N5 1.80500 | v5 | 40.97 |
| r8 | 36.001 | d8 | 2.415 | | | |
| r9 | 39.633 | d9 | 3.592 | N6 1.78472 | v6 | 25.70 |
| r10 | 215.024 | d10 | 62.503 to 27.184 to 11.930 | | | |

TABLE 20-continued (14th Embodiment)(Close)

| | Radius of Curvature | | Axial Distance | Refractive Index | | Abbe Number |
|---|---|---|---|---|---|---|
| r11 | −178.514 | d11 | 1.593 | N7 1.84666 | v7 | 23.89 |
| r12 | 210.531 | d12 | 2.574 | | | |
| r13 | 284.527 | d13 | 5.289 | N8 1.60729 | v8 | 49.34 |
| r14 | −61.280 | d14 | 6.167 to 35.749 to 23.755 | | | |
| r15 | 58.478 | d15 | 6.450 | N9 1.51728 | v9 | 69.43 |
| r16 | −39.975 | d16 | 0.010 | N10 1.51400 | v10 | 42.83 |
| r17 | −39.975 | d17 | 1.361 | N11 1.80750 | v11 | 35.43 |
| r18 | −79.440 | d18 | 3.265 to 9.001 to 36.250 | | | |
| r19 | 48.492 | d19 | 2.000 | N12 1.48749 | v12 | 70.44 |
| r20 | 95.172 | d20 | 26.668 to 18.129 to 0.800 | | | |
| r21 | 70.393 | d21 | 1.169 | N13 1.78831 | v13 | 47.32 |
| r22 | 27.038 | d22 | 1.262 | | | |
| r23 | 100.160 | d23 | 1.097 | N14 1.77250 | v14 | 49.77 |
| r24 | 28.182 | d24 | 0.010 | N15 1.51400 | v15 | 42.83 |
| r25 | 28.182 | d25 | 3.197 | N16 1.79850 | v16 | 22.60 |
| r26 | 55.917 | | | | | |

$\Sigma d$ = 153.659 to 188.120 to 200.086

TABLE 21

Spherical aberration coefficients

| | ∞ | | 0.85m 4th unit floated | | 0.85m Entire 4th unit moved out | |
|---|---|---|---|---|---|---|
| Gr1 to 3 | −1.093 | | 0.571 | | 0.299 | |
| 4F | 1.649 | 3.230 | −0.275 | 1.306 | −0.075 | 1.104 |
| 4B | 1.581 | | 1.581 | | 1.179 | |
| Gr5 | −2.052 | | −2.052 | | −2.052 | |
| Entire system | 0.085 | | −0.175 | | −0.649 | |

TABLE 22

Field curvature coefficients

| | ∞ | | 0.85m 4th unit floated | | 0.85m Entire 4th unit moved out | |
|---|---|---|---|---|---|---|
| Gr1 to 3 | 3.734 | | −6.630 | | −0.391 | |
| 4F | −2.811 | −5.458 | 2.220 | 6.296 | 1.009 | 0.817 |
| 4B | −2.647 | | 4.076 | | −0.192 | |
| Gr5 | 2.112 | | 0.907 | | 1.089 | |
| Entire system | 0.388 | | 0.569 | | 1.514 | |

TABLE 23

Coma coefficients

| | ∞ | | 0.85m 4th unit floated | | 0.85m Entire 4th unit moved out | |
|---|---|---|---|---|---|---|
| Gr1 to 3 | −0.409 | | 0.985 | | 0.350 | |
| 4F | −1.077 | 1.704 | −2.937 | −4.012 | −1.994 | −2.692 |
| 4B | −0.627 | | −1.075 | | −0.698 | |
| Gr5 | 1.839 | | 2.420 | | 1.507 | |
| Entire system | −0.274 | | −0.607 | | −0.835 | |

TABLE 24

| | Spherical aberration coefficients | | Coma coefficients | |
|---|---|---|---|---|
| | ∞ | 0.85m | ∞ | 0.85m |
| Gr1 to 3 | −1.18 | −0.76 | −0.60 | 0.17 |
| 4F | 2.12 | 2.35 | −0.89 | −2.79 |
| 4B | 1.78 | 1.78 | −0.50 | −1.01 |
| Gr5 | −2.38 | −2.38 | 1.94 | 2.62 |
| Entire system | 0.34 | 0.99 | −0.05 | −1.01 |

TABLE 25

| | Spherical aberration coefficients | |
|---|---|---|
| | ∞ | 0.85m |
| Gr1 to 3 | −1.08 | −0.43 |
| 4F | 1.44 | −1.50 |
| 4B | 2.12 | 2.12 |
| Gr5 | −2.07 | −2.07 |
| Entire system | 0.34 | −1.88 |

TABLE 26

| | Conditions | 12th embodiment | 13th embodiment | 14th embodiment |
|---|---|---|---|---|
| (8) | $\dfrac{\phi B}{\phi}$ | 0.442 | 0.406 | 0.303 |
| (9) | $\dfrac{R1 + R2}{R1 - R2}$ | 2.2 | 2.3 | 3.1 |
| (10) | βF1 | 0.604 | 0.583 | 0.508 |
| (11) | βF2 | 0.215 | 0.193 | 0.089 |

What is claimed is:

1. A lens group provided within one of a positive and negative two lens group zoom lens system and a positive, positive and negative three lens group zoom lens system having a positive refractive power, said lens group comprising, from an object side:
   positive lens unit which is moved forward to the object side upon focusing for a close object; and
   a positive meniscus lens element convex to the object side moveable toward the object side in focusing for a close object, and wherein the following condition is fulfilled:

$$0 \le \frac{DB}{DA} < 0.5$$

wherein DA is a movement amount of the positive lens unit in focusing and DB is a movement amount of the positive lens element in focusing;
   wherein the positive lens unit and the positive lens element are separated from each other,
   wherein a distance between said positive lens unit and said positive meniscus lens element varies upon focusing for a close object while said distance is fixed upon zooming, and
   wherein said positive lens element fulfills the following conditions:

$$0.2 < \frac{r2 + r1}{r2 - r1} < 3.3$$

wherein r1 is a radius of curvature of an object side surface of the positive lens element and r2 is a radius of curvature of an image side surface of the positive lens element.

2. A lens group provided within one of a positive and negative two lens group zoom lens system and a positive, positive and negative three lens group zoom lens system, having a positive refractive power, said lens group comprising:
   a positive lens unit which is moved forward to the object side upon focusing for a close object; and
   a positive lens element having a surface convex to the object side, and provided at the most image side of the lens group and which is moved forward to the object side upon focusing for a close object,
   wherein the positive lens unit and the positive lens element are separated from each other,
   wherein a movement amount of the positive lens unit is different from that of the positive lens element, and
   wherein said positive lens element fulfills the following condition:

$$0.2 < \frac{r2 + r1}{r2 - r1} < 3.3$$

where r1 is a radius of curvature of an object side surface of the positive lens element and r2 is a radius of curvature of an image side surface of the positive lens element.

3. A zoom lens system selected from one of a positive and negative two lens group zoom lens system and a positive, positive and negative three lens group zoom lens system, said zoom lens system comprising from an object side:
   a plurality of lens groups, including a positive lens group, a positive lens unit included in said positive lens group; and
   a positive meniscus lens element convex to the object side provided within and at the most image side of said positive lens group, said positive meniscus lens element being provided at the image side of said positive lens unit via a variable air space therebetween;
   wherein zooming is performed by varying distances among the plurality of lens groups,
   wherein focusing for a close object is performed by moving said positive lens unit forward to the object side, and said positive meniscus lens element is moveable forward to the object side,
   wherein the variable air space is fixed during zooming while the variable air space varies during focusing for a close object,
   wherein said positive meniscus lens element fulfills the following conditions:

$$0.2 < \frac{r2 + r1}{r2 - r1} < 3.3$$

wherein r1 is a radius of curvature of an object side surface of the positive lens element and r2 is a radius of curvature of an image side surface of the positive lens element; and wherein the following condition is fulfilled:

$$0 \le \frac{DB}{DA} < 0.5$$

wherein DA is a movement amount of the positive lens unit in focusing and DB is a movement amount of the positive meniscus lens element in focusing.

4. A zoom lens system comprising from an object side:
a first lens group having a positive refractive power and provided at most object side of the entire zoom lens system, the first lens group having from the object side a positive lens unit, and a positive single meniscus lens element which has a surface convex to the object side and provided at the most image side end of the first lens group;
a second lens group having a negative refractive power and immediately provided at an image side of the first lens group and most image side of the entire zoom lens system:
wherein a zooming operation is performed by varying a distance between the first and second lens groups and by fixing a distance between the positive lens unit and the positive single meniscus lens element,
wherein a focusing operation for a close object is performed by varying the distance between the positive lens unit and the positive single meniscus lens element,
wherein the positive single meniscus lens element fulfills the following condition:

$$0.2 < \frac{r1 + r2}{r1 - r2} < 3.3$$

where r1 is a radius of curvature of an object side surface of the positive single meniscus lens element and r2 is a radius of curvature of an image side surface of the positive single meniscus lens element.

5. A zoom lens system as claimed in claim 4, wherein a distance between the positive lens unit and the positive single meniscus lens element increases during a focusing operation from an infinite object to a close object.

6. A zoom lens system as claimed in claim 4, wherein the positive lens unit moves forward to the object side during a focusing operation from an infinite object to a close object.

7. A zoom lens system as claimed in claim 4, wherein the positive lens unit moves forward to the object side during a focusing operation from an infinite object to a close object, and wherein the zoom lens system fulfills the following condition:

$$0 < \frac{DB}{DA} < 0.5$$

wherein DA is a movement amount of the positive lens unit in focusing and DB is a movement amount of the positive meniscus lens element in focusing.

8. A zoom lens system as claimed in claim 4, wherein the zoom lens system fulfills the following condition:

$$2.0 < \frac{fB}{fI} < 7.0$$

where f1 is a composite focal length of the first lens group and fB is a focal length of the positive single meniscus lens element.

9. A zoom lens system comprising from an object side:
a first lens group having a positive refractive power and provided at most object side of the entire zoom lens system;
a second lens group having a negative refractive power and immediately provided at an image side of the first lens group, the second lens group having from the object side a positive lens unit, and a positive single meniscus lens element which has a surface convex to the object side and provided at the most image side end of the second lens group;
a third lens group having a negative refractive power and immediately provided at an image side of the second lens group and most image side of the entire zoom lens system:
wherein a zooming operation is performed by varying a distance between each of the first, second and third lens groups, and by fixing a distance between the positive lens unit and the positive single meniscus lens element,
wherein a focusing operation for a close object is performed by varying the distance between the positive lens unit and the positive single meniscus lens element,
wherein the positive single meniscus lens element fulfills the following condition:

$$0.2 < \frac{(r1 + r2)}{(r1 - r2)} < 3.3$$

where r1 is radius of curvature of an object side surface of the positive single meniscus lens element and r2 is a radius of curvature of an image side surface of the positive single meniscus lens element.

10. A zoom lens system as claimed in claim 9, wherein a distance between the positive lens unit and the positive single meniscus lens element increases during a focusing operation from an infinite object to a close object.

11. A zoom lens system as claimed in claim 9, wherein the positive lens unit moves forward to the object side during a focusing operation form an infinite object to a close object.

12. A zoom lens system as claimed in claim 9, wherein the positive lens unit moves forward to the object side during a focusing operation form an infinite object to a close object and wherein the zoom lens system fulfills the following condition:

$$0 \le \frac{DB}{DA} \le 0.5$$

wherein DA is a movement amount of the positive lens unit in focusing and DB is a movement amount of the positive meniscus lens element in focusing.

13. A zoom lens system as claimed in claim 9, wherein the zoom lens system fulfills the following condition:

$$2.0 < \frac{fB}{fI} < 7.0$$

where f1 is a composite focal length of the first lens group and fB is a focal length of the positive single meniscus lens element.

* * * * *